(12) United States Patent
Cuadros

(10) Patent No.: US 8,970,161 B1
(45) Date of Patent: Mar. 3, 2015

(54) MODULATION CONTROL SCHEME FOR POWER CONVERTERS IN PHOTOVOLTAIC SYSTEM CHARGE CONTROLLERS

(76) Inventor: Carlos Cuadros, Columbia, MD (US)

( * ) Notice: Subject to any disclaimer, the term of this patent is extended or adjusted under 35 U.S.C. 154(b) by 420 days.

(21) Appl. No.: 13/507,467

(22) Filed: Jun. 29, 2012

Related U.S. Application Data

(60) Provisional application No. 61/502,457, filed on Jun. 29, 2011.

(51) Int. Cl.
*H02J 7/00* (2006.01)
(52) U.S. Cl.
USPC ........... 320/101; 320/107; 320/108; 320/112; 320/113; 320/140
(58) Field of Classification Search
CPC ........... H02J 3/32; H02J 7/0075; H02J 3/383; H02J 3/384; Y02T 10/7044; Y02T 10/7216; Y02T 90/127
USPC .................. 320/101, 107–108, 112–113, 140
See application file for complete search history.

(56) References Cited

U.S. PATENT DOCUMENTS

| 2011/0001455 A1* | 1/2011 | Dowdy et al. | 320/107 |
| 2011/0089886 A1* | 4/2011 | Dubovsky | 320/101 |

* cited by examiner

*Primary Examiner* — Paul Dinh

(57) ABSTRACT

A modulation control scheme for a series-connected dual active bridge (DAB) DC to DC converter in a maximum power point tracking charge controller used in a photovoltaic system controls operation of the converter in a forward direction power flow mode to control charging of a battery bank with electricity produced by the photovoltaic array. The modulation control scheme is also capable of operating the converter in a reverse direction power flow mode to control the flow of electricity from the battery bank to a DC load. The modulation control scheme divides the converter's operating range in each mode into five main cases of minimum root mean square (M-RMS) operating regions and seven main cases of full zero-voltage switching (F-ZVS) operating regions, as well as transition operating regions between adjacent main cases, based on applicable power level and value of voltage differential.

11 Claims, 33 Drawing Sheets

MODULATION CONTROL SCHEME FOR POWER CONVERTERS IN PHOTOVOLTAIC SYSTEM CHARGE CONTROLLERS

CROSS-REFERENCE TO RELATED PATENT APPLICATION

This application claims priority from U.S. provisional patent application Ser. No. 61/502,457 filed Jun. 29, 2011, the entire disclosure of which is incorporated herein by reference.

BACKGROUND OF THE INVENTION

1. Field of the Invention

The present invention pertains generally to photovoltaic system charge controllers and, more particularly, to modulation controls for power converters in photovoltaic system charge controllers, particularly high voltage maximum power point tracking photovoltaic system charge controllers.

2. Brief Discussion of the Related Art

Photovoltaic (PV) systems that produce electricity from solar energy have established themselves as a successful and reliable option for electrical power generation. Photovoltaic systems have continually been gaining in popularity as the cost of such systems has been reduced, as the cost of utility-supplied power has escalated and as greater attention has been paid to the need for safe, renewable, alternative energy sources. Basically, a photovoltaic system includes a photovoltaic (PV) array made up of one or more PV panels or modules composed of photovoltaic cells capable of converting solar energy into direct current (DC) electrical energy, a battery bank made up of one or more batteries for storing the electrical energy produced by the photovoltaic array, and a charge controller for controlling the charging of the one or more batteries with the electrical energy produced by the photovoltaic array. The direct current (DC) electrical energy produced by the photovoltaic array and/or stored in the battery bank is available to power a DC load. In some systems, the DC load may include an inverter used to convert the direct current (DC) electrical energy into alternating current (AC) electrical energy suitable to power AC loads. Photovoltaic systems are sometimes employed to power loads independently of utility power, such as where electrical power from the public utility grid is unavailable or not feasible, and these photovoltaic systems are commonly referred to as "off-grid" and "stand-alone" photovoltaic systems. In other instances, photovoltaic systems known as "on-grid" and "grid-connected" photovoltaic systems are employed to supply electrical power to the public utility grid as explained further below.

In accordance with programs commonly referred to as "net metering", many public utilities provide compensation for the net electrical power that is fed into the utility grid from grid-connected photovoltaic systems. The electrical power produced by grid-connected photovoltaic systems typically is used first to operate any connected end load, such as various conventional electrical appliances and devices, and the excess electrical power not consumed by the connected end load is then supplied to the utility grid. If the photovoltaic system fails to produce enough electrical power to operate the connected end load, electricity is drawn from the utility grid to power the load. Through net metering programs, the owner of the grid-connected photovoltaic system is compensated for the net outflow of electrical power from the photovoltaic system into the utility grid.

Grid-connected photovoltaic systems utilize inverters, conventionally referred to as "on-grid" or "grid-connected" inverters, that transform the direct current (DC) electrical power produced by the photovoltaic system into alternating current (AC) electrical power suitable for being supplied to the utility grid and for powering any other connected AC end load. Grid-connected inverters normally function to ensure that the AC electrical power supplied to the utility grid is in sinusoidal form, synchronized to the frequency of the grid, and limited to a feed voltage, i.e. the output voltage of the inverter, that is no higher than the grid voltage. One way in which the AC electrical power output from an on-grid inverter can be supplied to the utility grid and/or another connected AC end load involves connecting the inverter output to an electrical distribution panel as typically found in residential, commercial, business and/or other types of buildings or structures. The source of DC electrical input to the on-grid inverter may come from various sources including electrical energy stored in the battery bank of the photovoltaic system, flywheels and/or fuel cells, for example.

Photovoltaic systems have been designed with traditional charge controllers that do not employ maximum power point tracking (MPPT), and such charge controllers may be referred to as non-MPPT charge controllers. Non-MPPT charge controllers connect the PV array directly to the battery bank for charging. Usually there is a mismatch between the output voltage of the PV array and the voltage required to charge the battery bank that results in under-utilization of the maximum power output from the PV array. The reason for the mismatch is that most PV modules are rated to produce a nominal 12V under standard test conditions but, because they are designed for worse than standard test conditions, in actual fact they produce significantly more voltage. On the other hand, a nominal 12V battery requires close to an actual 12V (14V typically) depending on battery state of charge. When a non-MPPT charge controller is charging the battery, the PV module is frequently forced to operate at a battery voltage that is less than the optimal operating voltage at which the PV module is capable of producing its maximum power. Hence, non-MPPT charge controllers artificially limit power production to a sub-optimal level by constraining the PV array from operating at maximum output power.

Maximum power point tracking (MPPT) charge controllers address the aforesaid disadvantage of non-MPPT charge controllers by managing the voltage mismatch between the PV array and the battery bank through the use of power electronics. The primary functions performed by MPPT charge controllers involve measuring the PV module output to find the maximum power voltage ($V_{mp}$), i.e. the voltage at which the PV module is able to produce maximum power, operating the PV module at the maximum power voltage to extract or harvest full power (watts) from the PV array, regardless of the present battery voltage ($V_B$), and protecting the battery from overcharge.

Photovoltaic modules are made up of photovoltaic (PV) cells that have a single operating point where the values of the current (I) and voltage (V) of the cell result in a maximum power output. The maximum power voltage $V_{mp}$ varies with operating conditions including weather, sunlight intensity, shading, and PV cell temperature. As the maximum power voltage $V_{mp}$ of the PV module varies, MPPT charge controllers "track" the $V_{mp}$ and adjust the ratio between the maximum power voltage and the current delivered to the battery in order to match what the battery requires. MPPT charge controllers utilize a control circuit or logic to search for the maximum power output operating point and employ power electronics to extract the maximum power available from a PV module.

MPPT charge controllers generally employ power converters designed for a higher input voltage than output voltage, hence $V_{mp} > V_B$. The power converters are conventionally designed to include a DC to DC converter that receives the maximum power voltage $V_{mp}$ from the PV array as converter input and converts the maximum power voltage to battery voltage $V_B$ as converter output. An increase in battery charge current is realized by harvesting PV module power that would be left unharvested using a non-MPPT charge controller. As the maximum power voltage varies, the actual charge current increase that is realized will likewise vary. Generally speaking, the greater the mismatch or disparity between the PV array maximum power voltage $V_{mp}$ and the battery voltage $V_B$, the greater the charge current increase will be. The charge current increase will ordinarily be greater in cooler temperatures because the available power output and the maximum power voltage of the PV module increase as the photovoltaic cell temperature decreases. In addition, lower battery voltage, as in the case of a highly discharged battery, will result in a greater charge current increase.

Most MPPT charge controllers utilize power electronics designed to include a "buck" converter having topology to "buck" or "step-down" a higher input voltage to a lower output voltage. Buck converters, also known as "step-down" converters, are familiar in the field of power electronics and essentially include an inductor and two complementary switches to achieve unidirectional power flow from input to output. A first of the switches is ordinarily a controlled switch such as a MOSFET (metal oxide semiconductor field effect transistor) or other transistor, and the second of the switches is ordinarily an uncontrolled switch such as a discrete power diode. The buck converter alternates between connecting the inductor to the input voltage ($V_A$) from the PV array to store energy in the inductor and discharging the inductor into the battery bank. When the first switch is turned "on" for a time duration, the second switch becomes reverse biased and the inductor is connected to the input voltage $V_A$. There is a positive voltage ($V_L$) across the inductor equal to the input voltage $V_A$ minus the output voltage $V_B$, hence $V_L = V_A - V_B$, and there is an increase in the inductor current ($I_L$). In this "on" state, energy is stored in the inductor. When the first switch is turned "off", inductor current $I_L$ continues to flow due to the inductor energy storage, resulting in a negative voltage across the inductor ($V_L = -V_B$). The inductor current now flows through the second switch, which is forward biased, and current $I_L$ through the inductor decreases. In this "off" state, energy continues to be delivered to the output until the first switch is again turned "on" to begin another on-off cycle. The buck converter is operated in continuous conduction mode (CCM) when the current through the inductor never goes to zero during the commutation cycle. The buck converter is operated in discontinuous conduction mode (DCM) when the current through the inductor goes to zero every commutation cycle.

In addition to voltage stepping-down applications, DC to DC converters have been used in the past to "boost" or "step-up" a lower input voltage to a higher output voltage. These types of DC to DC converters are commonly referred to as "boost" or "step-up" converters.

Some of the limitations to using a buck converter in MPPT charge controllers for photovoltaic systems include high peak currents and voltages with attendant high power losses, and increasing control problems as the input voltage increases. The efficiency of buck converters can be improved to some extent using a technique known as "synchronous rectification". In synchronous rectification, the discrete power diode that serves as the second switch in the buck converter can be replaced with a MOSFET which, like all power MOSFETs, has an intrinsic or inherent anti-parallel parasitic body diode between the source and the drain of the MOSFET's transistor. When the body diode of the MOSFET of the second switch is forward biased and conducting current, the transistor of the MOSFET of the second switch is turned "on" a short time after its body diode has started to conduct. The transistor of the MOSFET of the second switch is turned "off" a short time before the MOSFET of the first switch in the buck converter is going to turn back "on". The MOSFET of the second switch in the "on" state behaves as a low value resistance, reducing the forward voltage and yielding lower losses. While this MOSFET is "on", the forward voltage drop of the body diode is limited to the "on" resistance of its transistor. This forward voltage drop can be significantly lower than the voltage drop in the discrete power diode referred to above as the second switch in the buck converter, thereby lowering conduction losses.

Sophisticated MPPT photovoltaic system charge controllers send out a series of short charging pulses to the battery bank. The controllers monitor the state of the battery bank and adjust the pulses as needed to regulate the amount of charge sent to the battery bank. This technique is commonly referred to as "pulse width modulation," i.e. PWM. Based on the monitored system parameters, the controllers generate commands representing required duty cycles for the power converters of the controllers, which result in the appropriate switching signals being applied to the switches of the power converters. Accordingly, power flow through the converters and electrical output from the converters are controlled in accordance with a modulation control scheme executed by the controllers.

Most conventionally available photovoltaic system charge controllers that utilize a buck converter to implement maximum power point tracking (MPPT) are limited to an input of 150V, one exception being the MPPT charge controller developed by Australian Energy Research Laboratory (AERL) which is capable of handling an input of 250V. Conventional on-grid inverters, however, operate with high voltage PV arrays up to 600V, such that presently available MPPT charge controllers for photovoltaic systems are generally unsuitable for use in grid-connected photovoltaic systems due to their inability to handle the high voltage.

A high voltage (HV) bidirectional maximum power point tracking (MPPT) charge controller that can be used in photovoltaic systems having a high voltage photovoltaic array of up to 600V is the subject of U.S. patent application Ser. No. 12/896,427 filed Oct. 1, 2010, which is commonly owned by the Assignee of the subject patent application and the entire disclosure of which is incorporated herein by reference. A high voltage bidirectional maximum power point tracking charge controller described in the aforementioned prior application incorporates a series-connected dual active bridge (DAB) bidirectional DC to DC converter that utilizes MOSFETs as the switches in each bridge. The bidirectional DC to DC converter receives DC input from the photovoltaic array and operates in a first direction of power flow to step-down the voltage of the DC input received from the photovoltaic array to obtain a stepped-down DC output of appropriate voltage to optimally charge the battery bank. The bidirectional DC to DC converter also receives DC input from the battery bank and operates in a second or reverse direction of power flow to step-up the voltage of the DC input received from the battery bank to obtain a stepped-up DC output of appropriate voltage for a high voltage DC load, which can be an inverter for transforming DC electricity received from the charge controller into AC electricity appropriate for being supplied to a public utility grid and/or to another connected AC end load.

The aforesaid dual active bridge (DAB) bidirectional DC to DC converter employs a primary bridge having four MOSFETs as switches, a secondary bridge having four MOSFETs as switches, and a transformer electrically connecting the primary and secondary bridges. When the converter is operated in the first direction of power flow, the primary bridge receives DC input from the PV array and the secondary bridge supplies the stepped-down DC output to the battery bank in the manner of a buck converter. Conversely, when the converter is operated in the second direction of power flow, the secondary bridge, which now functions as the primary bridge, receives DC input from the battery bank, and the primary bridge, which now functions as the secondary bridge, supplies the stepped-up DC output to the high voltage DC load in the manner of a boost converter. Operation of the converter involves turning the MOSFETs on and off by controlling the electrical switching signals applied to the gates of the MOSFETs in accordance with a modulation control scheme to control the power flow through the converter and the electrical output from the converter.

Dual active bridge (DAB) bidirectional DC to DC converters that utilize the transformer's leakage inductance $L_{lk}$, or the leakage inductance $L_{lk}$ and another inductance connected in series with any of the transformer's terminals, to control the converter's bidirectional power flow while allowing each switch in the bridges to be implemented as a MOSFET have previously been considered by DeDoncker et al in U.S. Pat. No. 5,027,264; by DeDoncker et al in "A Three-phase Soft-Switched High Power Density DC/DC Converter For High Power Applications" (1988 IEEE); by DeDoncker et al in "A Three-Phase Soft-Switched High-Power-Density dc/dc Converter for High-Power Applications" (1991 IEEE); by Kheraluwala et al in "Performance Characterization of a High-Power Dual Active Bridge dc-to-dc Converter" (1992 IEEE); by Vangen et al in "Dual Active Bridge Converter With Large Soft-Switching Range" (1993 The European Power Electronic Association); by Vangen et al in "Soft-Switched High-Frequency, High-Power DC/AC Converter With IGBT" (1992 IEEE); by Vangen et al in "Efficient High-Frequency Soft-Switched Power Converter With Signal Processor Control" (1991 IEEE); by Schibli in "Symmetrical Multilevel Converters With Two Quadrant DC-DC Feeding" (2000 Ecole Polytechnique Federale de Lausanne); by Song et al in "A New Soft Switching Technique for Bi-directional Power Flow, Full-Bridge DC-DC Converter" (2002 IEEE); by Chan et al in "A Phase-Shift Controlled Bi-directional DC-DC Converter" (1999 IEEE); and by Chan et al in "ZCS-ZVS bi-directional phase-shifted DC-DC converter with extended load range" (2003 IEEE). These converters avoid the drawback of having to fight the leakage inductance as in the buck-derived isolated bridge converters considered by Sabaté et al in "Design Considerations For High-Voltage High-Power Full-Bridge Zero-Voltage-Switched PWM Converter" (1990 IEEE); by Cho et al in "Novel Full Bridge Zero-Voltage-Transition PWM DC/DC Converter for High Power Applications" (1994 IEEE); by Cho et al in "Zero-Voltage and Zero-Current-Switching Full Bridge PWM Converter for High Power Applications" (1994 IEEE); and by Cuadros et al in "Design Procedure and Modeling of High Power, High Performance, Zero-Voltage Zero-Current Switched, Full-Bridge PWM Converter" (1997 IEEE). The switches in the primary and secondary bridges of the dual active bridge (DAB) bidirectional DC to DC converters are controlled to produce phase-shifted square waves across the transformer (or across the series connection of a transformer and an inductance). This type of modulation control may be referred to as "phase-shift control." U.S. Pat. No. 5,027,264 demonstrates that, if MOSFETs are used as the switches in each bridge, the dual active bridge converter can operate both with zero-voltage switching (ZVS) and synchronous rectification within a constrained range, i.e. when the voltage conversion ratio is close to the transformer's turn ratio. Within this constrained range, the dual active bridge converter can exhibit high efficiency at high switching frequencies by avoiding power losses and electromagnetic noise associated with diode reverse recovery characteristics under hard switching. Hard switching forces the diode to turn off by turning on the opposite switch in the same leg of the bridge, which produces a high negative peak current in the diode as well as discharging the node capacitance through the switch itself. Consequently, switch power losses are significantly increased. The MOSFET's intrinsic body diode exhibits poorer reverse recovery characteristics than a discrete power diode and, as a result, induces higher power losses than a discrete power diode when hard-switched off. Outside the constrained range, however, zero-voltage switching is lost. In particular, when the voltage conversion ratio is much lower or much higher than the transformer's turn ratio, some of the diodes get hard switched off. When the voltage conversion ratio is much lower than the transformer's turn ratio, zero-voltage switching is lost on the secondary bridge. When the voltage conversion ratio is much higher than the transformer's turn ratio, zero-voltage switching is lost on the primary bridge.

A modulation control for a dual active bridge DC to DC converter that extends its zero-voltage switching (ZVS) operating region and reduces its root mean square (RMS) current value in some regions of the converter's operating range when compared to the aforementioned standard phase-shift control is presented by Kheraluwala et al in "Performance Characterization of a High-Power Dual Active Bridge dc-to-dc Converter", by Vangen et al in "Dual Active Bridge Converter with Large Soft-Switching Ranges", and by Vangen et al in "Soft-Switched High-Frequency, High Power DC/AC converter with IGBT." This modulation control approach employs two angles as the command variables, i.e. angle α that sets the phase-shift between the input-side bridge legs and angle φ that sets the phase-shift between the primary and secondary bridges. This type of modulation control, which may be referred to as "two-angle control", generates a three-level voltage waveform between the nodes on the primary bridge but a two-level voltage waveform between the nodes on the secondary bridge. Adding levels to the bridge voltages in this manner expands the conditions under which zero-voltage switching can be attained. However, restrictions on the values for the normalized voltage conversion ratio preclude bidirectional operation under certain conditions.

In order to alleviate the power losses incurred in the dual active bridge DC to DC converter by operation under hard switching conditions, three-angle control sequences that can generate three-level voltage waveforms in both bridges, i.e. between the nodes in the primary bridge and also between the nodes in the secondary bridge, are proposed by Vangen et al in "Efficient High-Frequency Soft-Switched Power Converter With Signal Processor Control." This approach to control modulation, which may be referred to as "three-angle control," provides more possibilities for soft switching conditions. Switch commutation is performed with zero-voltage switching (ZVS) and zero-current switching (ZCS) for certain intervals of each switching semi-cycle. The three-angle control approach generates a rectangular mode, a triangular mode and a trapezoidal mode of operation. The trapezoidal mode is recommended by Schibli in "Symmetrical Multilevel Converters With Two-Quadrant DC-DC Feeding." Schibli recommends this mode of operation for its specific case of high voltage and IGBT switch implementation. However, this type of trapezoidal mode with zero-current during a portion of the switching semi-cycle is disadvantageous because it unnecessarily increases RMS current value and prevents zero-voltage switching operation in a certain range.

In "A New Soft Switching Technique for Bi-directional Power Flow, Full-Bridge DC-DC Converter," Song et al proposed a modulation control scheme for dual active bridge converter operation similar to that discussed by Schibli. Song et al only considers voltage conversion rate values of strictly less than 1, and bidirectional operation for the same circuit design with this control scheme is not possible. The control scheme proposed by Song et al can only assist the dual active bridge converter's efficiency in a very narrow range and for unidirectional operation.

A dual active bridge DC to DC converter formed with a half-bridge and a full-bridge, together with a switch control scheme similar to that proposed by Song et al, is discussed by Zhang et al in "An Improved Dual Active Bridge DC/DC Converter" (2001 IEEE). The analysis and experimental comparisons are demonstrated by Zhang et al for a voltage conversion ratio equal to 1, under which conditions a dual active bridge design having the phase-shift control proposed by DeDoncker et al always operates with zero-voltage switching and would exhibit superior performance compared to Zhang et al's converter.

SUMMARY OF THE INVENTION

The invention is a modulation control scheme for a dual active bridge (DAB) DC to DC converter in a charge controller for photovoltaic systems composed of a photovoltaic (PV) array and a battery bank, wherein the charge controller controls charging of the battery bank with DC electricity produced by the (PV) array. In one preferred application of the invention, the modulation control scheme is employed in a dual active bridge (DAB) bidirectional DC to DC converter in a high voltage (HV) bidirectional maximum power point tracking (MPPT) charge controller for photovoltaic systems composed of a high voltage PV array, a battery bank and a high voltage DC load. The modulation control scheme maximizes the efficiency of a series-connected dual active bridge (DAB) bidirectional DC to DC converter implemented with MOSFETs as the switches in each full bridge of the converter. Conduction losses in the MOSFETs are minimized by reducing RMS (root mean square) current values and by employing synchronous rectification (reverse conduction of the MOSFETs). In addition, switching losses in the converter are minimized by achieving soft switching operation, and specifically by avoiding hard turn-off of the MOSFETs' intrinsic body diodes, either attaining zero-voltage switching (ZVS) when possible or resorting to zero-current switching (ZCS) without adding unnecessary switching actions. The modulation control scheme involves a minimum RMS current (M-RMS) mode of operation that minimizes conduction losses, and a full zero-voltage switching (F-ZVS) mode of operation that minimizes switching losses. The dual active bridge converter's operating range is divided into five cases or main operating regions in the M-RMS mode of operation, and into seven cases or main operating regions in the F-ZVS mode of operation. The cases or main operating regions are selected according to power levels and values of voltage differential, as well as the provision of appropriate transition or border operating regions between adjacent cases or main operating regions. This division is guided by minimization of the transformer's RMS current value, inclusion of both soft switching and synchronous rectification actions, when appropriate, avoidance of discontinuities in the converter's transfer characteristics, and allowance for straightforward, smooth control implementation. The modulation control scheme allows the dual active bridge DC to DC converter to operate for forward direction and reverse direction power flow, i.e. bidirectionally, in each mode of operation with minimized switching losses and minimized circulating energy (energy taken from the source, moved around the circuit and then fed back to the source), both as a standard-connection converter and as a series-connected converter, while taking advantage of the MOSFET's synchronous rectification capabilities to reduce conduction losses.

Various objects, advantages and benefits of the invention will become apparent from the following detailed description of the invention taken in conjunction with the accompanying drawings.

Figure 10:
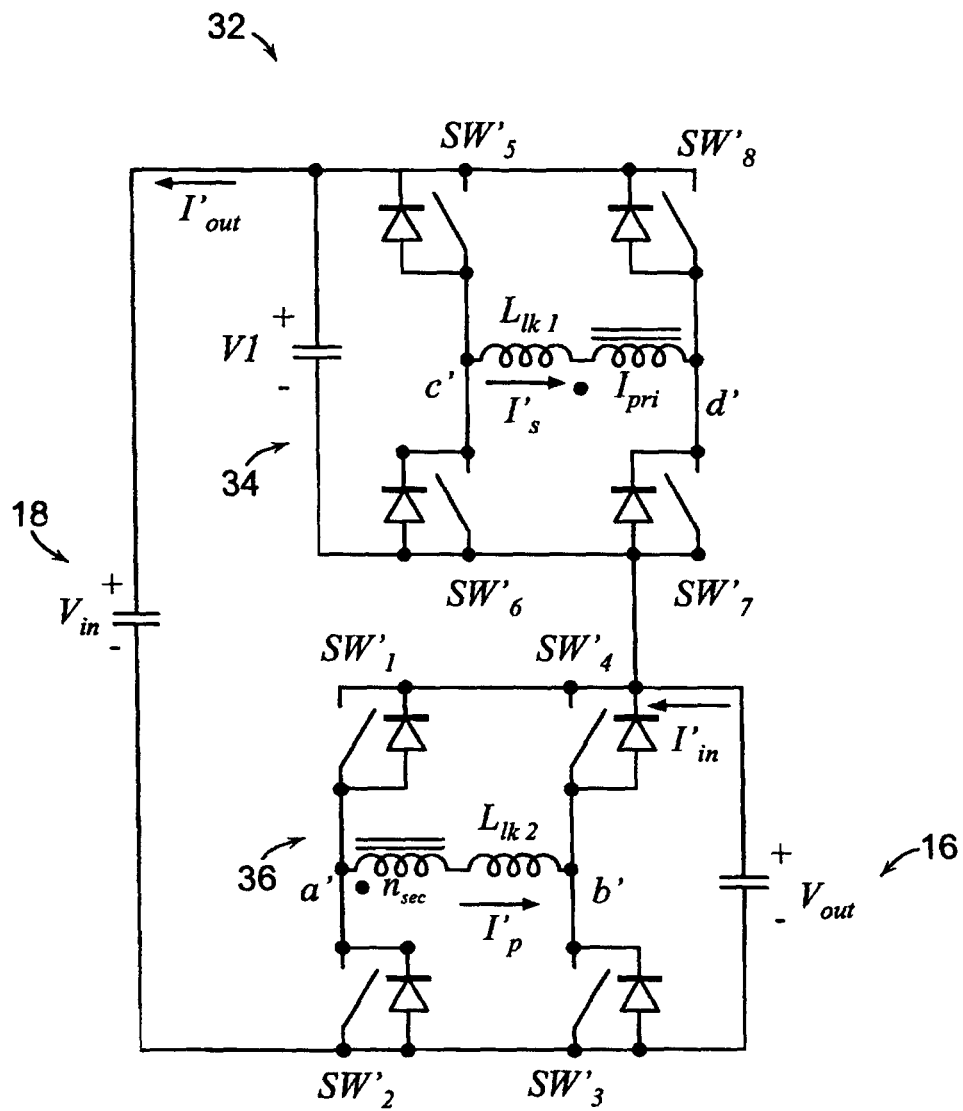
FIG. 10 is an electrical circuit depicting the series-connected dual active bridge (DAB) bidirectional DC to DC converter of FIGS. 5 and 6 used for reverse direction power flow as in FIG. 9.

6, and a fifth main operating region in the Reverse M-RMS mode of operation for the converter of FIG. 10 according to the modulation control scheme of the present invention.

Figure 6:
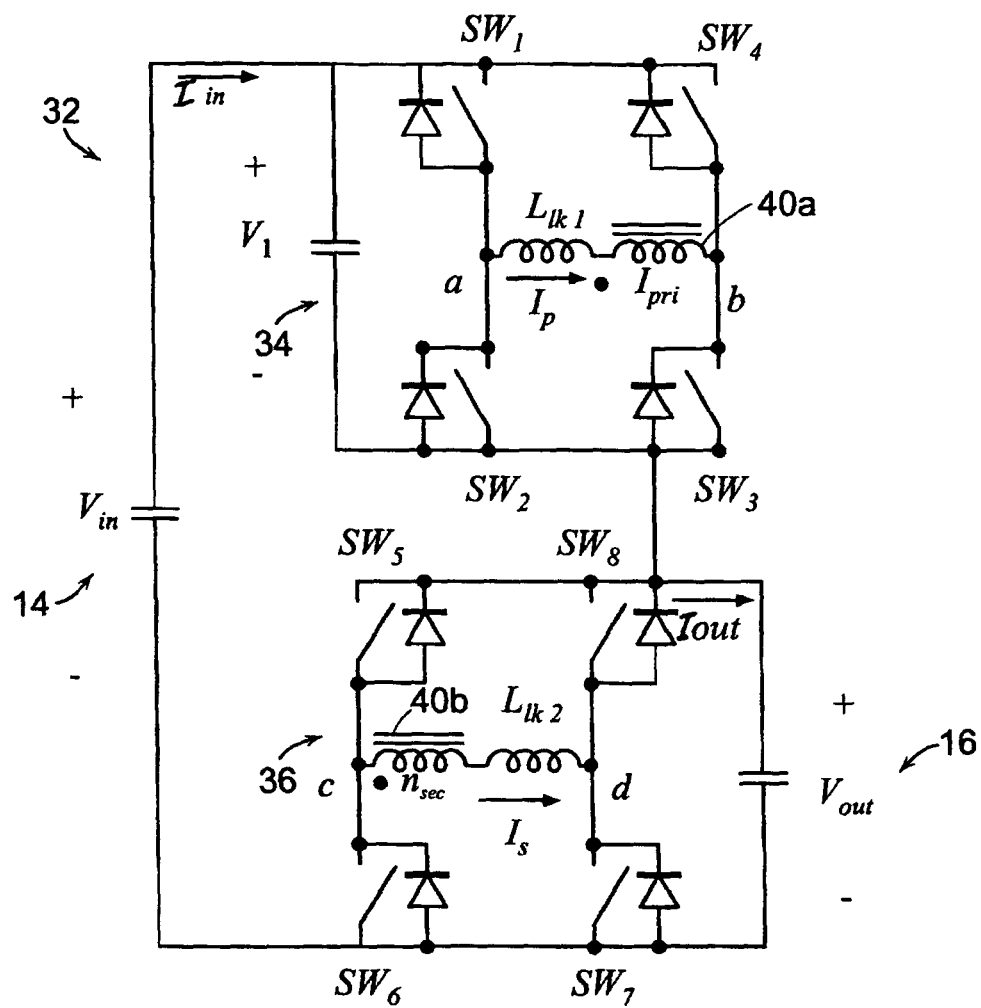
FIG. 6 is an electrical circuit depicting the series-connected dual active bridge (DAB) bidirectional DC to DC converter used for forward direction power flow in the charge controller of FIG. 5.
Figure 11:
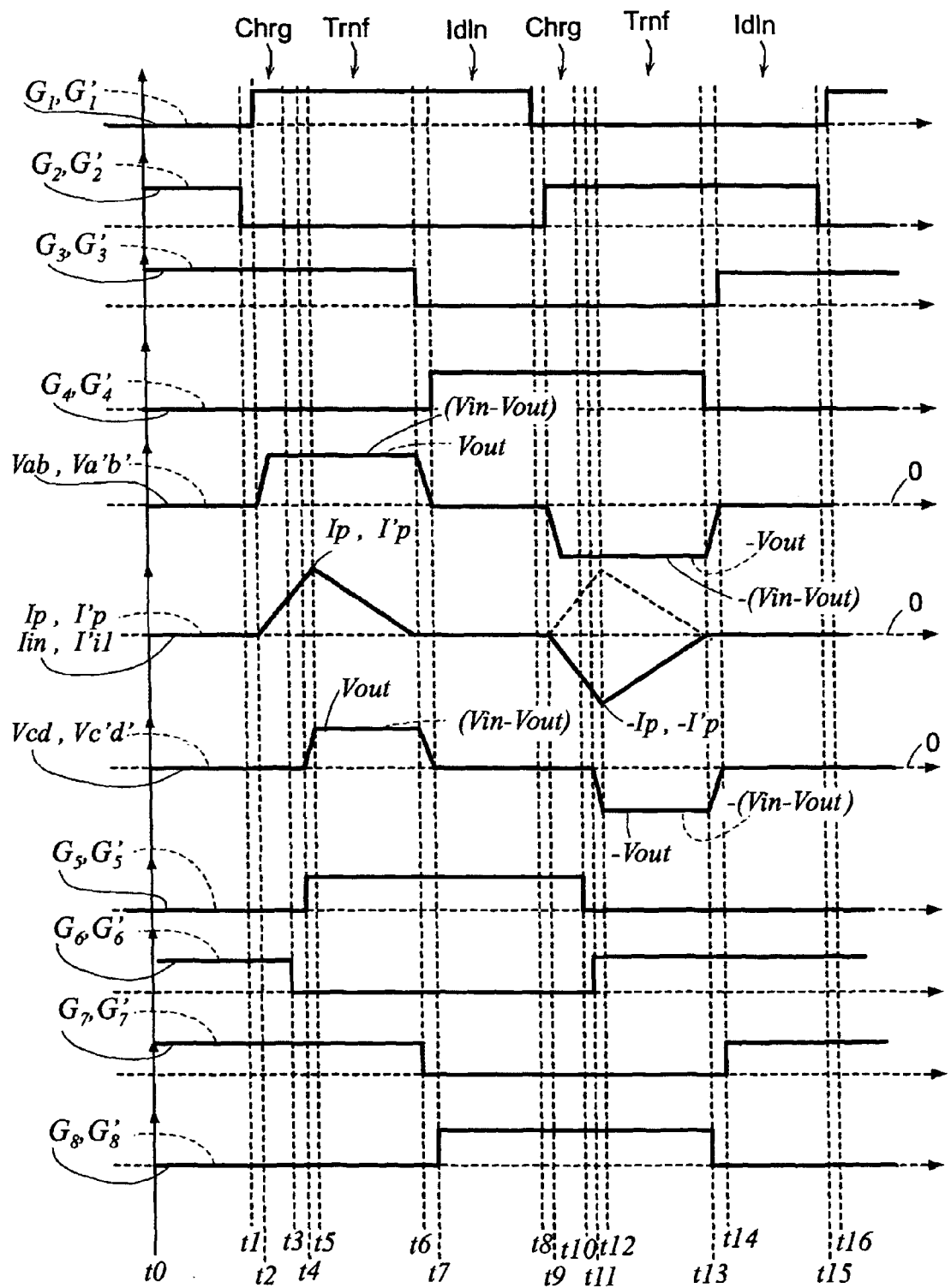
FIG. 11 is a graph showing waveforms for the gate signals applied to the switches in the primary and secondary bridges, the voltages across the primary and secondary bridges, and the transformer primary current (input current) associated with a first case or first main operating region in a forward direction power flow minimum root mean square current (Forward M-RMS) mode of operation for the converter of FIG. 6, and a first case or first main operating region in a reverse direction power flow minimum root mean square current (Reverse M-RMS) mode of operation for the converter of FIG. 10 according to the modulation control scheme of the present invention.
Figure 29:
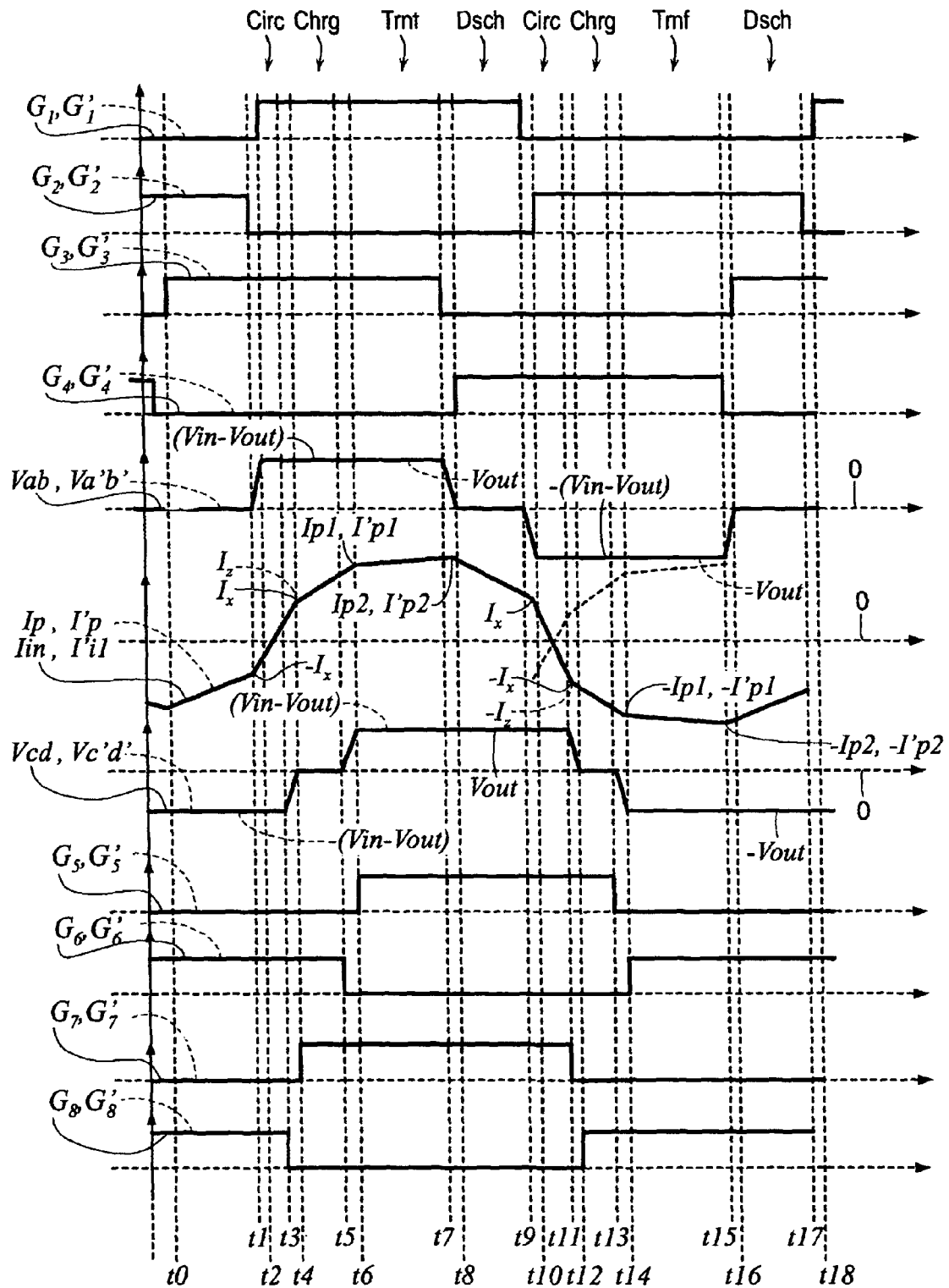

FIG. 29 is a graph showing waveforms for the same elements as in FIG. 11 but for a sixth main operating region in the Forward F-ZVS mode of operation for the converter of FIG. 6, and a sixth main operating region in the Reverse F-ZVS mode of operation for the converter of FIG. 10 according to the modulation control scheme of the present invention.

Figure 30:
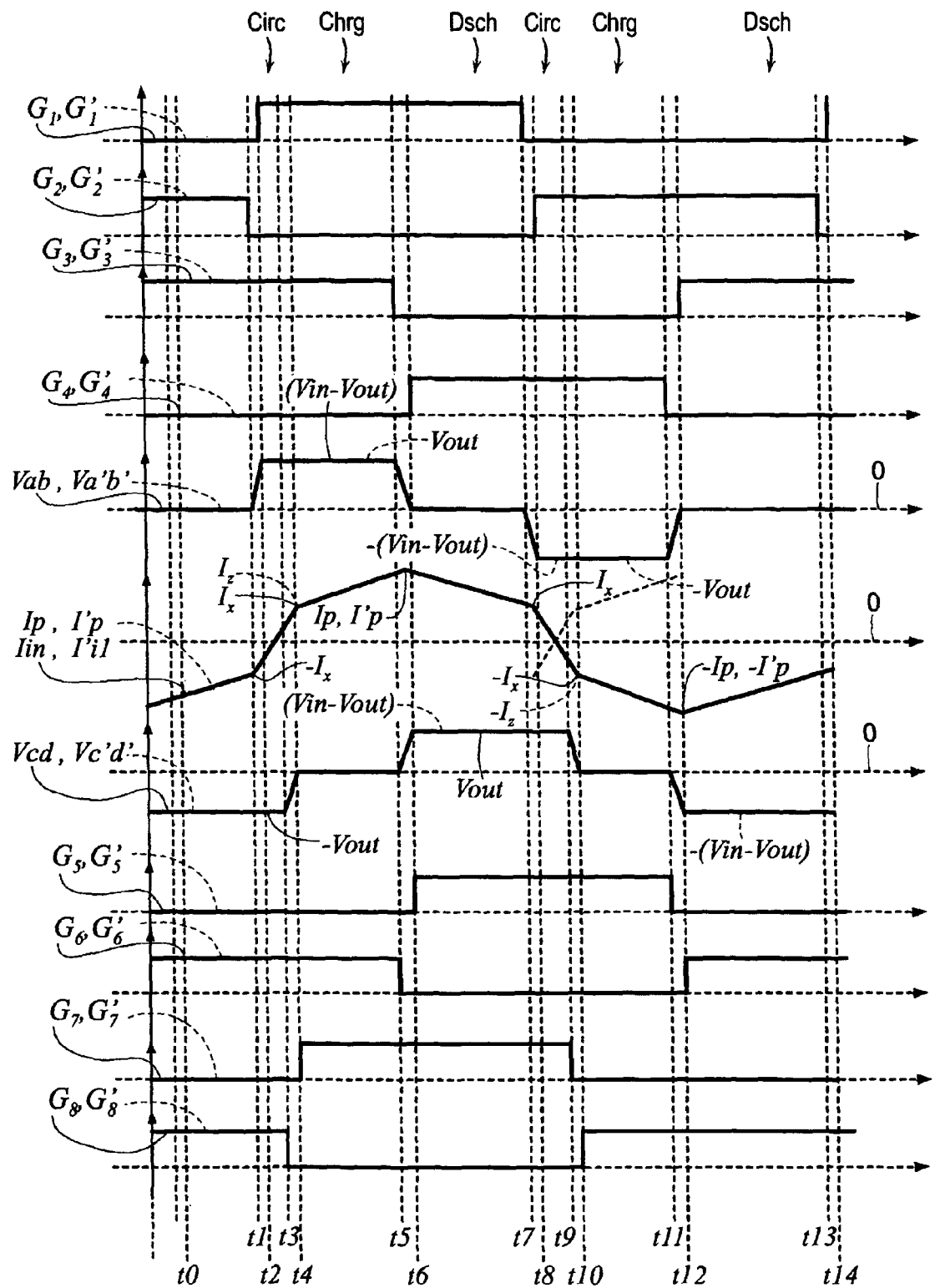

FIG. 30 is a graph illustrating waveforms for the same elements as in FIG. 11 but for a sixth transition or border operating region in the Forward F-ZVS mode of operation for the converter of FIG. 6, and a sixth transition or border operating region in the Reverse F-ZVS mode of operation for the converter of FIG. 10 according to the modulation control scheme of the present invention.

Figure 31:
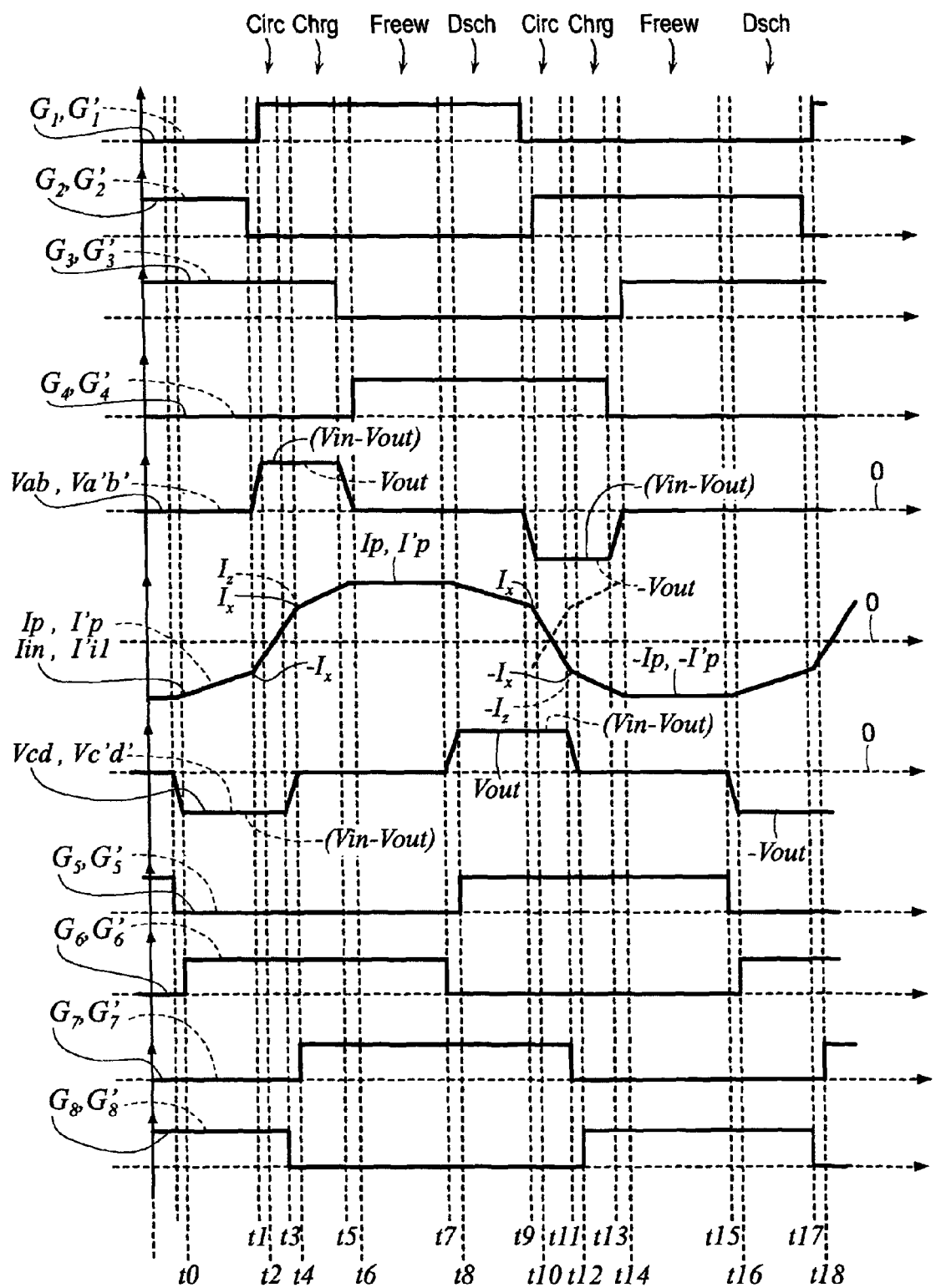

FIG. 31 is a graph showing waveforms for the same elements as in FIG. 11 but for a seventh main operating region in the Forward F-ZVS mode of operation for the converter of FIG. 6, and a seventh main operating region in the Reverse F-ZVS mode of operation for the converter of FIG. 10 according to the modulation control scheme of the present invention.

Figure 32:
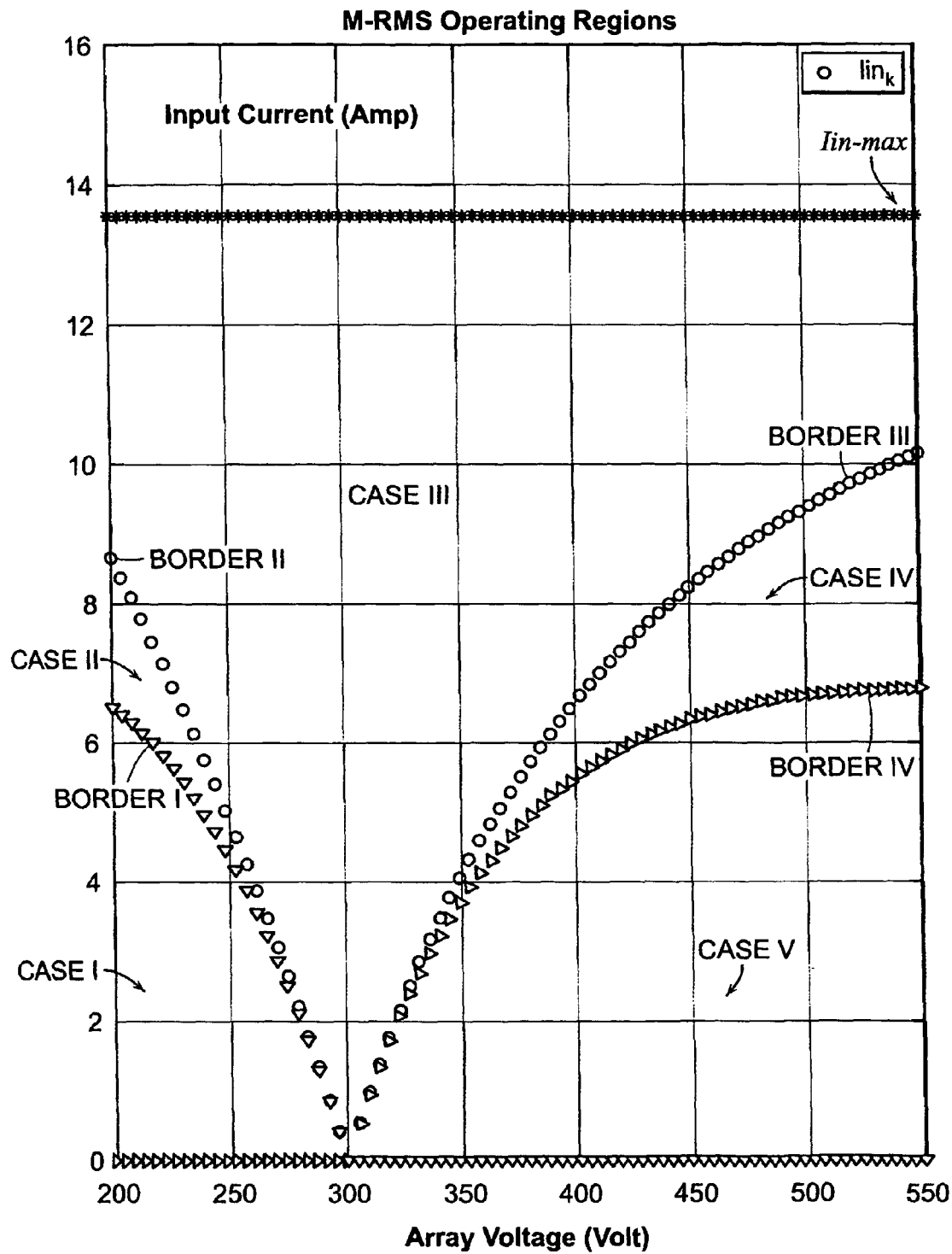

FIG. 32 is a graph of input current (Amp) and PV array voltage (Volt), indicating the five main operating regions and the four transition operating regions for the M-RMS modes of operation.

Figure 33:
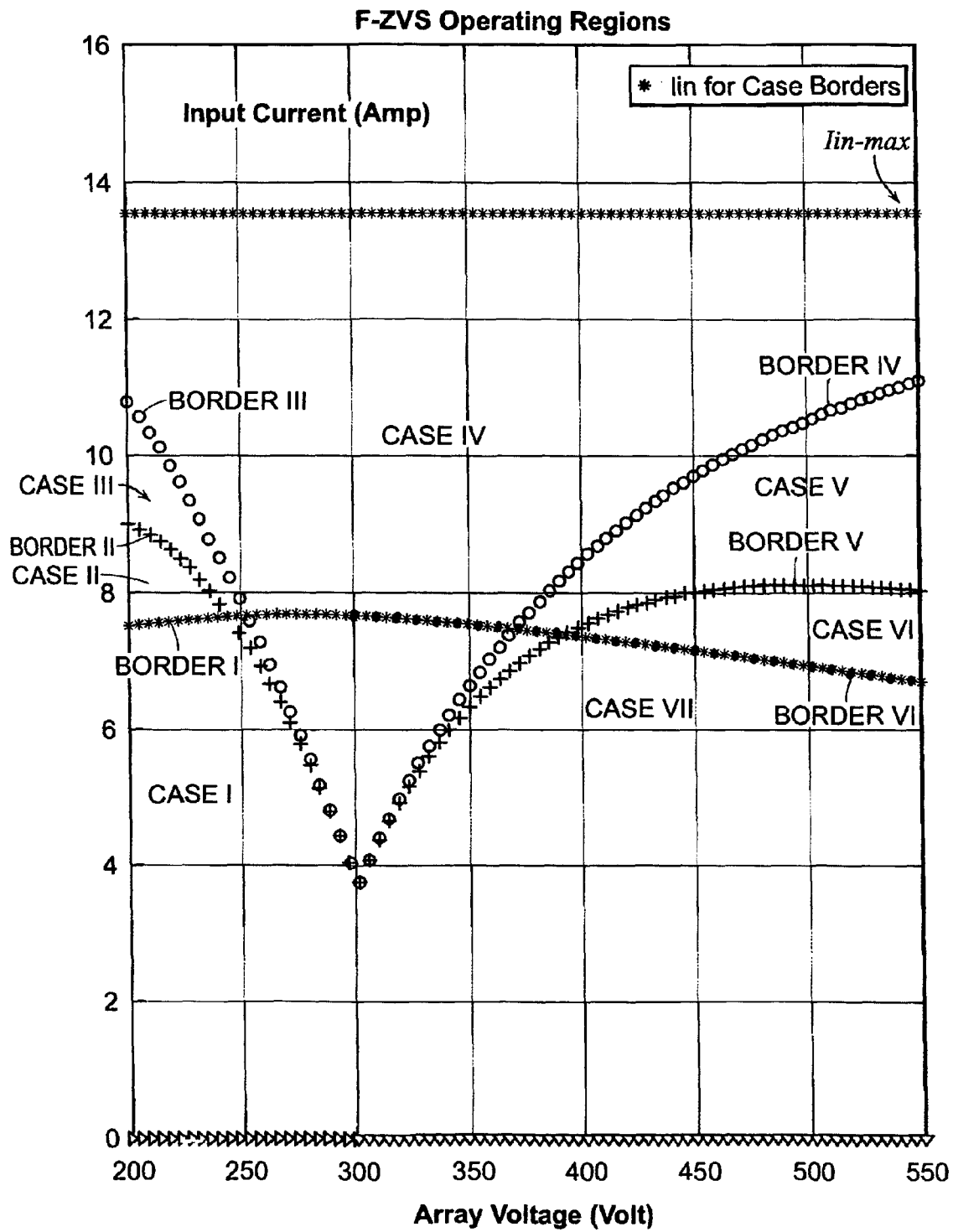

FIG. 33 is a graph of input current (Amp) and PV array voltage (Volt) indicating the seven main operating regions and the six transition operating regions for the F-ZVS modes of operation.

Figure 34:
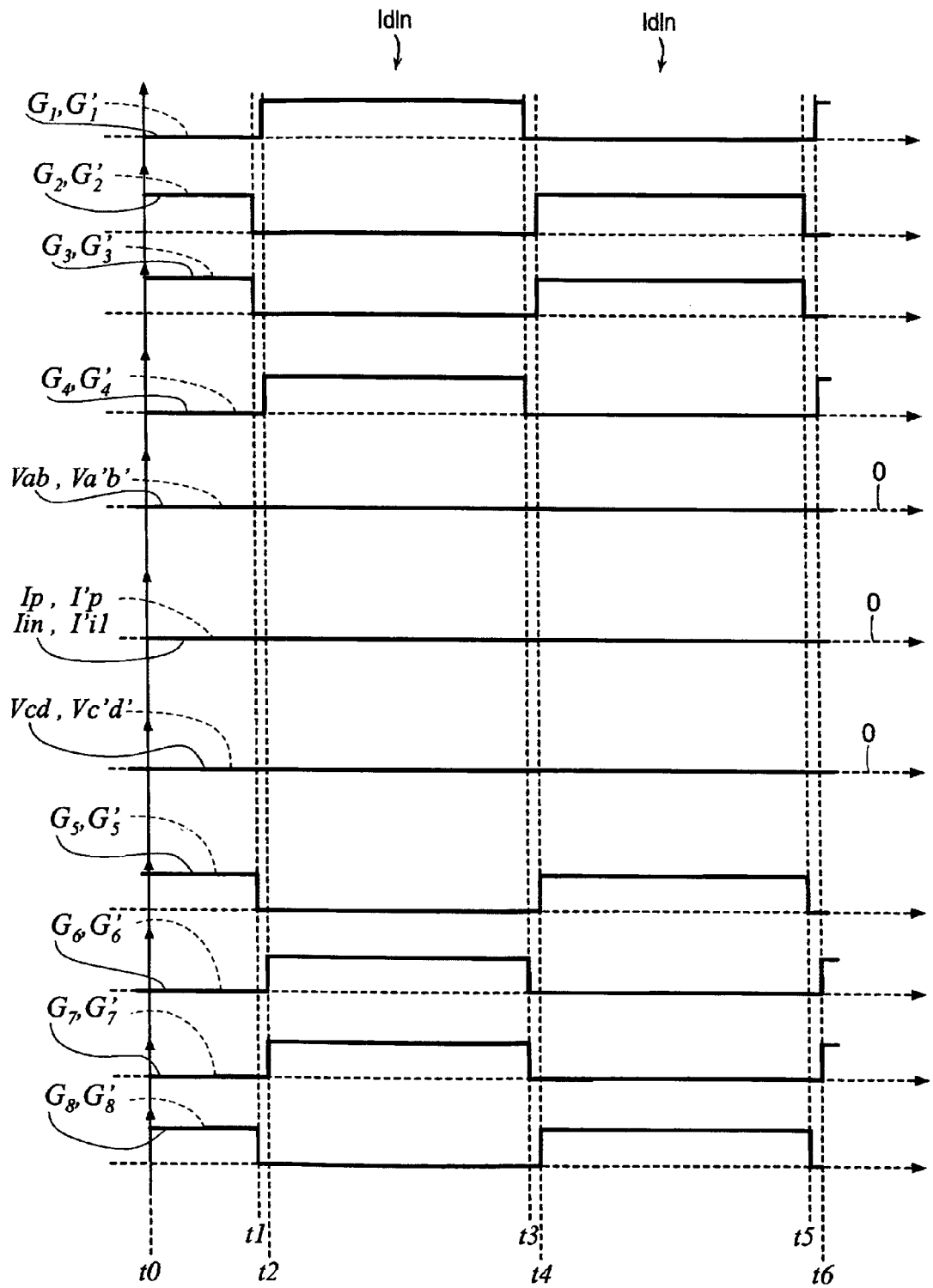

FIG. 34 is a graph showing waveforms for the same elements as in FIG. 11 but for an Idling M-RMS mode of operation for the converter.

Figure 35:
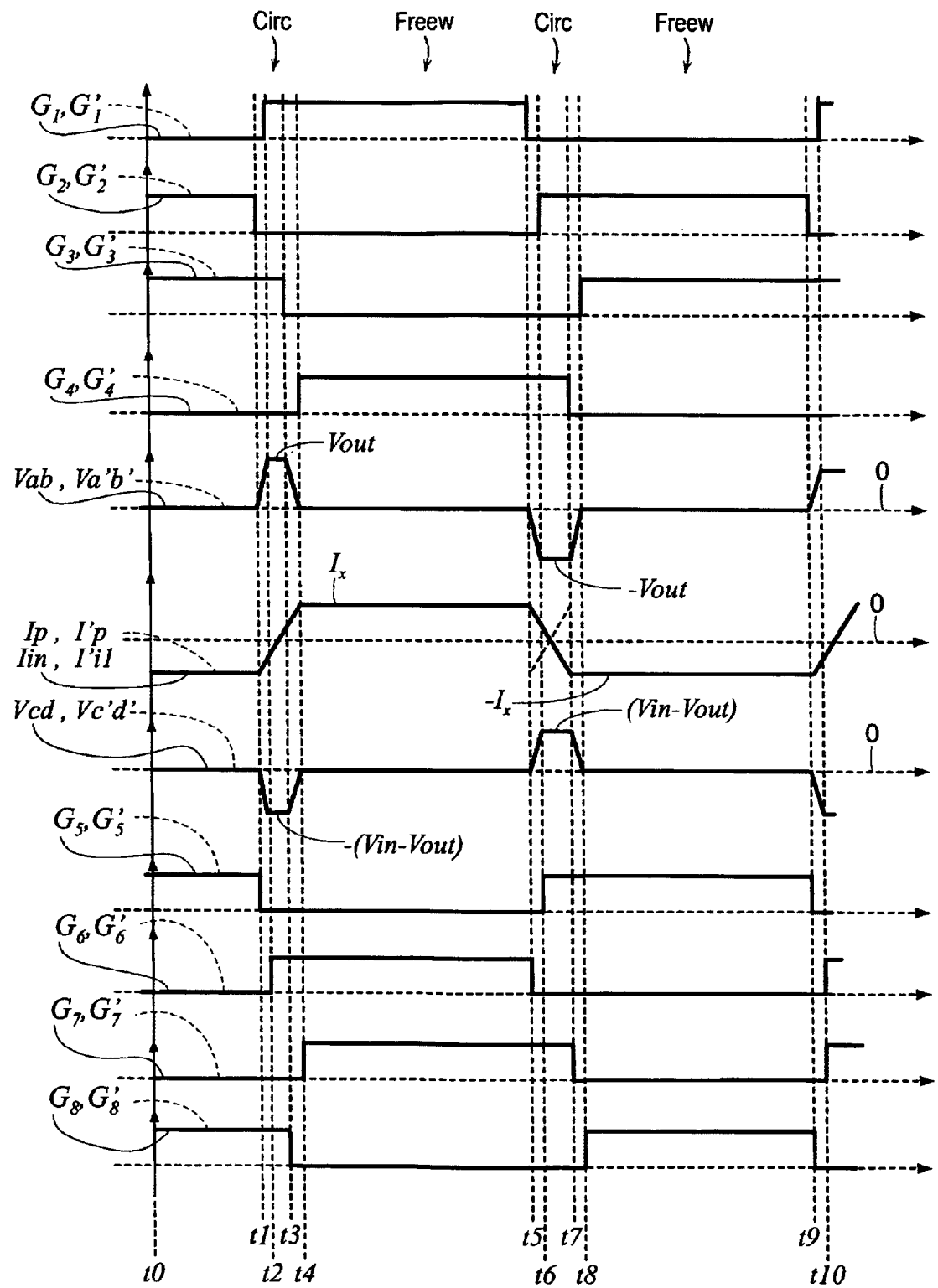

FIG. 35 is a graph showing waveforms for the same elements as in FIG. 11 but for a Freewheeling F-ZVS mode of operation for the converter.

DETAILED DESCRIPTION OF THE INVENTION

Figure 1:
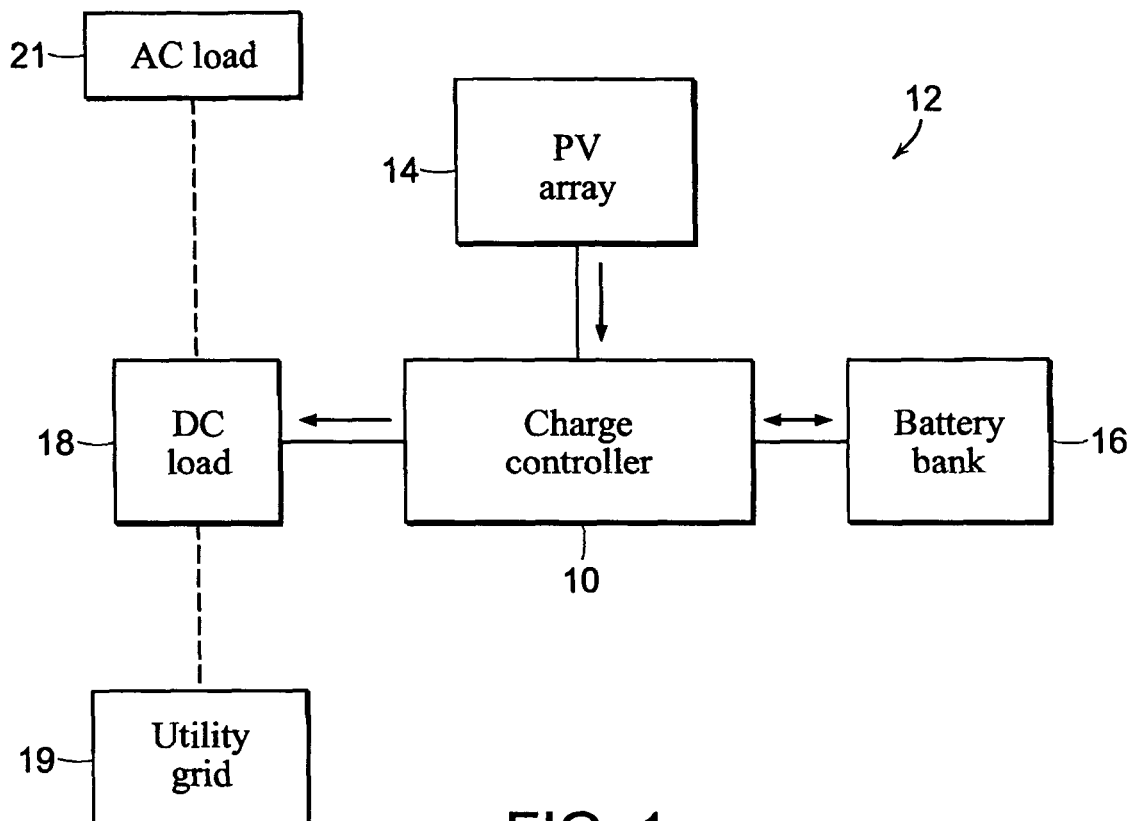
FIG. 1 is a diagram of a photovoltaic (PV) system having a high voltage (HV) bidirectional maximum power point tracking (MPPT) charge controller.

A high voltage (HV) bidirectional maximum power point tracking (MPPT) charge controller 10 is illustrated diagrammatically in FIG. 1 incorporated in a photovoltaic (PV) system 12 as disclosed in the co-pending prior U.S. patent application Ser. No. 12/896,427 previously incorporated herein by reference. The PV system 12 comprises a high voltage (HV) photovoltaic array 14 including one or more photovoltaic modules or panels, a battery bank 16 including one or more batteries, a high voltage DC load 18, and the high voltage bidirectional maximum power point tracking charge controller 10 electrically connected to the PV array 14, the battery bank 16 and the DC load 18. The high voltage DC load 18 may include an on-grid or grid-connected inverter for converting direct current (DC) electrical energy into alternating current (AC) electrical energy suitable for being supplied or fed into a public utility grid 19 connected to the on-grid inverter, as in the case where the PV system 12 is a grid-connected PV system. When the PV system 12 is a grid-connected system, the PV array 14 is normally a high voltage PV array, i.e. up to 600V, for compatibility with conventional on-grid inverters. When the DC load 18 is or includes an inverter, the inverter may be connected to an AC end load 21, which may include various conventional AC electrical appliances and devices. In this way, electrical power produced by the PV system 12 can be used first to operate any connected AC end load 21, and the excess power not consumed by the AC end load 21 can then be supplied to the utility grid 19. The AC electrical power output from the on-grid inverter can be supplied to the utility grid 19 and/or connected AC end load 21 by connecting the inverter output to an electrical distribution panel as typically found in residential, commercial, business and/or other types of buildings or structures.

The PV modules of the PV array 14 are composed of photovoltaic cells capable of converting solar energy into direct current electrical energy. The battery bank 16 is capable of storing the DC electrical energy produced by the PV array 14, and the MPPT charge controller 10 controls charging of the battery bank 16 with the electrical energy produced by the PV array 14. During battery charging, the MPPT charge controller 10 receives input voltage from the PV array 14, and output voltage from the MPPT charge controller 10 is supplied to the battery bank 16. The electrical energy produced by the PV array 14 and stored in the battery bank 16 is available to power the DC load 18. The MPPT charge controller 10 also controls the transmission of DC electrical energy from the battery bank 16 to the DC load 18 as explained further below. Accordingly, the MPPT charge controller 10 may be referred to as "bidirectional" since it can operate in a first or forward direction of power flow to deliver DC electrical energy to the battery bank 16 from the PV array 14 and can operate in a second or reverse direction of power flow to deliver DC electrical energy from the battery bank 16 to the high voltage DC load 18.

The maximum power voltage ($V_{mp}$) of the PV array 14 is the voltage where the product of current and voltage (amps× volts) is greatest, and it varies with operating conditions including weather, sunlight intensity, shading and photovoltaic cell temperature. The MPPT charge controller 10 employs maximum power point tracking to manage the disparity between the output voltage of the PV array 14 and the voltage required to charge the battery bank 16. The MPPT charge controller 10 operates a maximum power point tracking algorithm to identify and track the maximum power voltage $V_{mp}$ of the PV array 14, even as the maximum power voltage $V_{mp}$ changes with operating conditions, and utilizes power electronics to adjust the ratio between the maximum power voltage $V_{mp}$ and the current delivered to the battery bank 16 in order to match what the battery bank requires while protecting the battery from overcharge. The maximum power point tracking algorithm, which is fully automatic, tracks the maximum power voltage $V_{mp}$ as it varies and ensures that maximum power is harvested from the PV array 14 throughout the course of each day. Any appropriate MPPT algorithm may be used in the MPPT charge controller 10 to effectuate maximum power point tracking of the PV array, including the MPPT algorithms used in the MPPT photovoltaic charge controllers developed by Morningstar Corporation, Newtown, Pa.

The power electronics used in the MPPT charge controller 10 receives the $V_{mp}$ from the PV array 14 as input and converts the $V_{mp}$ to battery voltage as output. In addition, the power electronics used in the MPPT charge controller 10 controls the transmission of DC electrical energy from the battery bank 16 to the DC load 18 by converting the DC electrical energy stored in the battery bank 16 to DC electrical energy of the appropriate voltage for the DC load 18. Where the DC load 18 is or includes a conventional on-grid inverter or other high voltage DC load, the charge controller 10 converts DC electricity from the battery bank 16 into DC electricity of sufficiently high voltage for the on-grid inverter or other high voltage DC load. As explained further below, a DC to DC converter in the charge controller 10 is designed as a series-connected dual active bridge (DAB) bidirectional isolated DC to DC converter having MOSFETs as the switches in each full bridge of the converter, and the modulation control scheme that is the subject of the present invention allows the dual active bridge DC to DC converter in the charge controller 10 to operate bidirectionally with minimum switching losses, minimum circulating energy and reduced conduction losses, in the manner of both a standard-connection DC to DC converter and a series-connected DC to DC converter.

Figure 2:
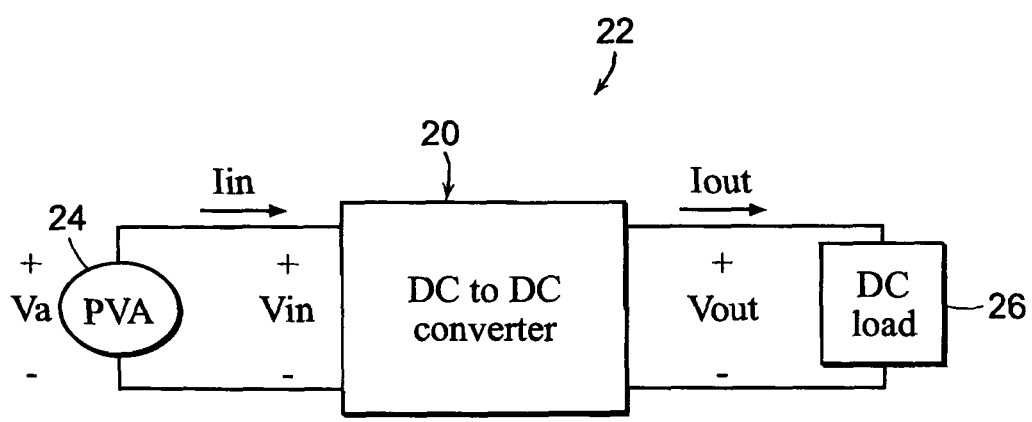
FIG. 2 is a diagram showing a photovoltaic array used to charge a DC load through a standard-connection DC to DC converter as known in the prior art.
Figure 3:
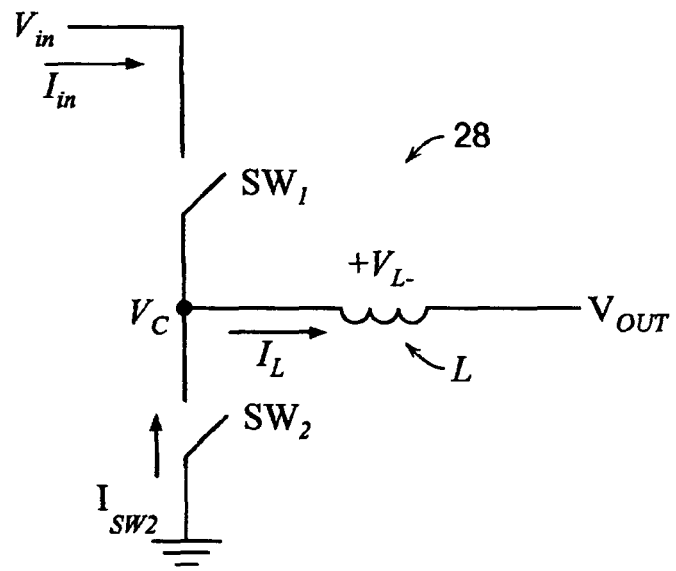
FIG. 3 is an electrical diagram of a basic prior art buck or step-down converter configuration as typically employed in the DC to DC converter of FIG. 2.

A photovoltaic system 22 having a standard-connection DC to DC converter 20 as known in the prior art is depicted diagrammatically in FIG. 2. FIG. 2 illustrates a PV array (PVA) 24 used to charge a DC load (e.g. battery bank) 26 through the DC to DC converter 20, which typically includes a "buck" or "step-down" converter configuration providing unidirectional power flow through the converter 20. When the voltage of the PV array 24 is higher than the voltage required to charge the battery bank 26 in the PV system 22 of FIG. 2, the buck or step-down converter configuration in the DC to DC converter 20 operates to buck or step-down the higher input voltage ($V_{in}$) received from the PV array 24 to the lower output voltage ($V_{out}$) required by the battery bank 26. A typical buck or step-down converter configuration 28 that may be employed in the converter 20 is depicted in basic form by the electrical diagram of FIG. 3. The buck or step-down converter configuration 28 essentially includes an inductor L and two complementary switches $SW_1$ and $SW_2$ to achieve unidirectional electrical power flow through the converter 20 from the converter input (PV array 24) to the converter output (DC load 26). The input voltage $V_{in}$ to the buck converter configuration 28 that is received from the PV array is oftentimes greater than the output voltage $V_{out}$ needed to charge the battery bank (DC load 26), hence $V_{in} > V_{out}$. Switch $SW_1$ is typically a controlled switch such as a MOSFET, and switch $SW_2$ is oftentimes an uncontrolled switch such as a discrete power diode. During a switching cycle, the switch $SW_1$ is turned "on" for a time duration and is then turned "off" for a time duration. The buck converter configuration 28 alternates between connecting the inductor L to the input voltage $V_{in}$ from the PV array to store energy in the inductor L and connecting the inductor L to ground to discharge the stored energy as the output voltage $V_{out}$ from the buck converter configuration 28 into the battery bank.

When the switch $SW_1$ is turned on, the inductor L is connected to the input voltage $V_{in}$ and the switch $SW_2$ becomes reverse biased or turned off, resulting in a positive voltage $V_L$ across the inductor equal to $V_{in} - V_{out}$ and an increase in the inductor current $I_L$. Furthermore, when the switch $SW_1$ is on, the input current $I_{in}$ is equal to the inductor current $I_L$, and the current $I_{SW2}$ across switch $SW_2$ is equal to zero. In this on state, energy is stored in the inductor L. When the switch $SW_1$ is turned off, inductor current $I_L$ continues to flow due to the inductor energy storage, resulting in a negative voltage $V_L$ across the inductor equal to $-V_{out}$. The inductor current now flows through the switch $SW_2$, which is forward biased or turned on, and current $I_L$ through the inductor decreases. The input current $I_{in}$ is now equal to zero and the current $I_{SW2}$ across switch $SW_2$ is equal to the inductor current $I_L$. In this off state, electrical energy continues to be delivered as output until the switch $SW_1$ is again turned on to begin another on-off switching sequence. If a high voltage PV array is used to supply $V_{in}$ to the DC to DC converter 20 depicted in FIG. 2, the converter 20 would be required to handle all the output power, as explained in the co-pending prior U.S. patent application Ser. No. 12/896,427 previously incorporated herein by reference.

Figure 4:
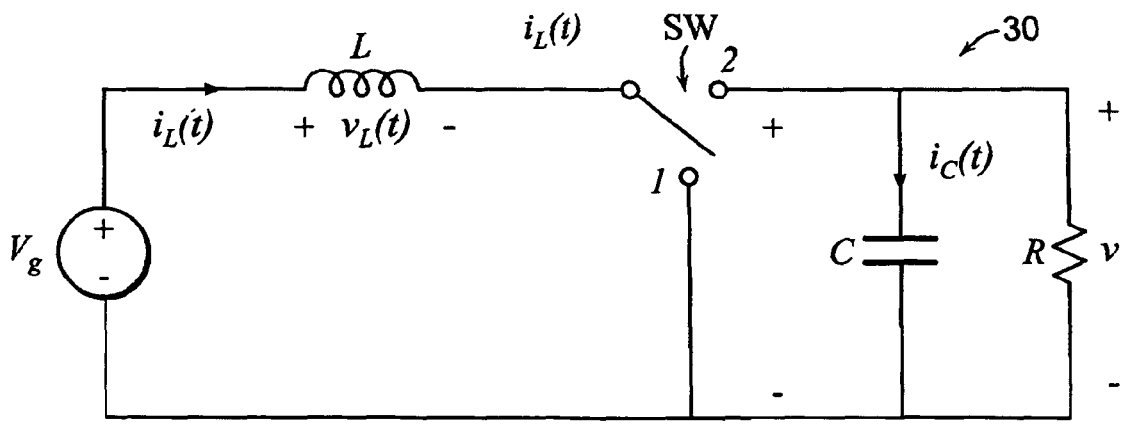
FIG. 4 is an electrical diagram illustrating an aspect of a prior art boost or step-up converter configuration as typically employed in DC to DC boost or step-up converters.

In addition to voltage stepping-down applications, DC to DC converters have been used to boost or step-up a lower input voltage to a higher output voltage, and these types of DC to DC converters are referred to as "boost" or "step-up" converters. FIG. 4 is an electrical diagram depicting an aspect of a standard boost or step-up converter configuration 30 as used in DC to DC boost converters and including switch SW, inductor L, capacitor C and resistor R. Electrical diagrams representing the flow of electrical current, the inductor voltage $V_L(t)$, the current $i_c(t)$ through the capacitor, the current $i_L(t)$ through the inductor, and the voltage v as a function of time t corresponding to position 1 and position 2 of switch SW in the boost converter configuration 30 are shown in the co-pending U.S. patent application Ser. No. 12/896,427 previously incorporated herein by reference.

Figure 5:
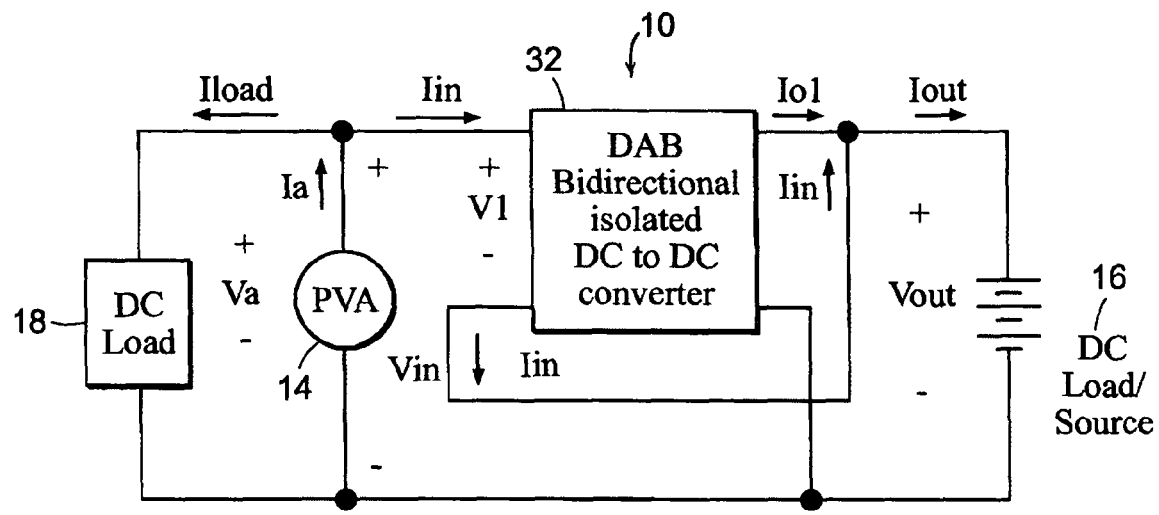
FIG. 5 is a diagram depicting a photovoltaic system having a high voltage (HV) bidirectional maximum power point tracking (MPPT) charge controller with a series-connected dual active bridge (DAB) bidirectional isolated DC to DC converter.
Figure 9:
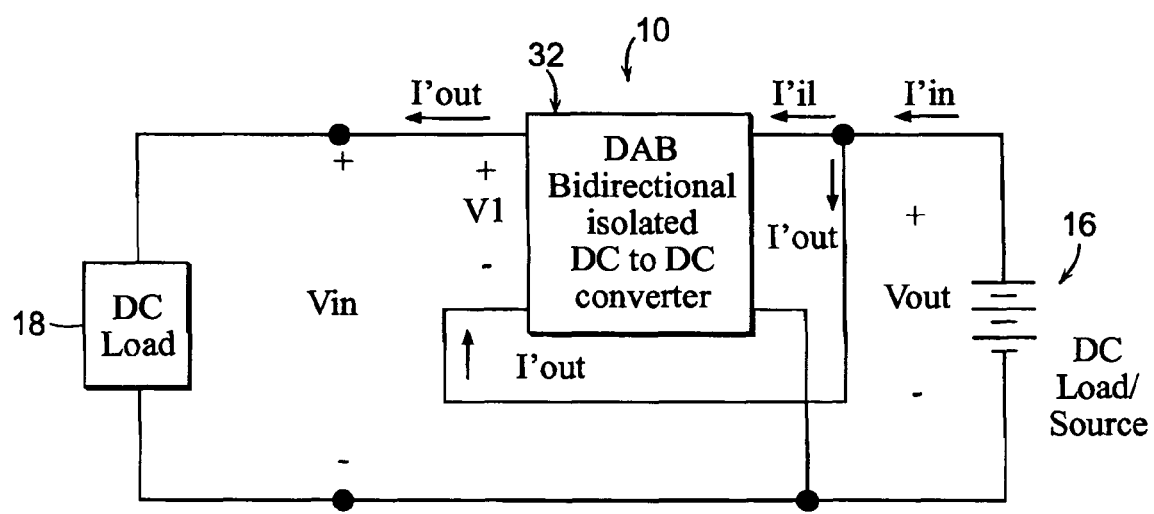
FIG. 9 is a diagram depicting the series-connected dual active bridge (DAB) bidirectional DC to DC converter of FIGS. 5 and 6 used for reverse direction power flow.

The high voltage bidirectional MPPT charge controller 10 used in the photovoltaic system 12 employs a series-connected dual active bridge (DAB) bidirectional isolated DC to DC converter 32 as illustrated herein in FIGS. 5, 6, 9 and 10 and described in the co-pending prior U.S. patent application Ser. No. 12/896,427 previously incorporated herein by reference. The dual active bridge (DAB) bidirectional isolated DC to DC converter 32 operates as a buck/step-down converter in a first or forward direction of power flow as illustrated in FIGS. 5 and 6 and as a boost/step-up converter in a second or reverse direction of power flow as illustrated in FIGS. 5, 9 and 10. The modulation control scheme of the present invention is intended primarily to maximize the efficiency of the series-connected bidirectional DC to DC converter 32. However, the modulation control scheme also applies to the situation where the dual active bridge bidirectional converter 32 is operated as a standard-connection converter as in FIG. 2. Accordingly, a general application for the modulation control scheme is for a DAB unidirectional DC to DC converter in a MPPT charge controller, and a more specific application is for a DAB bidirectional DC to DC converter in a bidirectional MPPT charge controller, particularly high voltage MPPT charge controllers.

Figure 7:
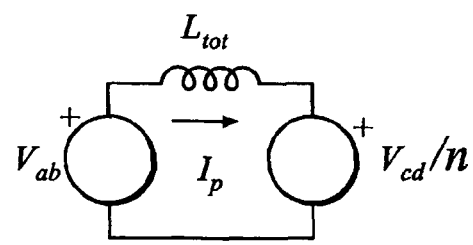
FIG. 7 is a simplified equivalent circuit demonstrating voltage differential applied across total leakage inductance in the converter of FIG. 6.

As seen in FIG. 6, which is representative of forward direction power flow, the dual active bridge (DAB) DC to DC converter 32 has a first, primary or input bridge 34 with switches $SW_1$, $SW_2$, $SW_3$ and $SW_4$, a second, secondary or output bridge 36 with switches $SW_5$, $SW_6$, $SW_7$ and $SW_8$, and a high frequency transformer, indicated by transformer primary 40a and transformer secondary 40b, electrically connecting the bridges 34 and 36. The transformer primary 40a and the leakage inductance $L_{lk1}$ of the primary side (pri) are located between nodes a and b in the first bridge 34. The transformer secondary 40b and the leakage inductance $L_{lk2}$ of the secondary side (sec) are located between nodes c and d in the second bridge 36. The transformer has a known turn ratio n. Switches $SW_1$ and $SW_2$ are on a first leg, and switches $SW_3$ and $SW_4$ are on a second leg in the first bridge 34. Switches $SW_1$ and $SW_3$ are diagonal to each other, and switches $SW_2$ and $SW_4$ are diagonal to each other. Switches $SW_5$ and $SW_6$ are on a first leg, and switches $SW_7$ and $SW_8$ are on a second leg in the second bridge 36. Switches $SW_5$ and $SW_7$ are diagonal to each other, and switches $SW_6$ and $SW_8$ are diagonal to each other. Each switch $SW_1$, $SW_2$, $SW_3$ $SW_4$, $SW_5$, $SW_6$, $SW_7$ and $SW_8$ is implemented as a MOSFET (metal oxide semiconductor field effect transistor). FIG. 7 is a simplified equivalent circuit demonstrating voltage differential $V_{ab} - V_{cd}/n$ applied across total leakage inductance $L_{tot}$ in the converter 32 and which determines the slope of the transformer's primary current $I_p$. The voltage $V_{ab}$ represents the bridge voltage for bridge 34, i.e. the voltage across nodes a and b. The voltage $V_{cd}$ represents the bridge voltage for bridge 36, i.e. the voltage across nodes c and d. As pointed out above, n is the transformer's turn ratio. The voltage difference may also be expressed in terms of V1 and $V_{out}/n$.

Figure 8:
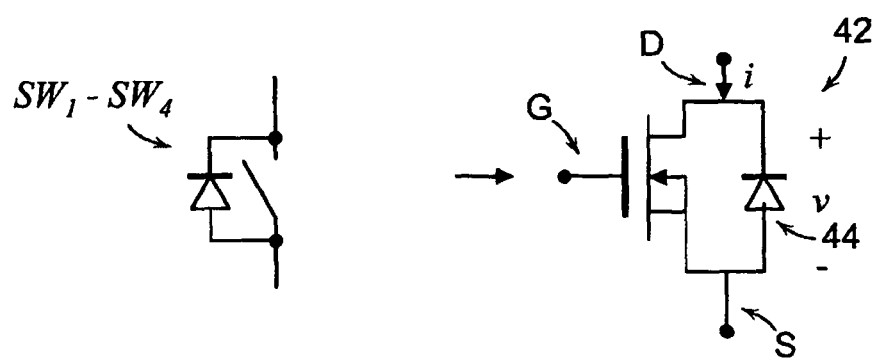
FIG. 8 is a diagram representing the use of MOSFETs as the switches in the bridges of the converter of FIG. 6.

FIG. 8 is a general depiction of a typical MOSFET 42 that may be used as each switch $SW_1$, $SW_2$, $SW_3$ and $SW_4$ in bridge 34 of the converter 32. Each switch $SW_5$, $SW_6$, $SW_7$ and $SW_8$ in bridge 36 of the converter 32 is also implemented as a MOSFET. In general principle, a MOSFET is based on the modulation of charge concentration by a metal oxide semiconductor capacitance between a body electrode and a gate electrode that is insulated by a gate dielectric layer composed of an oxide, such as silicon dioxide. The MOSFET 42 includes terminals for the gate G, the source S and the drain D of the transistor. The source S and drain D are each connected to individual, highly doped regions that are separated by a body region. The MOSFET 42 characteristically has an inherent, intrinsic, or integral anti-parallel parasitic body diode 44 between the drain D and the source S, making it able to block current in only one direction (unipolar). All power MOSFETs, which are capable of sustaining both high blocking voltage and high current, have this parasitic anti-parallel body diode. When sufficient voltage, i.e. gate or switching signal, is applied to the gate electrode G via a gate drive, the corresponding switch is turned "on" and current is conducted through it. Termination of the gate or switching signal results in the corresponding switch being turned "off."

The modulation control scheme of the present invention controls power flow through the dual active bridge (DAB) DC to DC converter 32 by controlling the gate or switching signals that turn the switches $SW_1$-$SW_8$ on and off in order to control the voltage and current waveforms generated in the converter 32 and, therefore, to control the electrical output from the converter 32. The modulation control scheme may be implemented in a programmable logic device having a control algorithm to execute the control modulation scheme. A digital signal processor can be used to provide parameters to the control algorithm based on system conditions detected and monitored by the controller so that the control algorithm executes the control modulation scheme in order to achieve a desired power output from the converter 32. Based on system conditions and/or programming, the control algorithm calculates required duty cycles for the converter 32, resulting in the appropriate switching signals being applied to the switches $SW_1$-$SW_8$ in order to adjust the voltage and current waveforms as needed.

In order to minimize conduction and switching losses, the modulation control scheme is capable of operating the dual active bridge (DAB) DC to DC converter 32 in a minimum root mean square current (M-RMS) mode of operation that minimizes conduction losses and a full zero-voltage switching (F-ZVS) mode of operation that minimizes switching losses. The modulation control scheme allows the converter 32 to be operated for forward direction and reverse direction power flow in each mode of operation. Hence, the M-RMS mode of operation encompasses a forward direction power flow M-RMS (Forward M-RMS) mode of operation and a reverse direction power flow M-RMS (Reverse M-RMS) mode of operation. Likewise, the F-ZVS mode of operation encompasses a forward direction power flow F-ZVS (Forward F-ZVS) mode of operation and a reverse direction power flow F-ZVS (Reverse F-ZVS) mode of operation. However, it should be appreciated that the modulation control scheme can be used to operate the converter for power flow in one direction only.

In the M-RMS mode of operation, the converter's operating range is divided into five different cases or main operating regions as well as transition or border operating regions between adjacent cases or main operating regions. The division is based on parameters including power level, value of voltage differential, minimization of RMS (root mean square) current values and the inclusion of both "soft" switching and synchronous rectification actions, when suitable, as well as the inclusion of the smooth transition or border operating regions between adjacent main operating regions to avoid discontinuities in the converter's transfer characteristics and to allow for straightforward, smooth control implementation. The main and transition operating regions for the M-RMS mode of operation are indicated in the graph of FIG. 32. In the M-RMS mode of operation, there is one single solution or set of gate signals for each operating point.

The five different cases or main operating regions in the Forward M-RMS mode of operation are: Case I (first main) Forward M-RMS operating region, Case II (second main) Forward M-RMS operating region, Case III (third main) Forward M-RMS operating region, Case IV (fourth main) Forward M-RMS operating region, and Case V (fifth main) Forward M-RMS operating region. The transition or border operating regions in the Forward M-RMS mode of operation are: first transition Forward M-RMS operating region between the Case I Forward M-RMS and Case II Forward M-RMS operating regions, second transition Forward M-RMS operating region between the Case II Forward M-RMS and Case III Forward M-RMS operating regions, third transition Forward M-RMS operating region between the Case III Forward M-RMS and Case IV Forward M-RMS operating regions, and fourth transition Forward M-RMS operating region between the Case IV Forward M-RMS and Case V Forward M-RMS operating regions.

In the F-ZVS mode of operation, the converter's operating range is divided into seven different cases or main operating regions as well as transition or border operating regions between adjacent cases or main operating regions based on one or more of the aforementioned parameters. The main and transition operating regions for the F-ZVS mode of operation are indicated in the graph of FIG. 33. In the F-ZVS mode of operation, there are multiple solutions or sets of gate signals for operating points in portions of the main operating regions as can be deduced from the overlapping of several main and transition operating regions.

The seven different cases or main operating regions in the Forward F-ZVS mode of operation are: Case I (first main) Forward F-ZVS operating region, Case II (second main) Forward F-ZVS operating region, Case III (third main) Forward F-ZVS operating region, Case IV (fourth main) Forward F-ZVS operating region, Case V (fifth main) Forward F-ZVS operating region, Case VI (sixth main) Forward F-ZVS operating region, and Case VII (seventh main) Forward F-ZVS operating region. The transition or border operating regions in the Forward F-ZVS mode of operation are: first transition Forward F-ZVS operating region between the Case I Forward F-ZVS and Case II Forward F-ZVS operating regions, second transition Forward F-ZVS operating region between the Case II Forward F-ZVS and Case III Forward F-ZVS operating regions, third transition Forward F-ZVS operating region between the Case III Forward F-ZVS and Case IV Forward F-ZVS operating regions, fourth transition Forward F-ZVS operating region between the Case IV Forward F-ZVS and Case V Forward F-ZVS operating regions, fifth transition Forward F-ZVS operating region between the Case V Forward F-ZVS and Case VI Forward F-ZVS operating regions and sixth transition Forward F-ZVS operating region between the Case VI Forward F-ZVS and Case VII Forward F-ZVS operating regions.

As explained further below, the voltage differential that guides the different Cases and the transition operating regions in the Forward M-RMS and the Forward F-ZVS modes of operation is the voltage differential $V1-V_{out}/n$.

The graph of FIG. 11 shows, from top to bottom, waveforms for the gate voltages or switching signals applied in accordance with the modulation control scheme to gates $G_1$, $G_2$, $G_3$ and $G_4$ corresponding to switches $SW_1$, $SW_2$, $SW_3$ and $SW_4$, respectively, the bridge voltage $V_{ab}$, the transformer's primary current $I_p$ ($I_{in}$), the bridge voltage $V_{cd}$, and the gate voltages or switching signals applied in accordance with the modulation control scheme to gates $G_5$, $G_6$, $G_7$ and $G_8$ corresponding to switches $SW_5$, $SW_6$, $SW_7$ and $SW_8$, respectively, when the converter 32 is operated in the Case I Forward M-RMS operating region. The waveforms for the switching signals applied to gates $G_1$-$G_8$ represent on and off switching actions (frequency) for the corresponding switches $SW_1$-$SW_8$, respectively. When no switching signal or gate voltage is being applied at a gate, i.e. when the associated switching signal or gate voltage waveform is on the dotted line zero axis, the corresponding switch is in the "off" state. When a switching signal or gate voltage is being applied at a gate, i.e. when the associated switching signal or gate voltage waveform is above the dotted line zero axis, the corresponding switch is in the "on" state.

Figure 12:
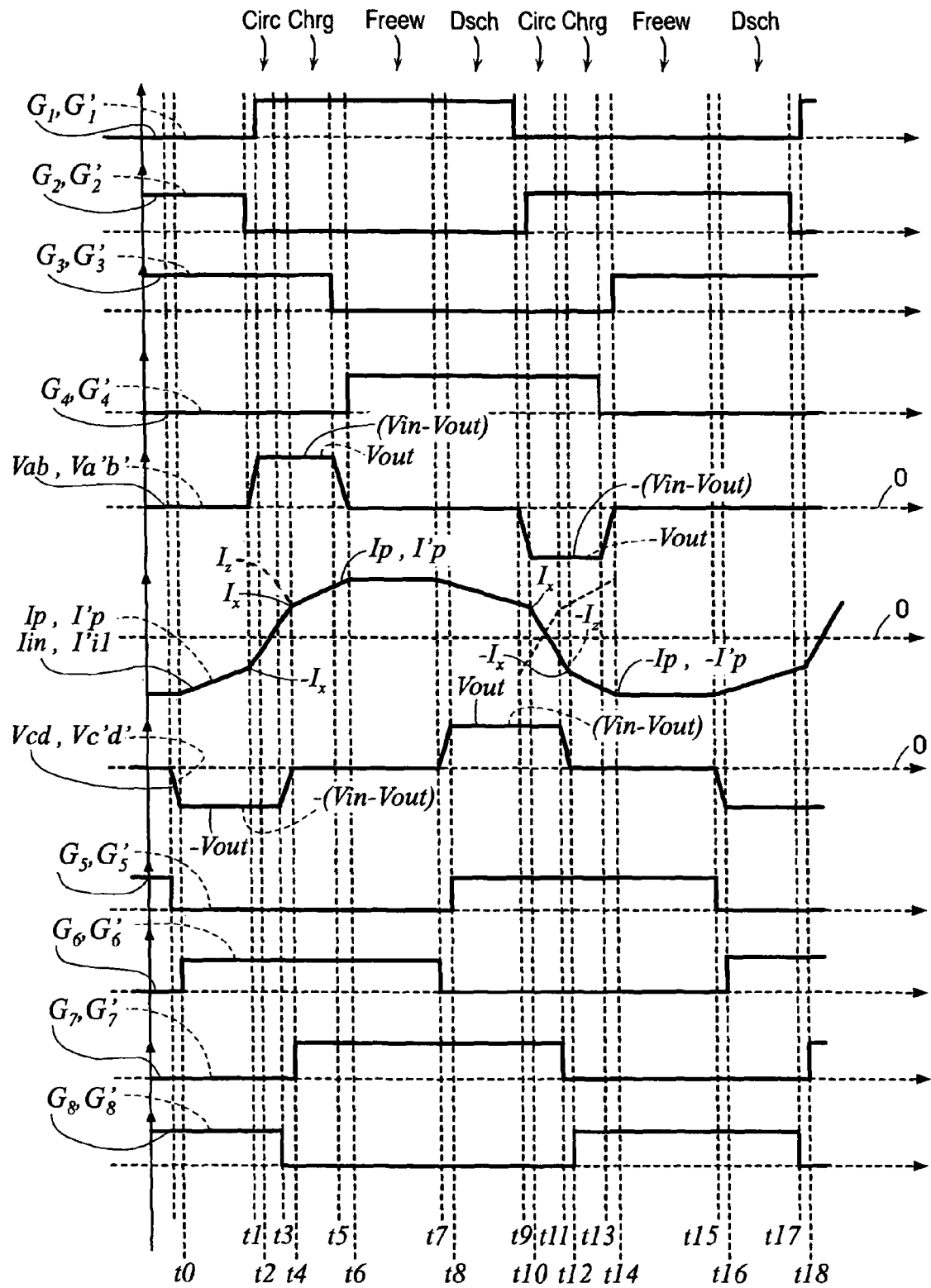
FIG. 12 is a graph showing waveforms for the same elements as in FIG. 11 but for a first case or first main operating region in a forward direction power flow full zero-voltage switching (Forward F-ZVS) mode of operation for the converter of FIG. 6, and a first case or first main operating region in a reverse direction power flow full zero-voltage switching (Reverse F-ZVS) mode of operation for the converter of FIG. 10 according to the modulation control scheme of the present invention.
Figure 13:
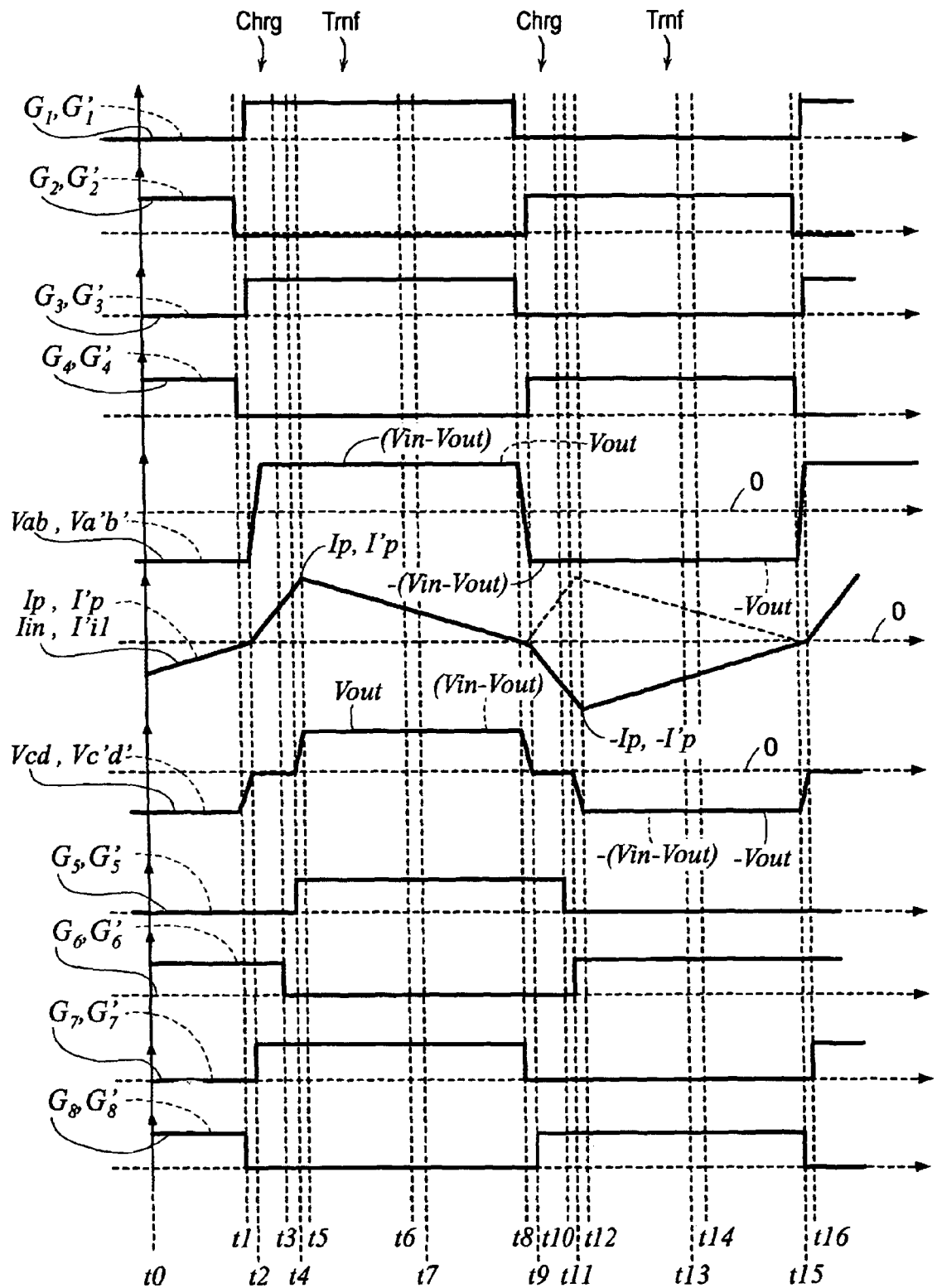
FIG. 13 is a graph showing waveforms for the same elements as in FIG. 11 but for a first transition or border operating region in the Forward M-RMS mode of operation for the converter of FIG. 6, and a first transition or border operating region in the Reverse M-RMS mode of operation for the converter of FIG. 10 according to the modulation control scheme of the present invention.
Figure 14:
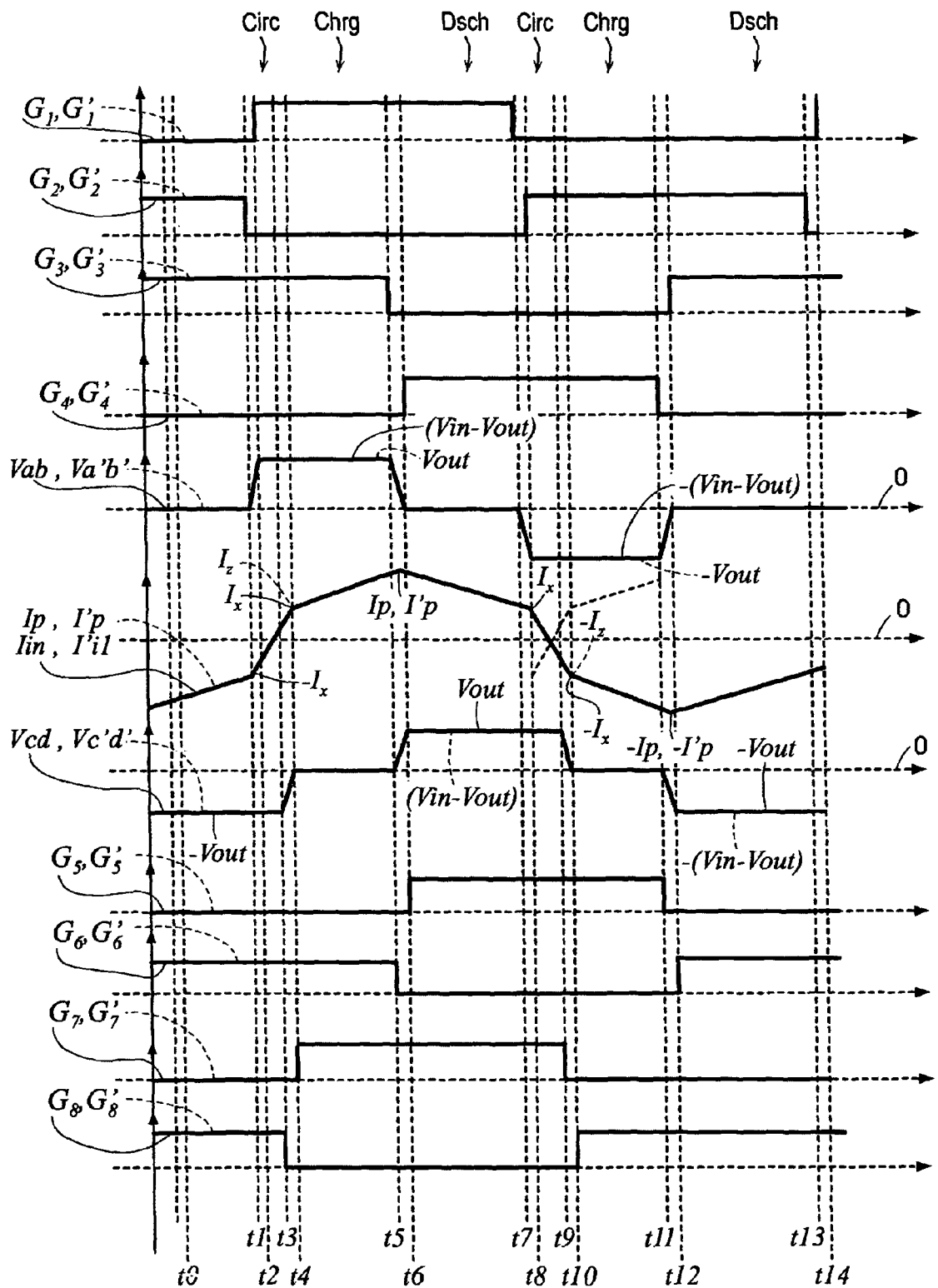
FIG. 14 is a graph showing waveforms for the same elements as in FIG. 11 but for a first transition or border operating region in the Forward F-ZVS mode of operation for the converter of FIG. 6, and a first transition or border operating region in the Reverse F-ZVS mode of operation for the converter of FIG. 10 according to the modulation control scheme of the present invention.
Figure 15:
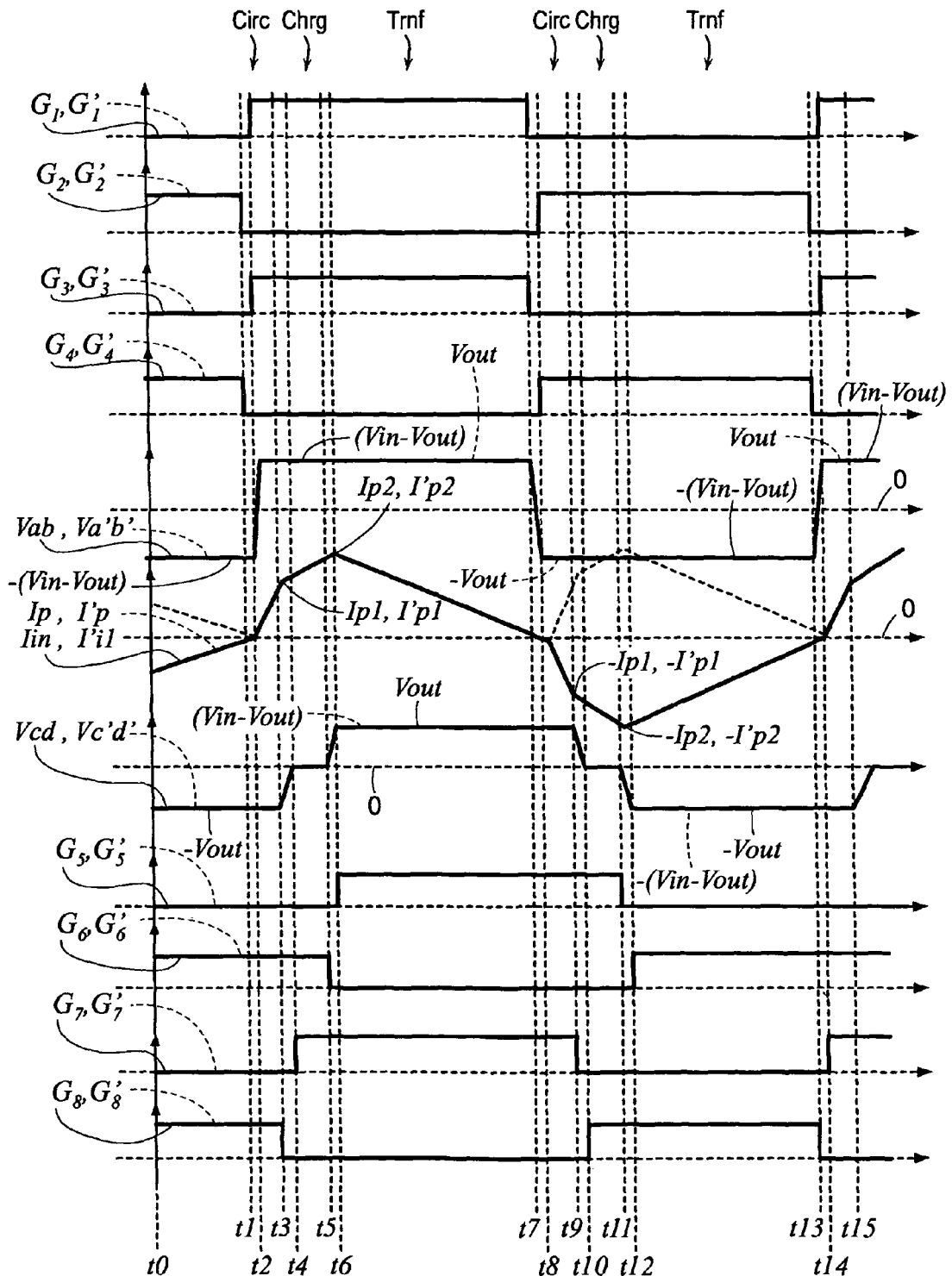
FIG. 15 is a graph showing waveforms for the same elements as in FIG. 11 but for a second main operating region in the Forward M-RMS mode of operation for the converter of FIG. 6, and a second main operating region in the Reverse M-RMS mode of operation for the converter of FIG. 10 according to the modulation control scheme of the present invention.
Figure 16:
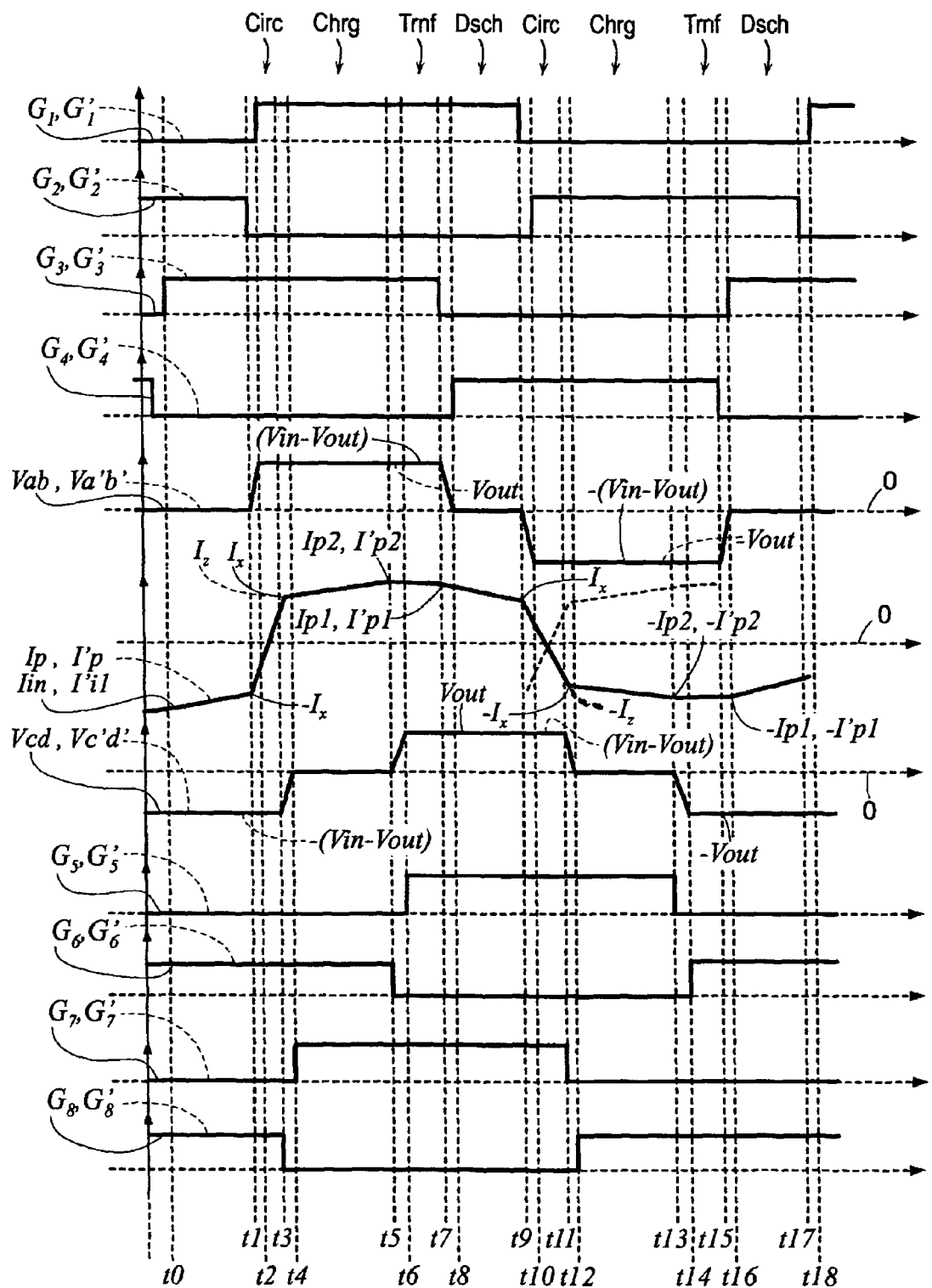
FIG. 16 is a graph showing waveforms for the same elements as in FIG. 11 but for a second main operating region in the Forward F-ZVS mode of operation for the converter of FIG. 6, and a second main operating region in the Reverse F-ZVS mode of operation for the converter of FIG. 10 according to the modulation control scheme of the present invention.
Figure 17:
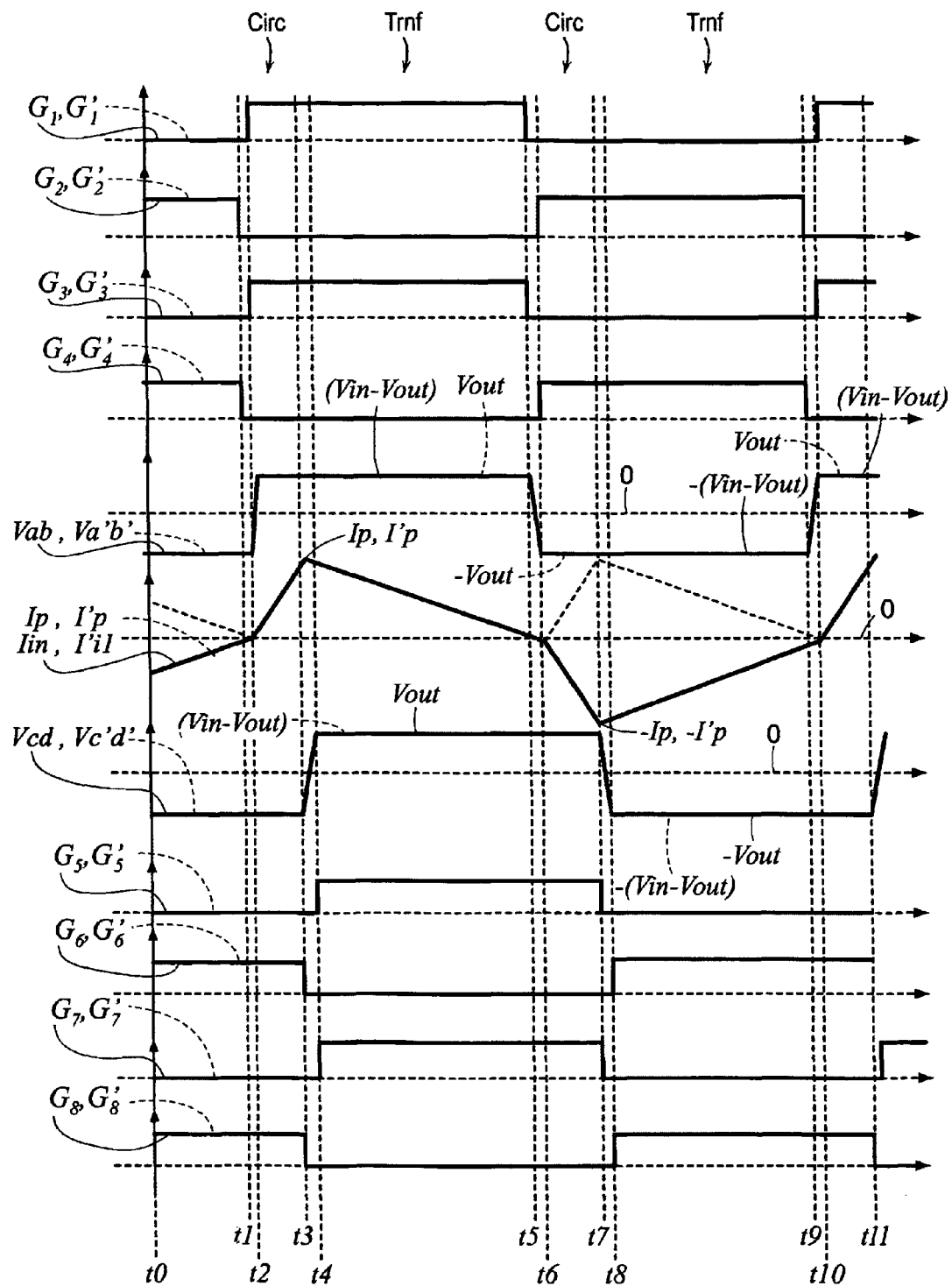
FIG. 17 is a graph illustrating waveforms for the same elements as in FIG. 11 but for a second transition or border operating region in the Forward M-RMS mode of operation for the converter of FIG. 6, and a second transition or border operating region in the Reverse M-RMS mode of operation for the converter of FIG. 10 according to the modulation control scheme of the present invention.
Figure 18A:
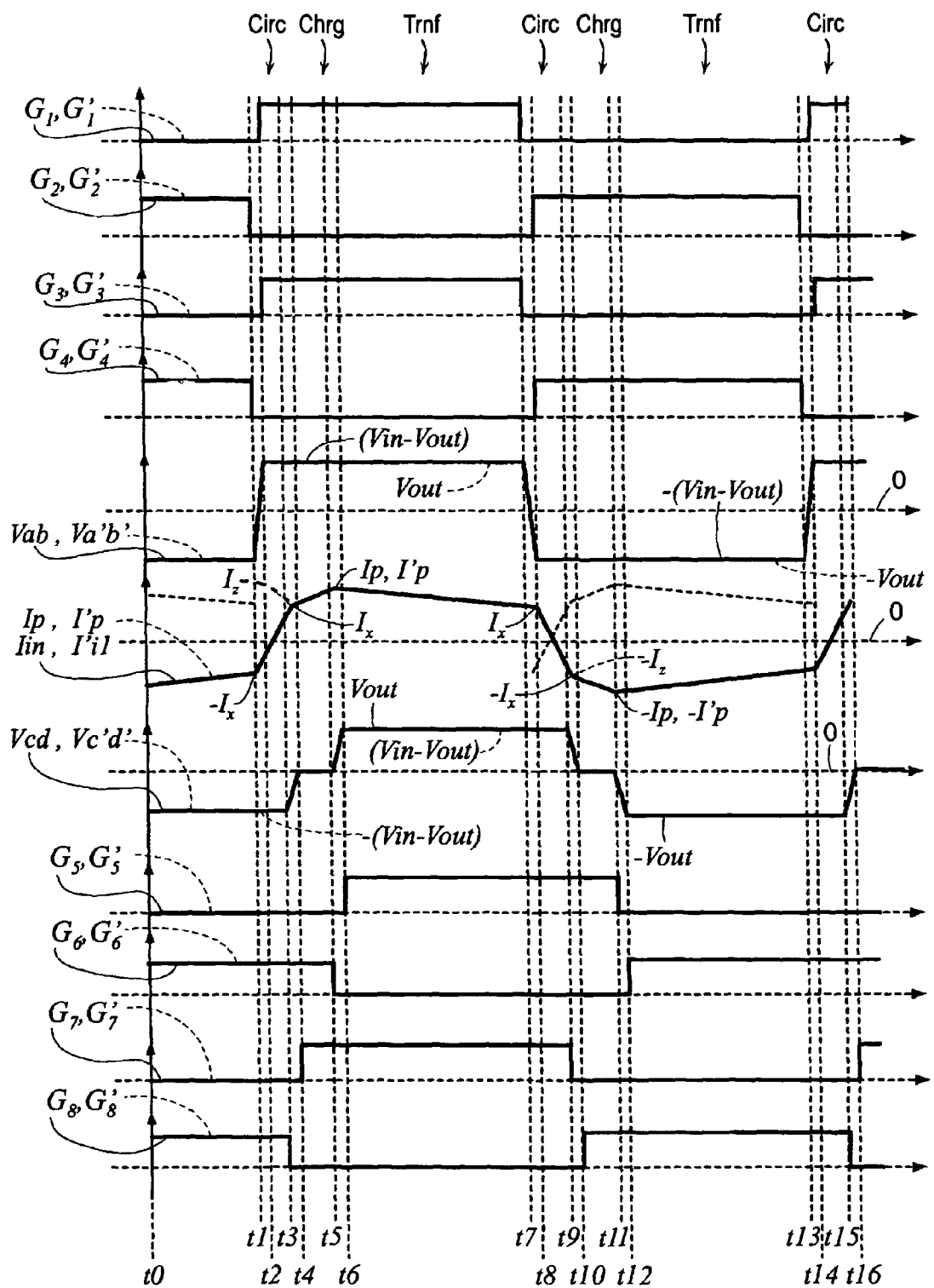
FIG. 18A is a graph illustrating waveforms for the same elements as in FIG. 11 but for a second transition or border operating region in the Forward F-ZVS mode of operation for the converter of FIG. 6, and a second transition or border operating region in the Reverse F-ZVS mode of operation for the converter of FIG. 10 according to the modulation control scheme of the present invention.
Figure 18B:
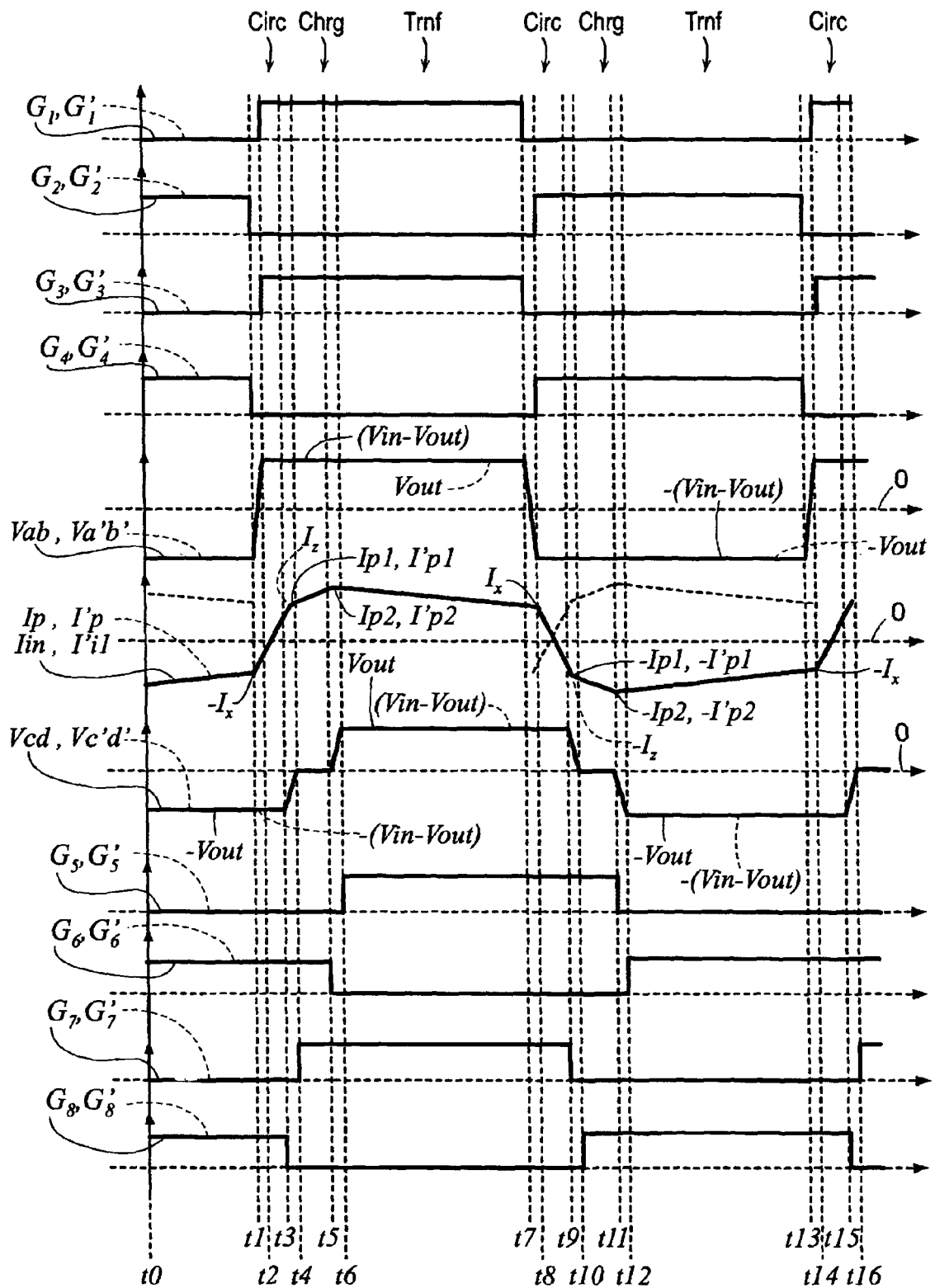
FIG. 18B is a graph showing waveforms for the same elements as in FIG. 11 but for a third main operating region in the Forward F-ZVS mode of operation for the converter of FIG. 6, and a third main operating region in the Reverse F-ZVS mode of operation for the converter of FIG. 10 according to the modulation control scheme of the present invention.
Figure 18C:
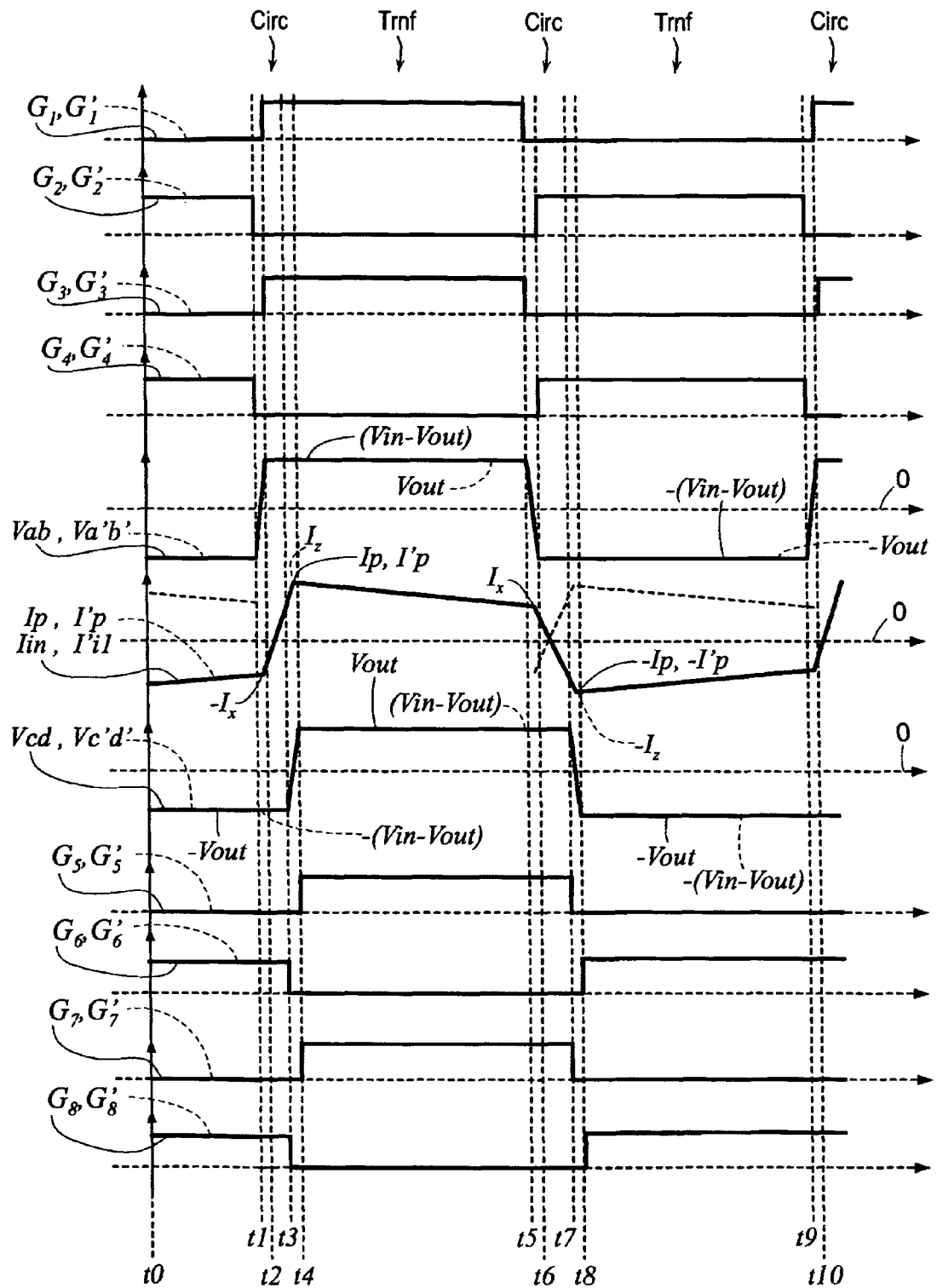
FIG. 18C is a graph illustrating waveforms for the same elements as in FIG. 11 but for a third transition or border operating region in the Forward F-ZVS mode of operation for the converter of FIG. 6, and a third transition or border operating region in the Reverse F-ZVS mode of operation for the converter of FIG. 10 according to the modulation control scheme of the present invention.
Figure 19:
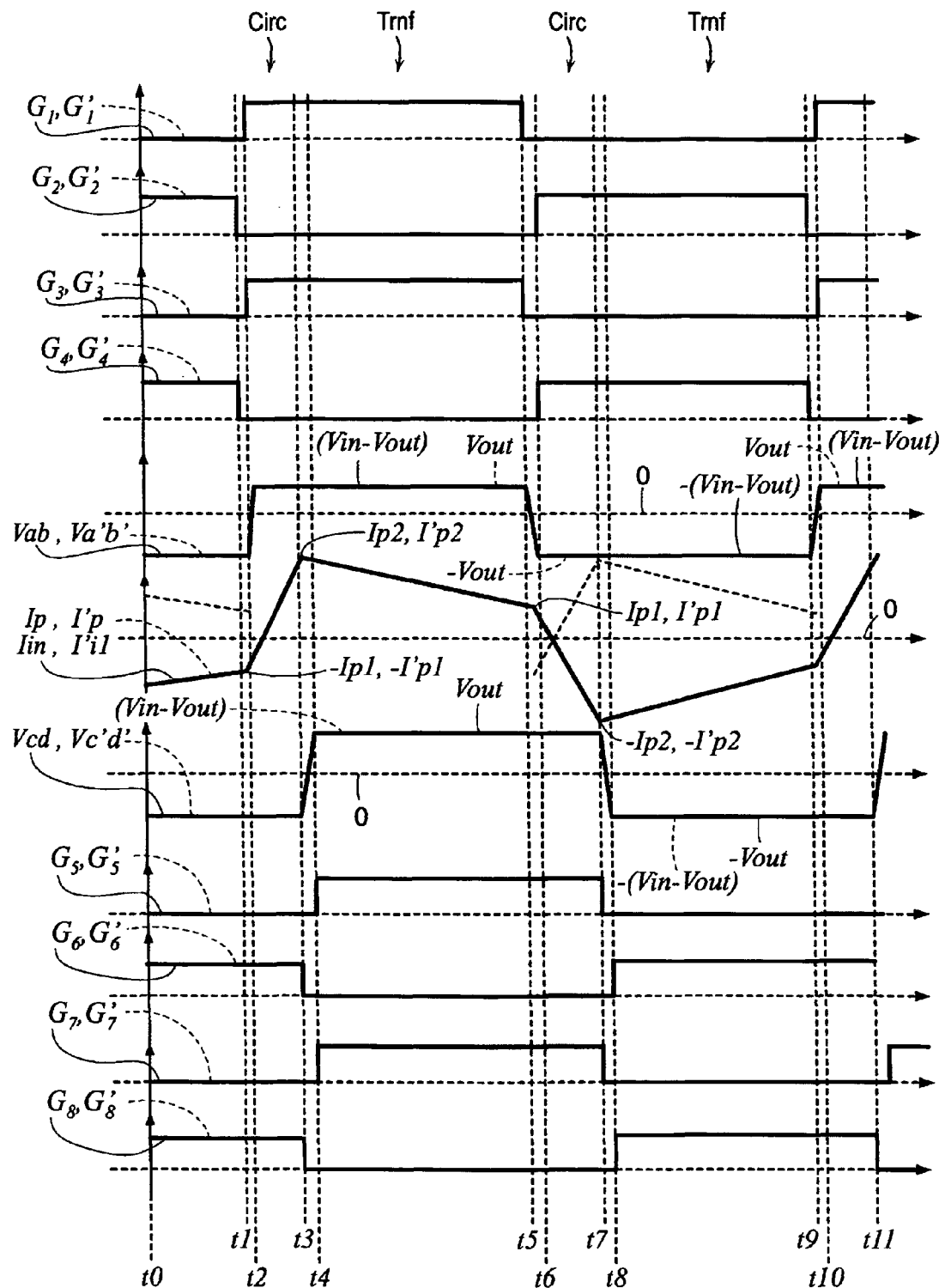
FIG. 19 is a graph depicting waveforms for the same elements as in FIG. 11 but for a first aspect of a third main operating region in the Forward M-RMS mode of operation and a first aspect of a fourth main operating region in the Forward F-ZVS mode of operation for the converter of FIG. 6, and a first aspect of a third main operating region in the Reverse M-RMS mode of operation and a first aspect of a fourth main operating region in the Reverse F-ZVS mode of operation for the converter of FIG. 10 according to the modulation control scheme of the present invention.
Figure 20:
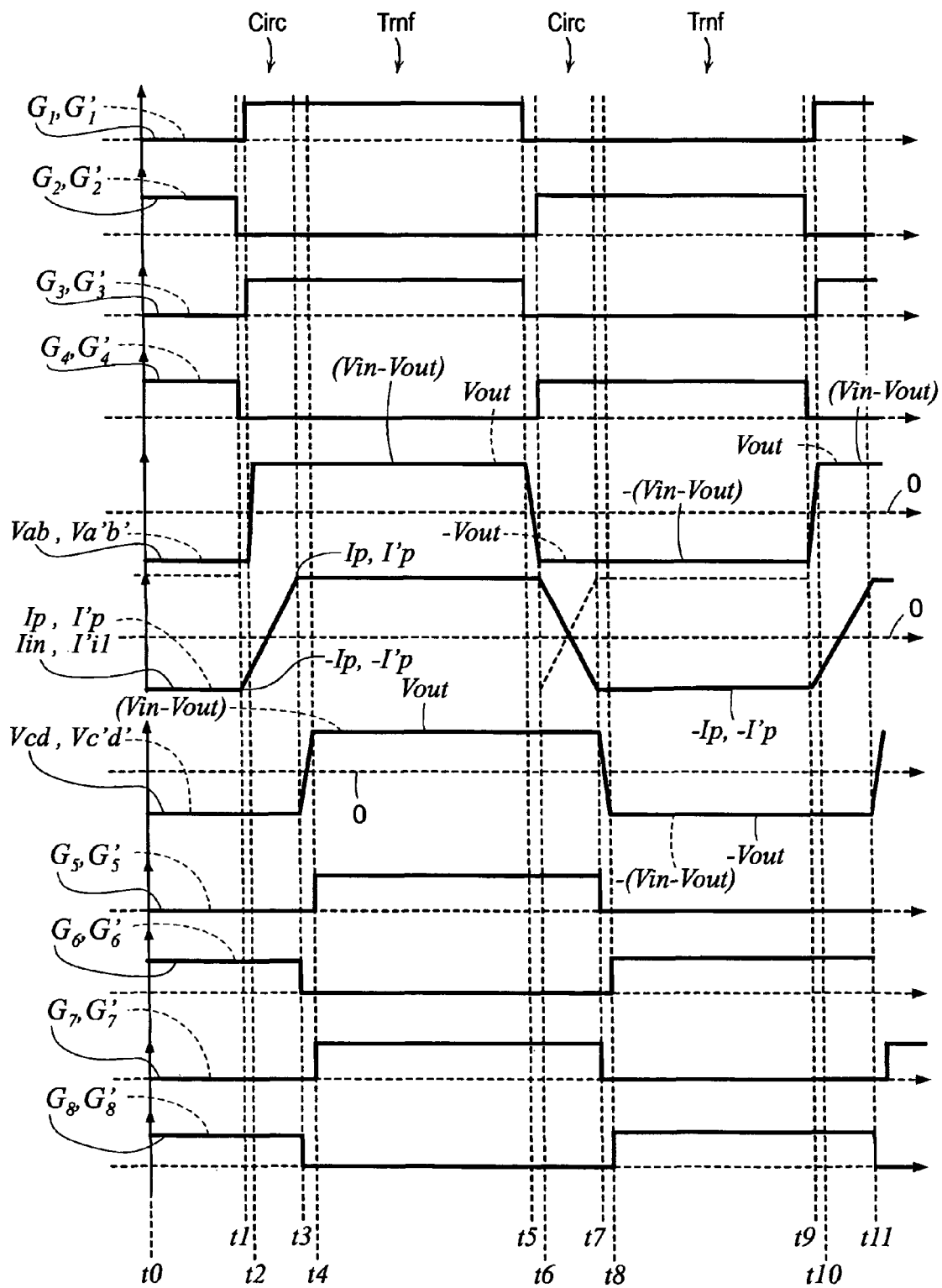
FIG. 20 is a graph showing waveforms for the same elements as in FIG. 11 but for a second aspect of the third main operating region in the Forward M-RMS mode of operation and a second aspect of the fourth main operating region in the Forward F-ZVS mode of operation for the converter of FIG. 6, and a second aspect of the third main operating region in the Reverse M-RMS mode of operation and a second aspect of the fourth main operating region in the Reverse F-ZVS mode of operation for the converter of FIG. 10 according to the modulation control scheme of the present invention.
Figure 21:
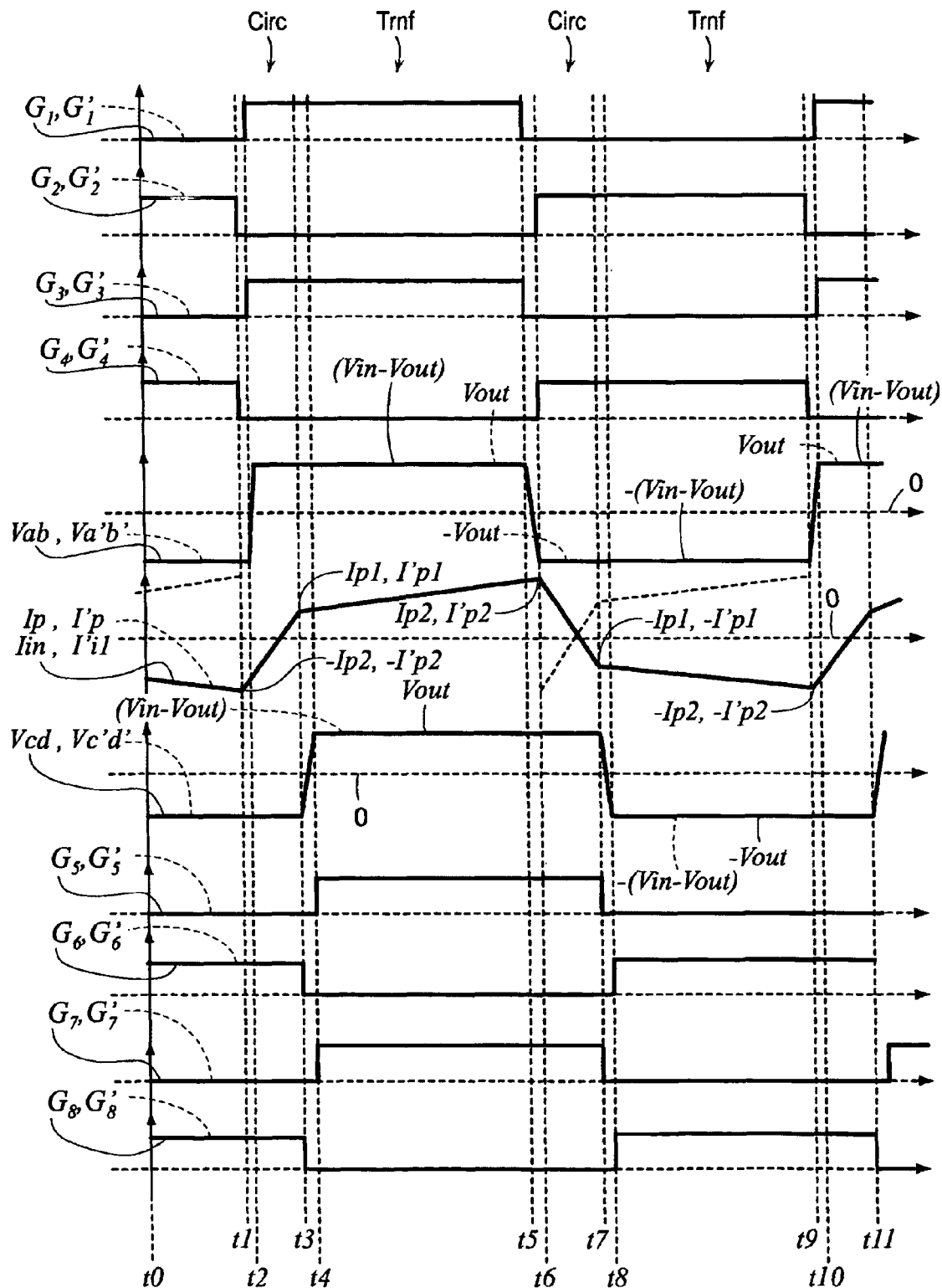
FIG. 21 is a graph depicting waveforms for the same elements as in FIG. 11 but for a third aspect of the third main operating region in the Forward M-RMS mode of operation and a third aspect of the fourth main operating region in the Forward F-ZVS mode of operation for the converter of FIG. 6, and a third aspect of the third main operating region in the Reverse M-RMS mode of operation and a third aspect of the fourth main operating region in the Reverse F-ZVS mode of operation for the converter of FIG. 10 according to the modulation control scheme of the present invention.
Figure 22:
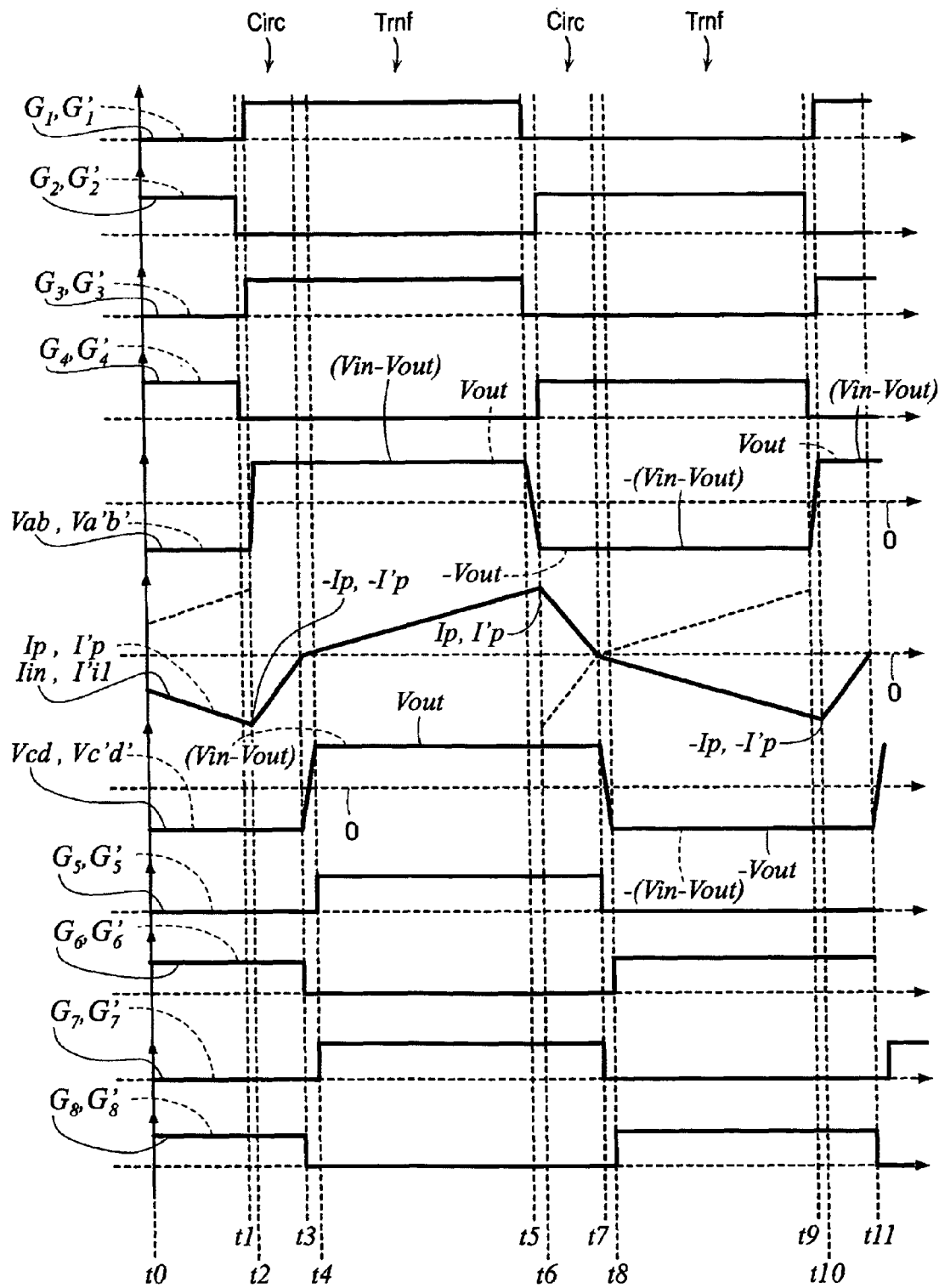
FIG. 22 is a graph illustrating waveforms for the same elements as in FIG. 11 but for a third transition or border operating region in the Forward M-RMS mode of operation for the converter of FIG. 6, and a third transition or border operating region in the Reverse M-RMS mode of operation for the converter of FIG. 10 according to the modulation control scheme of the present invention.
Figure 23:
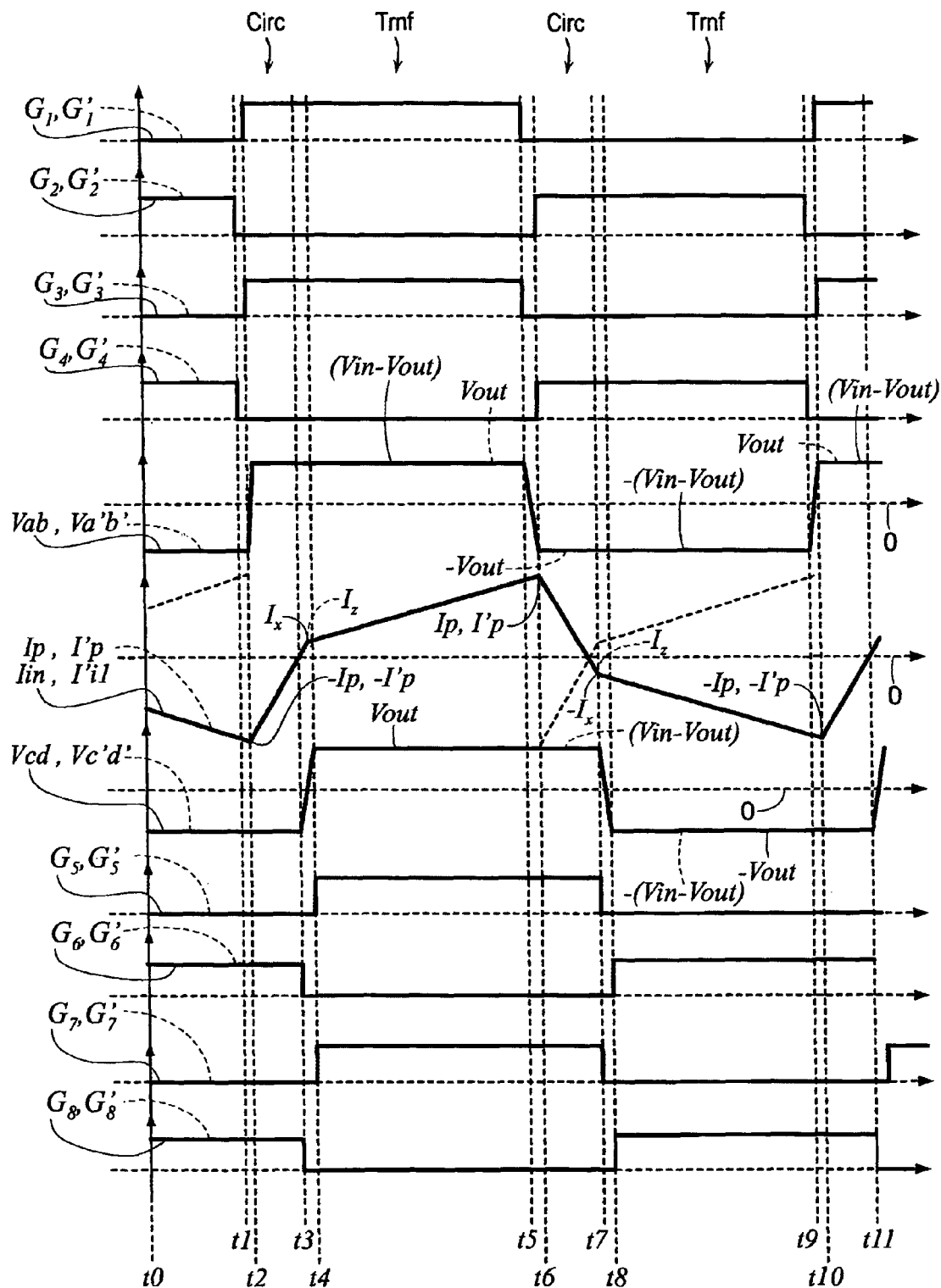
FIG. 23 illustrates waveforms for the same elements as in FIG. 11 but for a fourth transition or border operating region in the Forward F-ZVS mode of operation for the converter of FIG. 6, and a fourth transition or border operating region in the Reverse F-ZVS mode of operation for the converter of FIG. 10 according to the modulation control scheme of the present invention.
Figure 24:
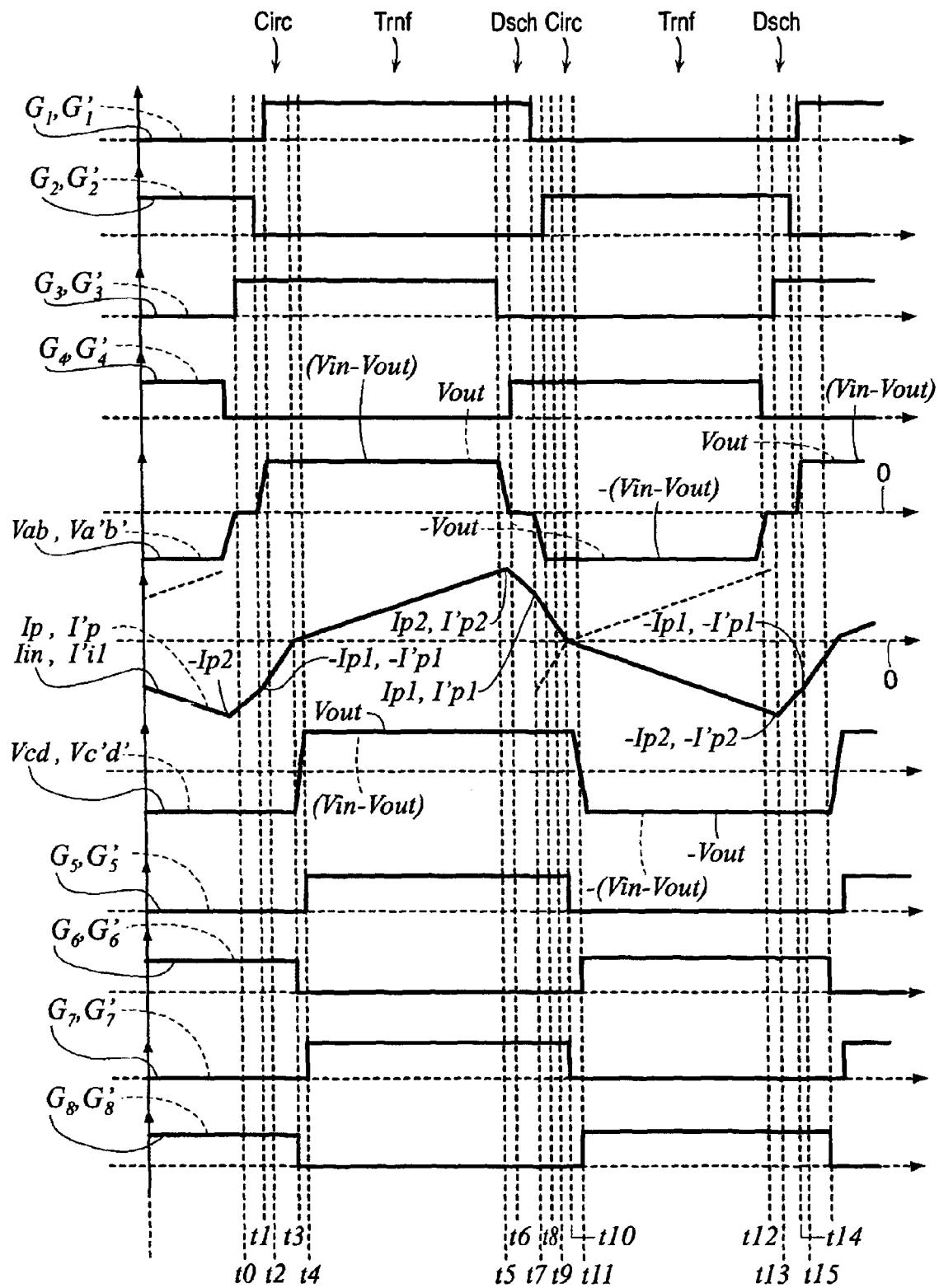
FIG. 24 is a graph showing waveforms for the same elements as in FIG. 11 but for a fourth main operating region in the Forward M-RMS mode of operation for the converter of FIG. 6, and a fourth main operating region in the Reverse M-RMS mode of operation for the converter of FIG. 10 according to the modulation control scheme of the present invention.
Figure 25:
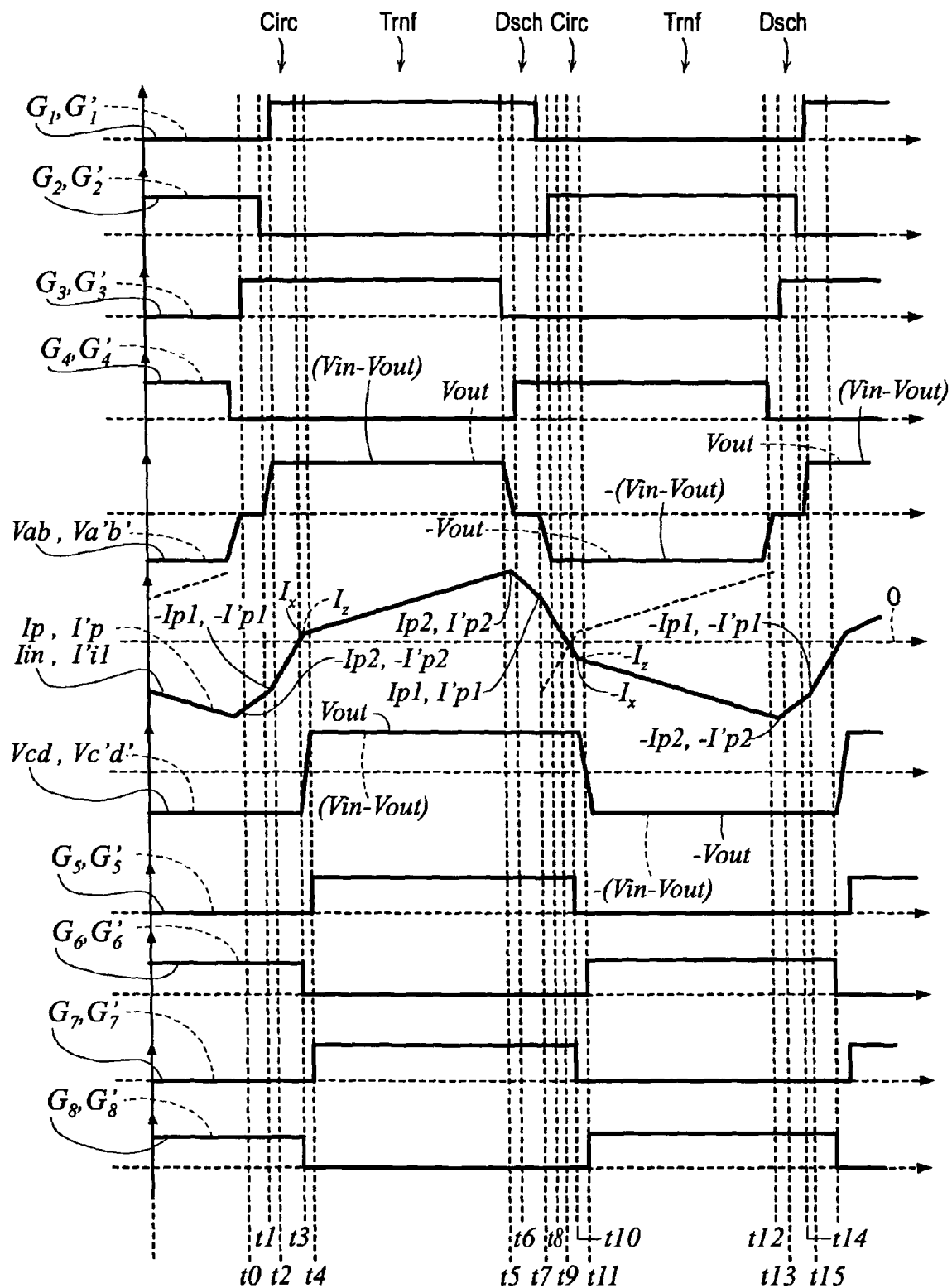
FIG. 25 is a graph showing waveforms for the same elements as in FIG. 11 but for a fifth main operating region in the Forward F-ZVS mode of operation for the converter of FIG. 6, and a fifth main operating region in the Reverse F-ZVS mode of operation for the converter of FIG. 10 according to the modulation control scheme of the present invention.
Figure 26:
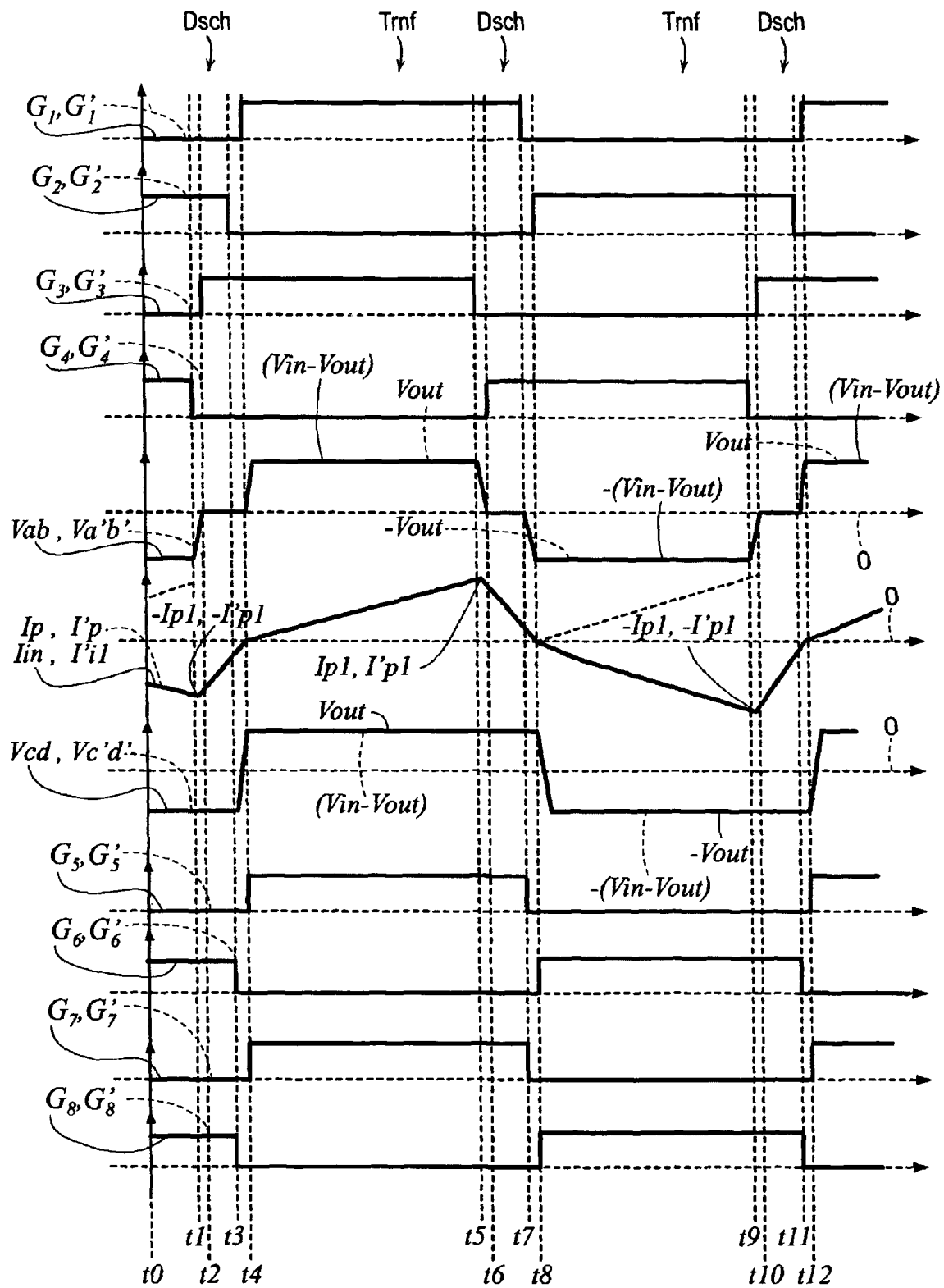
FIG. 26 is a graph illustrating waveforms for the same elements as in FIG. 11 but for a fourth transition or border operating region in the Forward M-RMS mode of operation for the converter of FIG. 6, and a fourth transition or border operating region in the Reverse M-RMS mode of operation for the converter of FIG. 10 according to the modulation control scheme of the present invention.
Figure 27:
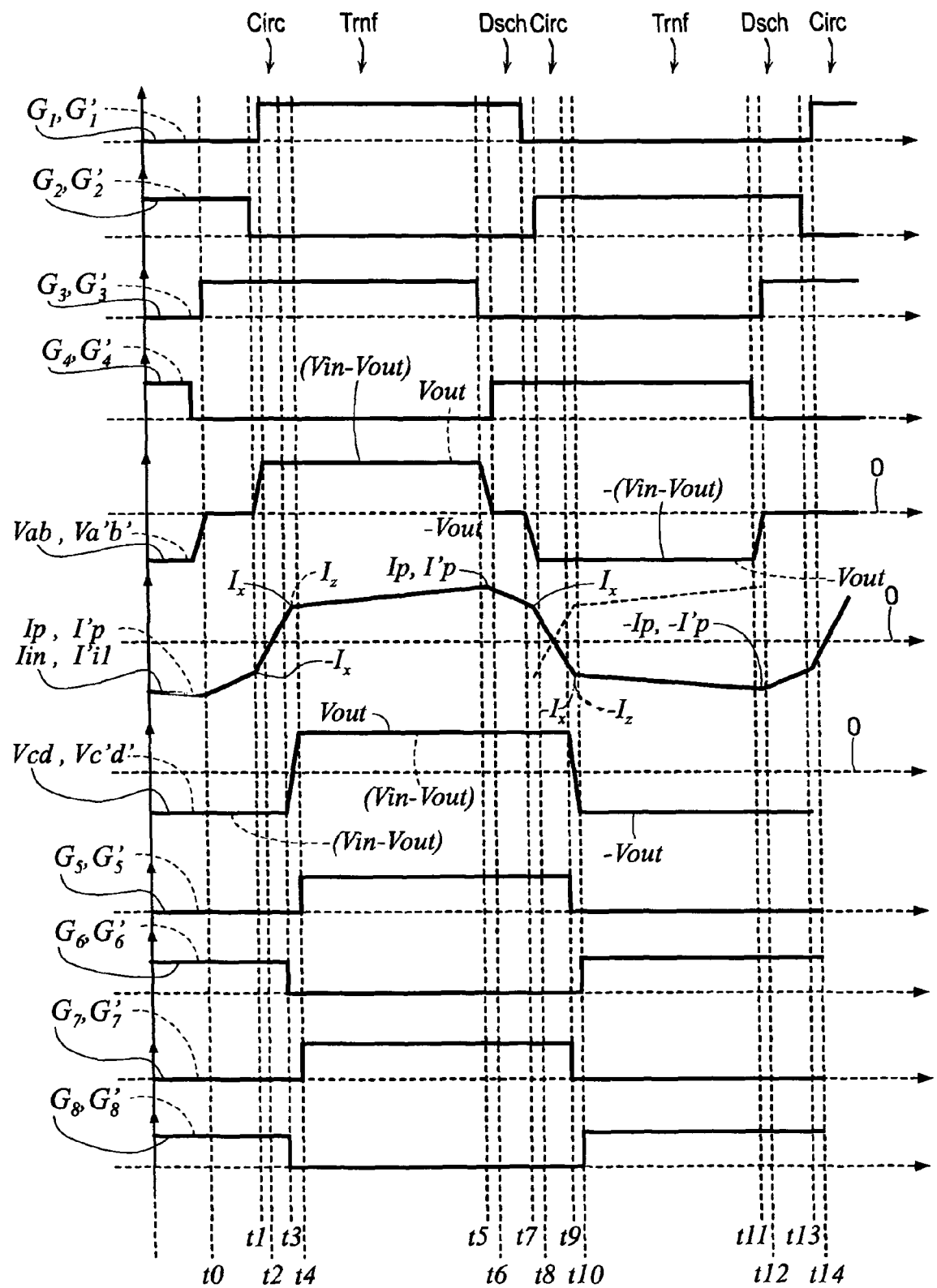
FIG. 27 is a graph illustrating waveforms for the same elements as in FIG. 11 but for a fifth transition or border operating region in the Forward F-ZVS mode of operation for the converter of FIG. 6, and a fifth transition or border operating region in the Reverse F-ZVS mode of operation for the converter of FIG. 10 according to the modulation control scheme of the present invention.
Figure 28:
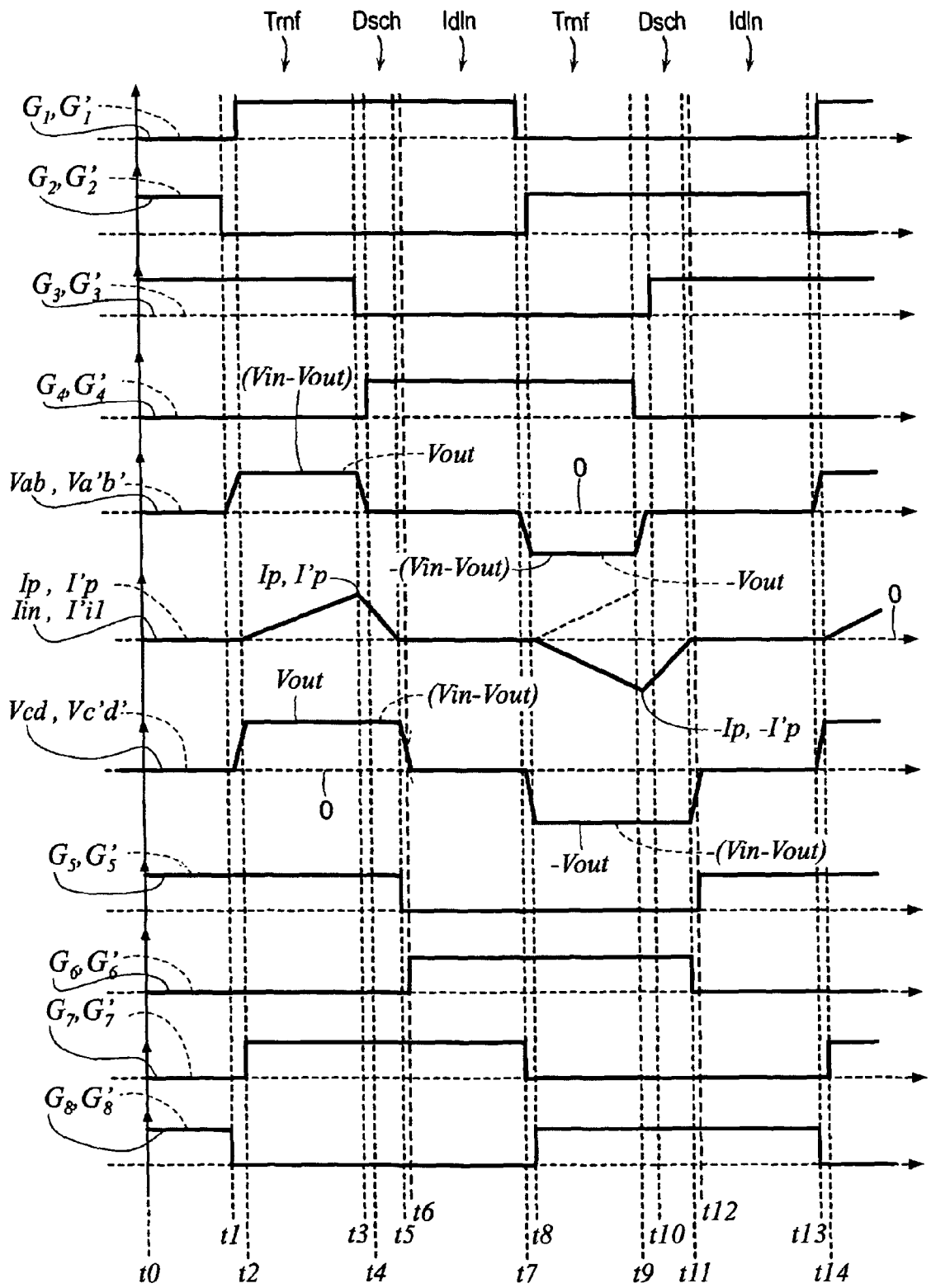
FIG. 28 is a graph showing waveforms for the same elements as in FIG. 11 but for a fifth main operating region in the Forward M-RMS mode of operation for the converter of FIG.

FIG. 12 is a graph showing waveforms for the same elements as in FIG. 11 but for the Case I Forward F-ZVS operating region. FIG. 13 is a graph showing waveforms for the same elements as in FIG. 11 but for the first transition Forward M-RMS operating region. FIG. 14 is a graph showing waveforms for the same elements as in FIG. 11 but for the first transition Forward F-ZVS operating region. FIG. 15 is a graph showing waveforms for the same elements as in FIG. 11 but for the Case II Forward M-RMS operating region. FIG. 16 is a graph showing waveforms for the same elements as in FIG. 11 but for the Case II Forward F-ZVS operating region. FIG. 17 is a graph showing waveforms for the same elements as in FIG. 11 but for the second transition Forward M-RMS operating region. FIG. 18A is a graph showing waveforms for the same elements as in FIG. 11 but for the second transition Forward F-ZVS operating region. FIG. 18B is a graph showing waveforms for the same elements as in FIG. 11 but for the Case III Forward F-ZVS operating region. FIG. 18C is a graph showing waveforms for the same elements as in FIG. 11 but for the third transition Forward F-ZVS operating region. FIGS. 19, 20 and 21 are graphs showing waveforms for the same elements as in FIG. 11 but for first, second and third aspects, respectively, of the Case III Forward M-RMS and Case IV Forward F-ZVS operating regions. FIG. 22 is a graph showing waveforms for the same elements as in FIG. 11 but for the third transition Forward M-RMS operating region. FIG. 23 is a graph showing waveforms for the same elements as in FIG. 11 but for the fourth transition Forward F-ZVS operating region. FIG. 24 is a graph showing waveforms for the same elements as in FIG. 11 but for the Case IV Forward M-RMS operating region. FIG. 25 is a graph showing waveforms for the same elements as in FIG. 11 but for the Case V Forward F-ZVS operating region. FIG. 26 is a graph showing waveforms for the same elements as in FIG. 11 but for the fourth transition Forward M-RMS operating region. FIG. 27 is a graph showing waveforms for the same elements as in FIG. 11 but for the fifth transition Forward F-ZVS operating region. FIG. 28 is a graph showing waveforms for the same elements as in FIG. 11 but for the Case V Forward M-RMS operating region. FIG. 29 is a graph showing waveforms for the same elements as in FIG. 11 but for the Case VI Forward F-ZVS operating region. FIG. 30 is a graph showing waveforms for the same elements as in FIG. 11 but for the sixth transition Forward F-ZVS operating region. FIG. 31 is a graph showing waveforms for the same elements as in FIG. 11 but for the Case VII Forward F-ZVS operating region.

FIG. 11 (Case I Forward M-RMS), FIG. 12 (Case I Forward F-ZVS), FIG. 13 (first transition Forward M-RMS), FIG. 14 (first transition Forward F-ZVS), FIG. 15 (Case II Forward M-RMS), FIG. 16 (Case II Forward F-ZVS), FIG. 17 (second transition Forward M-RMS), FIG. 18A (second transition F-ZVS), FIG. 18B (Case III Forward F-ZVS), FIG. 18C (third transition Forward F-ZVS) and FIG. 19 (first aspect of Case III Forward M-RMS and Case IV Forward F-ZVS) correspond to operating regions where $V1-V_{out}/n$ results in a negative voltage differential. The voltage differential $V1-V_{out}/n$ is referred to synonymously herein as a voltage component $V_{trnf}$ (transfer). Accordingly, FIGS. 11, 12, 13, 14, 15, 16, 17, 18A, 18B, 18C and 19 show a negative slope on the transformer's primary current $I_p$ waveform when negative $V_{trnf}$ ($-V_{trnf}$) gets applied across the predetermined total leakage inductance $L_{tot}$ as in FIG. 7. FIG. 21 (third aspect of Case III Forward M-RMS and Case IV Forward F-ZVS), FIG. 22 (third transition Forward M-RMS), FIG. 23 (fourth transition Forward F-ZVS), FIG. 24 (Case IV Forward M-RMS), FIG. 25 (Case V Forward F-ZVS), FIG. 26 (fourth transition Forward M-RMS), FIG. 27 (fifth transition Forward F-ZVS), FIG. 28 (Case V Forward M-RMS), FIG. 29 (Case VI Forward F-ZVS), FIG. 30 (sixth transition Forward F-ZVS) and FIG. 31 (Case VII Forward F-ZVS) correspond to operating regions where the voltage differential $V1-V_{out}/n$ results in a positive voltage differential and a positive $V_{trnf}$ ($+V_{trnf}$). Accordingly, FIGS. 21, 22, 23, 24, 25, 26, 27, 28, 29, 30 and 31 show a positive slope on the transformer's primary current $I_p$ waveform when positive $V_{trnf}$ ($+V_{trnf}$) gets applied across total leakage inductance $L_{tot}$. FIG. 20 (second aspect of Case III Forward M-RMS and Case IV Forward F-ZVS) corresponds to operating regions where the transformer's primary current $I_p$ waveform does not slope and thus remains at a constant or an essentially constant value when $V_{trnf}$, which equals zero, gets applied across total leakage inductance $L_{tot}$.

The modulation control associated with the different Cases and transition operating regions in the Forward M-RMS and Forward F-ZVS modes of operation are explained in greater detail below wherein the voltage sum $V1+V_{out}/n$ is referred to as a voltage component $V_{circ}$ (circulating), voltage V1 is referred to as a voltage component $V_{chrg}$ (charging), $V_{out}/n$ is referred to as a voltage component $V_{dsch}$ (discharging) and zero voltage is referred to as either a voltage component $V_{idln}$ (idling) when transformer current is zero or a voltage component $V_{freew}$ (freewheeling) when transformer current is not zero.

FIG. 34 is a graph showing waveforms for the same elements as in FIG. 11 where only $V_{idln}$ is applied across total leakage inductance, primary current is zero all the time and input current is also zero. These operating conditions, which may be referred to as Idling Forward M-RMS and Idling Reverse M-RMS, take place between the Case I Forward M-RMS and Case I Reverse M-RMS operating regions.

FIG. 35 is a graph showing waveforms for the same elements as in FIG. 11 but where $V_{circ}$ and $V_{freew}$ are applied across total leakage inductance, primary current does not remain at zero during any interval of time and input current is equal to zero. These operating conditions may be referred to as Freewheeling Forward F-ZVS and Freewheeling Reverse F-ZVS.

To change from Forward F-ZVS operation to Reverse F-ZVS operation, the circuit must pass from the Case I Forward F-ZVS operating region to the Freewheeling Forward F-ZVS operating condition in FIG. 35, then go through the Idling M-RMS operating condition in FIG. 34, then go through the Freewheeling Reverse F-ZVS operating condition in FIG. 35, and then go to the Case I Reverse F-ZVS operating region. The opposite sequence occurs when changing from Reverse F-ZVS operation to Forward F-ZVS operation.

As pointed out above, the voltage difference $V1-V_{out}/n$ is referred to as $V_{trnf}$. The modulation control for each of the five Forward M-RMS and seven Forward F-ZVS Cases or main operating regions and the four Forward M-RMS and six Forward F-ZVS transition or border operating regions divides the switching period or cycle into intervals which take the name of the appropriate voltage component, i.e. $V_{trnf}$(transfer), $V_{circ}$(circulating), $V_{chrg}$(charging), $V_{dsch}$(discharging), $V_{idln}$ (idling) and $V_{freew}$ (freewheeling), being applied across total leakage inductance $L_{tot}$.

The Case I Forward M-RMS operating region, as represented in FIG. 11, is executed in accordance with the modulation control scheme when $V_{trnf}$ is negative and, as is clear by the interval during which primary current $I_p$ remains at zero, it is intended for low level power flow as represented in FIG. 32. As seen in FIG. 11, a switching cycle begins at time t1 and, just prior to the start of the switching cycle, switches $SW_1$, $SW_4$, $SW_5$ and $SW_8$ are off, switches $SW_2$, $SW_3$, $SW_6$ and $SW_7$ are on, bridge voltages $V_{ab}$ and $V_{cd}$ are at zero, and primary current $I_p$ is at zero from the previous switching semi-cycle. A charging interval, in which $V_{chrg}$ (as previously defined) is applied across total leakage inductance $L_{tot}$, begins at time t1 by turning off switch $SW_2$ with zero-current switching (ZCS) and subsequently turning on switch $SW_1$ at time t2, resulting in a positive bridge voltage $V_{ab}$, i.e. $+(V_{in}-V_{out})$. Being turned on, switch $SW_1$ discharges through itself the equivalent capacitance seen between its source and drain terminals in FIG. 6. During the charging interval, switches $SW_3$, $SW_6$ and $SW_7$ remain on from the previous switching semi-cycle, switches $SW_4$, $SW_5$ and $SW_8$ remain off from the previous switching semi-cycle, the bridge voltage $V_{cd}$ remains at zero from the previous switching semi-cycle, and the transformer's primary current $I_p$ begins at zero and increases in magnitude to $+I_p$. Accordingly, energy is both stored in $L_{tot}$ and transferred to the load $(V_{out})$ due to the series connection of input and output ports of the converter 32 as shown in FIGS. 5 and 6.

The charging interval ends and a transfer interval begins by hard turning off switch $SW_6$ at time t3, causing the anti-parallel diode associated with switch $SW_5$ to begin to conduct, and subsequently turning on switch $SW_5$ with zero-voltage switching (ZVS) at time t4 which results in a positive bridge voltage $V_{cd}$ $(+V_{out})$. During the transfer interval, $V_{trnf}$ (as previously defined) is applied across total leakage inductance $L_{tot}$. Switches $SW_3$ and $SW_7$ remain on during the transfer interval, which allows for synchronous rectification to minimize conduction losses. Primary current $I_p$ decreases in magnitude during the transfer interval, going from $+I_p$ to zero. The transfer interval ends when the transformer's primary current $I_p$ reaches zero at time t6, which coincides with turning off switches $SW_3$ and $SW_7$ with zero-current switching (ZCS) to avoid unnecessary circulating energy that would lead to additional conduction power losses, and subsequently turning on, at time t7, switches $SW_4$ and $SW_8$ which discharge through themselves the equivalent capacitances seen between their source and drain terminals in FIG. 6. From time t6-t7, the bridge voltage $V_{ab}$ goes from $+(V_{in}-V_{out})$ to zero, and the bridge voltage $V_{cd}$ goes from $+V_{out}$ to zero. An idling interval begins when the transfer interval ends, and it lasts for the remaining portion of the switching semi-cycle. The bridge voltages $V_{ab}$ and $V_{cd}$ and the primary current $I_p$ remain at zero during the idling interval. The switching semi-cycle ends and the subsequent semi-cycle begins at time t8 when switch $SW_1$ is turned off, and switch $SW_2$ is subsequently turned on at time t9. For the switching semi-cycle that begins at time t1, the intervals t1-t2, t3-t4, t6-t7 and t8-t9 are switching transition intervals, and the subsequent switching semi-cycle has corresponding switching transition intervals. Waveforms for the remaining semi-cycle in the Case I Forward M-RMS operating region can be easily obtained by symmetry. In the subsequent semi-cycle, the primary current reverses polarity going from zero to $-I_p$ during the charging interval and from $-I_p$ to zero during the transfer interval, the bridge voltage $V_{ab}$ goes from zero to $-(V_{in}-V_{out})$ during the charging interval and returns to zero at the start of the idling interval, and the bridge voltage $V_{cd}$ goes from zero to $-V_{out}$ at the start of the transfer interval and returns to zero at the start of the idling interval.

From the primary current waveform $I_p$ ($I_{in}$) seen in FIG. 11 and neglecting switching transition times, the following relation holds for a switching semi-cycle:

$$D_{chrg}*V_{chrg}+D_{trnf}*V_{trnf}=0$$

where $D_{chrg}$ and $D_{trnf}$ are equivalent duty cycles for the charging and transfer intervals during a semi-cycle of primary current waveform $I_p$.

The converter input current $I_{in}$, indicated in FIG. 5 and shown by the waveform of FIG. 11, is equal to:

$$sgn(V_{ab})*I_p,$$

where sgn(y) is the sign function defined as zero, +1 or −1 when y, i.e. $V_{ab}$, is zero, positive or negative, respectively, and $I_p$ is the transformer's primary current indicated in FIG. 6.

Over one switching period, the average input current $I_{in}$ conforms to the following relation:

$$(D_{chrg})^2 V_{chrg}+D_{trnf}*D_{chrg}*V_{chrg}=I_{in}*4*L_{tot}/T_s,$$

where $T_s$ is the switching period.

From the aforementioned equations, transfer and charging duty cycles can be determined in terms of a desired input current value and remaining parameters according to the following relations:

$$D_{trnf}=\{^{-I_{in}*4*L_{tot}*V_{chrg}}/_{(T_s*V_{trnf}*V_{dsch})}\}^{1/2}, \text{ and}$$

$$D_{chrg}=-D_{trnf}*V_{trnf}/V_{chrg}.$$

The idling interval duty cycle is determined by the following relation:

$$D_{idln}=1-D_{chrg}-D_{trnf}.$$

In steady state operation, equating input and output power values after neglecting the converter's power losses provides the information needed to relate the input and output current values according to the following relation:

$$I_{in}*V_{in}=I_{out}*V_{out}.$$

Waveforms for the Case I Forward F-ZVS operating region are shown in FIG. 12. No Cases or transition operating regions in the Forward or Reverse F-ZVS modes of operation has an interval during which primary current $I_p$ remains at zero. In the Case I Forward F-ZVS operating region, as well as the other Forward F-ZVS operating regions, a minimum circulating primary current value designated as Ix is kept circulating in the transformer's primary winding to obtain zero-voltage switching (ZVS) for all of the MOSFET switches. However, when the minimum value of circulating primary current needed to obtain ZVS is much larger for the MOSFETs in one bridge than that for the MOSFETs in the other bridge, it may be more efficient, i.e. lower conduction power losses, to reduce the amount of circulating current on the side with lower requirements as explained further below.

It should thusly be appreciated that when the circulating primary current value Ix is equal to zero, some of the Forward F-ZVS operating regions become their corresponding Forward M-RMS operating regions.

In the Case I Forward F-ZVS operating region seen in FIG. 12, a switching semi-cycle begins at time t1 and, just prior to the start of the semi-cycle, switches $SW_1$, $SW_4$, $SW_5$ and $SW_7$ are off, switches $SW_2$, $SW_3$, $SW_6$ and $SW_8$ are on, bridge voltage $V_{ab}$ is at zero, bridge voltage $V_{cd}$ is at $-V_{out}$ from the previous semi-cycle, and the transformer's primary current $I_p$ is at $-I_x$. A circulating interval begins at time t1 by hard turning off switch $SW_2$, causing the body diode of switch $SW_1$ to conduct primary current which allows turning on switch $SW_1$ with ZVS at time t2, while all the other switches remain in their conditions previous to t1. The bridge voltage $V_{ab}$ goes from zero to $+(V_{in}-V_{out})$ at the start of the circulating interval. During the circulating interval, $V_{circ}$ (as previously defined) is applied across total leakage inductance $L_{tot}$ and the transformer's primary current $I_p$ increases in magnitude and crossing zero reverses polarity to reach $+I_x$ at the end of the circulating interval. A charging interval begins at time t3 by hard turning off switch $SW_8$, causing the body diode of switch $SW_7$ to conduct secondary current which allows turning on switch $SW_7$ with ZVS at time t4, while all the other switches remain in their conditions previous to t3. The bridge voltage $V_{cd}$ goes from $-V_{out}$ to zero at the start of the charging interval. During the charging interval in the Case I Forward F-ZVS operating region, the transformer's primary current $I_p$ increases in magnitude from $+I_x$ to $+I_p$. A freewheeling interval begins at time t5 by hard turning off switch $SW_3$, causing the body diode of switch $SW_4$ to conduct primary current which allows turning on switch $SW_4$ with ZVS at time t6, while all the other switches remain in their conditions previous to t5. The primary current $I_p$ remains at $+I_p$ and the bridge voltages $V_{ab}$ and $V_{cd}$ remain at zero during the freewheeling interval. A discharging interval begins at time t7 by hard turning off switch $SW_6$, causing the body diode of switch $SW_5$ to conduct secondary current which allows turning on switch $SW_5$ with ZVS at time t8, while all the other switches remain in their conditions previous to t7. The bridge voltage $V_{cd}$ goes from zero to $+V_{out}$ at the start of the discharging interval, and the bridge voltage $V_{ab}$ remains at zero during the discharging interval. During the discharging interval in the Case I Forward F-ZVS operating region, the transformer's primary current $I_p$ decreases in magnitude from $+I_p$ to $+I_x$. For the switching semi-cycle that begins at time t1, the intervals t1-t2, t3-t4, t5-t6 and t7-t8 are switching transition intervals, and the subsequent switching semi-cycle has corresponding switching transition intervals. Waveforms for the subsequent switching semi-cycle in the Case I Forward F-ZVS operating region are easily obtained by symmetry. During the subsequent semi-cycle, primary current goes from +Ix and crossing zero reverses polarity to reach $-I_x$ during the circulating interval, goes from $-I_x$ to $-I_p$ during the charging interval, remains at $-I_p$ during the freewheeling interval and goes from $-I_p$ to $-I_x$ during the discharging interval. This approach avoids both dissipation in the MOSFETs of the energy stored in the node capacitances and hard turn-off of the MOSFET body diodes, and hence it minimizes switching losses. The Case I Forward F-ZVS operating region allows higher efficient operation when combinations of high voltages, large node capacitances and high switching frequencies are handled by the controller.

From the primary current waveform $I_p$ seen in FIG. 12 and neglecting switching transition times, the following relations hold for a switching semi-cycle in the Case I Forward F-ZVS operating region:

$$D_{chrg}*V_{chrg}-D_{dsch}*V_{dsch}=0$$

and $$D_{circ}*V_{circ}=(2*Ix)*4*L_{tot}/T_s.$$

Over one switching period, the average input current $I_{in}$ conforms to the following relation:

$$(D_{chrg})^2*V_{chrg}+(D_{chrg})/(2*Ix)*4*L_{tot}T_s=I_{in}*4*L_{tot}/T_s,$$

where Ts is the switching period.

From the aforementioned equations, charging and discharging duty cycles can be determined in terms of a desired input current value, a desired circulating primary current value, and remaining parameters according to the following relations:

$$D_{chrg}=\{-Ix+[Ix^2+I_{in}*V_{chrg}]^{1/2}\}*4*L_{tot}/(T_s*V_{chrg})$$

and $$D_{dsch}=D_{chrg}*V_{chrg}/V_{dsch}.$$

The freewheeling interval lasts for the remaining portion of the switching semi-cycle and its duty cycle is determined by the relation:

$$1-D_{circ}-D_{chrg}-D_{dsch}=D_{freew}.$$

Waveforms for the first transition Forward M-RMS operating region between the Case I Forward M-RMS and Case II Forward M-RMS operating regions are shown in FIG. 13. The first transition Forward M-RMS operating region is similar to the Case I Forward M-RMS operating region (FIG. 11) except that the first transition Forward M-RMS operating region does not have the idling interval that is present in the Case I Forward M-RMS operating region. Rather, instead of the idling interval that lasts for the remaining portion of a switching semi-cycle following the transfer interval in the Case I Forward M-RMS operating region, the transfer interval continues for the remainder of the switching semi-cycle in the first transition Forward M-RMS operating region. At time t1, which marks the beginning of a switching semi-cycle, bridge voltage $V_{ab}$ is at $-(V_{in}-V_{out})$, bridge voltage $V_{cd}$ is at $-V_{out}$, and transformer primary current $I_p$ is at zero from the previous semi-cycle. Also, switches $SW_1$, $SW_3$, $SW_5$ and $SW_7$ are off and switches $SW_2$, $SW_4$, $SW_6$ and $SW_8$ are on from the previous semi-cycle. The charging interval starts at time t1 by turning off switches $SW_2$, $SW_4$ and $SW_8$ and subsequently turning on switches $SW_1$, $SW_3$ and $SW_7$ at time t2, which discharge through themselves the equivalent capacitances seen between their drain and source terminals, resulting in bridge voltage $V_{ab}$ going from $-(V_{in}-V_{out})$ to $+(V_{in}-V_{out})$ and bridge voltage $V_{cd}$ going from $-V_{out}$ to zero. During the charging interval, the primary current $I_p$ begins at zero and increases in magnitude to $+I_p$, switch $SW_5$ remains off, switch $SW_6$ remains on, the bridge voltage $V_{ab}$ remains at $+(V_{in}-V_{out})$, and the bridge voltage $V_{cd}$ remains at zero. The charging interval ends and the transfer interval begins by hard turning off switch $SW_6$ at time t3 and subsequently turning on switch $SW_5$ with zero-voltage switching (ZVS) at time t4, such that the bridge voltage $V_{cd}$ increases in magnitude from zero to $+V_{out}$. The primary current decreases from $+I_p$ to zero, the bridge voltage $V_{ab}$ remains at $+(V_{in}-V_{out})$, and the bridge voltage $V_{cd}$ remains at $+V_{out}$ during the transfer interval. The transfer interval ends with the semi-cycle and a new semi-cycle begins at time t8 when the transformer's primary current $I_p$ reaches zero and switches $SW_1$, $SW_3$ and $SW_7$ are turned off, such that bridge voltage $V_{ab}$ goes from $+(V_{in}-V_{out})$ to $-(V_{in}-V_{out})$ and bridge voltage $V_{cd}$ goes from $+V_{out}$ to zero, resulting in switches $SW_2$, $SW_4$ and $SW_8$ being turned on at time t9. For the switching semi-cycle that begins at time t1, the intervals t1-t2, t3-t4 and t8-t9 are switching transition intervals, and the subsequent switching semi-cycle has corresponding switching transition intervals. Waveforms for the subsequent semi-cycle are easily obtained by symmetry. In the subsequent semi-cycle, primary current reverses polarity reaching $-I_p$ at the end of the charging interval and reaching zero again at the end of the transfer interval, the bridge voltage $V_{ab}$ remains at $-(V_{in}-V_{out})$ during the charging and transfer intervals and goes from $-(V_{in}-V_{out})$ to $+(V_{in}-V_{out})$ at the end of the transfer interval, and the bridge voltage $V_{cd}$ remains at zero during the charging interval, goes to $-V_{out}$ at the start of the transfer interval, and returns to zero at the end of the transfer interval.

The duty cycle constraint for operation in the first transition Forward M-RMS operating region becomes:

$$D_{chrg}+D_{trnf}=1.$$

As a result, the following relations apply:

$$D_{chrg}=-V_{trnf}/(V_{chrg}V_{trnf}), \text{ and}$$

$$D_{chrg}*V_{chrg}=I_{in}*4*L_{tot}/T_s.$$

Waveforms for the first transition Forward F-ZVS operating region between the Case I Forward F-ZVS and Case II Forward F-ZVS operating regions are shown in FIG. 14. The first transition Forward F-ZVS operating region is similar to the Case I Forward F-ZVS operating region (FIG. 12) except that the first transition Forward F-ZVS operating region does not have the freewheeling interval that is present in the Case I Forward F-ZVS operating region. Rather, instead of the freewheeling interval that is located between the charging and discharging intervals in the Case I Forward F-ZVS operating region, both the charging and discharging intervals in the first transition Forward F-ZVS operating region increase and fill the interval that was occupied by the freewheeling interval. Consequently, the switching sequence for the first transition Forward F-ZVS operating region has the primary current $I_p$ beginning at $-Ix$ when the circulating interval starts at time t1, reaching $+I_x$ at the end of the circulating interval, reaching $+I_p$ at the end of the charging interval, and reaching $+I_x$ at the end of the discharging interval. Waveforms for the subsequent semi-cycle are easily obtained by symmetry. In the subsequent switching semi-cycle, primary current reaches $-I_x$ at the end of the circulating interval, reaches the value $-I_p$ at the end of the charging interval and reaches the value of $-I_x$ at the end of the discharging interval.

The duty cycle constraints for operation in the first transition Forward F-ZVS operating region thusly become:

$$D_{circ}*V_{circ}=(2*Ix)*4*L_{tot}/T_s,$$

$$D_{chrg}*V_{chrg}-D_{dsch}*V_{dsch}=0,$$

and $$1-D_{circ}-D_{chrg}-D_{dsch}=0.$$

As a result, the following relations apply:

$$D_{chrg}=V_{dsch}*(1-D_{circ})/(V_{dsch}+V_{chrg}),$$

$$D_{dsch}=D_{chrg}*V_{chrg}/V_{dsch}$$

and $$((D_{chrg})^2*V_{chrg}+(D_{chrg})*(2*Ix)*4*L_{tot}/T_s)=I_{in}*4*L_{tot}/T_s.$$

FIG. 15 depicts the waveforms associated with the Case II Forward M-RMS operating region, which is again employed when $V_{trnf}$ is negative. The Case II Forward M-RMS operating region is similar to the first transition Forward M-RMS operating region (FIG. 13) except each switching semi-cycle in the Case II Forward M-RMS operating region has a circulating interval added before the charging interval. In addition, the durations of all three intervals, i.e. circulating interval, charging interval and transfer interval, are selected to force the primary current $I_p$ to reach zero exactly at the end of each switching semi-cycle. This allows for intermediate-level power flow through the converter without having to hard turn off any switch's anti-parallel body diode, while minimizing both primary RMS current value and conduction losses.

A switching semi-cycle begins at time t1 and, just prior to the start of the semi-cycle, switches $SW_1$, $SW_3$, $SW_5$ and $SW_7$ are off, switches $SW_2$, $SW_4$, $SW_6$ and $SW_8$ are on, bridge voltage $V_{ab}$ is at $-(V_{in}-V_{out})$, and bridge voltage $V_{cd}$ is at $-V_{out}$ from the previous semi-cycle. The circulating interval begins at time t1 by turning off both switches $SW_2$ and $SW_4$ with zero-current switching (ZCS) and subsequently turning on both switches $SW_1$ and $SW_3$ at time t2, causing the switches $SW_1$ and $SW_3$ to discharge through themselves the equivalent capacitances seen at nodes a and b in FIG. 6 and resulting in bridge voltage $V_{ab}$ going from $-(V_{in}-V_{out})$ to $+(V_{in}-V_{out})$. During the circulating interval, $V_{circ}$ (as previously defined) is applied across total leakage inductance $L_{tot}$. Switches $SW_5$ and $SW_7$ remain off, and switches $SW_6$ and $SW_8$ remain on during the circulating interval. The energy circulation that takes place during the circulating interval allows for an increment in average power transfer without having to hard switch any switch's anti-parallel diode. During the circulating interval, the transformer's primary current $I_p$ begins at zero and increases in magnitude to a first current value $+I_{p1}$ such that the energy stored in $L_{tot}$ is drawn from both the input and output ports of the converter 32, which is indicative of energy recirculation. The bridge voltage $V_{cd}$ remains at $-V_{out}$. Switch $SW_8$ is hard turned off to end the circulating interval at time t3 and to allow for subsequently turning on switch $SW_7$ with zero-voltage switching (ZVS) at time t4.

The charging interval begins when switch $SW_8$ is turned off at time t3, causing the bridge voltage $V_{cd}$ to go from $-V_{out}$ to zero, and switch $SW_7$ is turned on with zero-voltage switching (ZVS) at time t4. During the charging interval, $V_{chrg}$ is applied across total leakage inductance $L_{tot}$ as explained above. The transformer's primary current $I_p$ increases in magnitude from the first current value $+I_{p1}$ to a second current value $+I_{p2}$ that is greater than the first current value $+I_{p1}$, and energy is both stored in $L_{tot}$ and transferred to the load ($V_{out}$) due to the series connection of the input and output ports of the converter 32 as seen in FIGS. 5 and 6. The bridge voltage $V_{ab}$ remains at $+(V_{in}-V_{out})$ during the charging interval. The charging interval ends at time t5 when switch $SW_6$ is hard turned off, causing the bridge voltage $V_{cd}$ to go from zero to $+V_{out}$, which allows for soft turning on of switch $SW_5$ with zero-voltage switching (ZVS) at time t6.

The transfer interval starts when switch $SW_6$ is turned off at time t5 and switch $SW_5$ is subsequently soft turned on at time t6 and begins conducting. During the transfer interval, primary current decreases in magnitude from the second current value $+I_{p2}$ to zero. During the transfer interval, switches $SW_3$ and $SW_7$ remain on, allowing for synchronous rectification to minimize conduction losses. The bridge voltage $V_{ab}$ remains at $+(V_{in}-V_{out})$ and the bridge voltage $V_{cd}$ remains at $+V_{out}$ during the transfer interval. The transfer interval ends when the primary current $I_p$ reaches zero and switches $SW_1$ and $SW_3$ are turned off with zero-current switching (ZCS) at time t7, resulting in switches $SW_2$ and $SW_4$ being turned on at time t8 and causing the bridge voltage $V_{ab}$ to go from +($V_{in}$−$V_{out}$) to −($V_{in}$−$V_{out}$). The end of the transfer interval marks the beginning of the next switching semi-cycle. For the switching semi-cycle that begins at time t1, the intervals t1-t2, t3-t4, t5-t6 and t7-t8 are switching transition intervals, and the subsequent switching semi-cycle has corresponding switching transition intervals. Waveforms for the remaining switching semi-cycle in the Case II Forward M-RMS operating region are easily obtained by symmetry. In the subsequent semi-cycle, primary current reverses polarity reaching the first current value −$I_{p1}$ at the end of the circulating interval, reaching the second current value −$I_{p2}$ at the end of the charging interval, and reaching zero again at the end of the transfer interval. The bridge voltage $V_{ab}$ remains at −($V_{in}$−$V_{out}$) during the circulating, charging and transfer intervals and goes from −($V_{in}$−$V_{out}$) to +($V_{in}$−$V_{out}$) at the end of the transfer interval. The bridge voltage $V_{cd}$ goes from +$V_{out}$ to zero at the end of the circulating interval, remains at zero during the charging interval, goes from zero to −$V_{out}$ at the end of the charging interval, and remains at −$V_{out}$ during the transfer interval.

Neglecting switching transition times, the primary current waveform $I_p$ seen in FIG. 15 gives rise to the following relations for a switching semi-cycle in the Case II Forward M-RMS operating region:

$$D_{circ}*V_{circ}+D_{chrg}*V_{chrg}+D_{trnf}*V_{trnf}=0,$$

where $D_{circ}$ is the equivalent duty cycle for the circulating interval during a semi-cycle of primary current waveform $I_p$.

The transfer interval lasts for the remaining portion of the switching semi-cycle following the charging interval and gives rise to the following relation:

$$D_{trnf}=1-D_{circ}+D_{chrg}.$$

Over one switching period, average input current $I_{in}$ conforms to the following relation:

$$(D_{circ})^2*V_{circ}+(D_{chrg})^2*V_{chrg}+2*D_{circ}*D_{chrg}*V_{circ}-(D_{trnf})^2*V_{trnf}=I_{in}*4*L_{tot}/T_s.$$

From the preceding equations, charging and circulating interval duty cycles can be found in terms of a desired input current value, and the remaining parameters according to the following relations:

$$D_{chrg}=[(V_{dsch})^2-(V_{chrg})^2-I_{in}*8*L_{tot}*V_{dsch}/T_s]^{1/2}/V_{dsch},$$

and $$D_{circ}=-D_{chrg}/2-V_{trnf}/(2*V_{dsch}),$$

where $V_{dsch}$ was defined above.

In steady state operation, equating input and output power values after neglecting the converter's power losses provides the information needed to relate the input and output current values as follows:

$$I_{in}*V_{in}=I_{out}*V_{out}.$$

The waveforms for the Case II Forward F-ZVS operating region are depicted in FIG. 16. The Case II Forward F-ZVS operating region, which is used when $V_{trnf}$ is negative, is similar to the first transition Forward F-ZVS operating region (FIG. 14) except each switching semi-cycle in the Case II Forward F-ZVS operating region has a transfer interval added between the charging interval and the discharging interval, and the durations of these intervals, i.e. charging interval, transfer interval and discharging interval, are selected to force the primary current $I_p$ to reach the values +Ix and −Ix exactly at the end of the switching semi-cycles. This allows for intermediate-level power flow without having to hard turn off any switch's anti-parallel body diode, thus providing zero-voltage switching operation.

In the Case II Forward F-ZVS operating region, a switching semi-cycle begins at time t1 and, just prior to the start of the semi-cycle, switches $SW_1$, $SW_4$, $SW_5$ and $SW_7$ are off, switches $SW_2$, $SW_3$, $SW_6$ and $SW_8$ are on, bridge voltage $V_{ab}$ is at zero, bridge voltage $V_{cd}$ is at −$V_{out}$ from the previous semi-cycle and the transformer's primary current $I_p$ is at −$I_x$. The circulating interval begins at time t1 by hard turning off switch $SW_2$, causing the body diode of switch $SW_1$ to conduct primary current which allows turning on switch $SW_1$ with zero-voltage switching at time t2, while all the other switches remain in their conditions previous to t1. The bridge voltage $V_{ab}$ goes from zero to +($V_{in}$−$V_{out}$) at the start of the circulating interval. During the circulating interval, $V_{circ}$ (as previously defined) is applied across total leakage inductance $L_{tot}$ and the transformer's primary current $I_p$ crossing zero reverses polarity to reach +$I_x$ at the end of the circulating interval. The charging interval begins at time t3 by hard turning off switch $SW_8$, causing the body diode of switch $SW_7$ to conduct secondary current which allows turning on switch $SW_7$ with zero-voltage switching at time t4, while all the other switches remain in their conditions previous to t3. The bridge voltage $V_{cd}$ goes from −$V_{out}$ to zero at the start of the charging interval. During the charging interval, the transformer's primary current $I_p$ increases in magnitude from +$I_x$ to +$I_{p2}$. The transfer interval begins at time t5 by hard turning off switch $SW_6$, causing the body diode of switch $SW_5$ to conduct primary current which allows turning on switch $SW_5$ with zero-voltage switching at time t6, while all the other switches remain in their conditions previous to t5. The primary current decreases in magnitude from +$I_{p2}$ to +$I_{p1}$ during the transfer interval. The discharging interval begins at time t7 by hard turning off switch $SW_4$, causing the body diode of switch $SW_3$ to conduct secondary current which allows turning on switch $SW_3$ with zero-voltage switching at time t8, while all the other switches remain in their conditions previous to t7. The bridge voltage $V_{ab}$ goes from +($V_{in}$−$V_{out}$) to zero at the start of the discharging interval. During the discharging interval, the transformer's primary current $I_p$ decreases in magnitude from +$I_{p1}$ to +$I_x$. Waveforms for the subsequent switching semi-cycle are easily obtained by symmetry. In the subsequent switching semi-cycle, primary current crosses zero and reverses polarity to reach current value −$I_x$ at the end of the circulating interval, reaches current value −$I_{p2}$ at the end of the charging interval, reaches current value −$I_{p1}$ at the end of the transfer interval and reaches current value −$I_x$ at the end of the discharging interval.

Neglecting switching transition times, the primary current waveform $I_p$ seen in FIG. 16 gives rise to the following relations for a switching semi-cycle in the Case II Forward F-ZVS operating region:

$$D_{circ}*V_{circ}=(2*Ix)*4*L_{tot}T_s,$$

$$D_{chrg}*V_{chrg}+D_{trnf}*V_{trnf}-D_{dsch}*V_{dsch}=0$$

and $$1=D_{circ}+D_{chrg}+D_{dsch}+D_{trnf}.$$

Over one switching period, the average input current $I_{in}$ conforms to the following relation:

$$-(D_{trnf})^2 V_{trnf}+(D_{chrg})^2*V_{chrg}+C_{dsch}*D_{trnf}+((2*Ix)*4*L_{tot}/T_s)*(D_{trnf}+D_{chrg})=(I_{in})*4*L_{tot}/T_s.$$

From the preceding equations, a second degree algebraic equation for circulating duty cycle is obtained:

$$A*(D_{trnf})^2 + B*(D_{trnf}) + C = 0;$$

where $$A = V_{trnf} + 2*V_{dsch} - 2*V_{chrg}*V_{dsch}/V_{circ} - (V_{chrg})^3/(V_{circ})^2$$

$$B = -(2*Ix)*4*L_{tot}/T_s - 2*(1 - D_{circ})*V_{dsch} + 2*(1 - D_{circ})*(V_{dsch})^2/V_{circ} - (2*Ix)*4*L_{tot}/T_s*V_{chrg}/V_{circ} + 2*(1 - D_{circ})*V_{dsch}*(V_{chrg})^2/(V_{circ})^2$$

and $$C = (I_{in})*4*L_{tot}/T_s - (1 - D_{circ})^2*V_{chrg}*(V_{dsch})^2/(V_{circ})^2 - (1 - D_{circ})*(2*Ix)*4*L_{tot}/T_s*V_{dsch}/V_{circ}.$$

As a result, the following equation can be directly solved for transfer duty cycle:

$$D_{trnf} = [-B \pm [(B)^2 - 4*A*C]^{1/2}]/(2*A).$$

The transfer duty cycle and the preceding equations can be combined to find charging and discharging interval duty cycles in terms of a desired input current value and circulating primary current value. As mentioned above, there are multiple valid solutions in certain portions of this operating region and a preferred methodology involves using the solution that minimizes primary current's RMS value.

In steady state operation, equating input and output power values after neglecting the converter's power losses provides the information needed to relate the input and output current values as follows:

$$I_{in}*V_{in} = I_{out}*V_{out}.$$

The waveforms associated with the second transition Forward M-RMS operating region between the Case II Forward M-RMS and Case III Forward M-RMS operating regions are depicted in FIG. 17. The second transition Forward M-RMS operating region is similar to the Case II Forward M-RMS (FIG. 15) operating region but the second transition Forward M-RMS operating region does not have the charging interval that is present in the Case II Forward M-RMS operating region, i.e. charging duty cycle=0. Just prior to the switching semi-cycle that begins at time t1 in the second transition Forward M-RMS operating region, switches $SW_1$, $SW_3$, $SW_6$ and $SW_7$ are off and switches $SW_2$, $SW_4$, $SW_6$ and $SW_8$ are on from the previous semi-cycle. Bridge voltage $V_{ab}$ is at $-(V_{in}-V_{out})$, bridge voltage $V_{cd}$ is at $-V_{out}$, and primary current $I_p$ is going from $-I_p$ to zero from the previous semi-cycle. The circulating interval begins at time t1 when switches $SW_2$ and $SW_4$ are turned off with zero-current switching, and subsequently switches $SW_1$ and $SW_3$ are turned on at time t2, resulting in bridge voltage $V_{ab}$ going from $-(V_{in}-V_{out})$ to $+(V_{in}-V_{out})$. During the circulating interval, the primary current $I_p$ begins at zero and increases in magnitude to $+I_p$, and the bridge voltage $V_{cd}$ remains at $-V_{out}$. The circulating interval ends and the transfer interval begins when switches $SW_6$ and $SW_8$ are turned off at time t3, resulting in bridge voltage $V_{cd}$ going from $-V_{out}$ to $+V_{out}$, and subsequently switches $SW_5$ and $SW_7$ are turned on at time t4 with zero-voltage switching. The primary current $I_p$ decreases in magnitude from $+I_p$ until it reaches zero at the end of the transfer interval. Bridge voltage $V_{ab}$ remains at $+(V_{in}-V_{out})$ and bridge voltage $V_{cd}$ remains at $+V_{out}$ during the transfer interval. Once again, switches $SW_3$ and $SW_7$ remain on during the transfer interval. The transfer interval ends and the circulating interval for the next semi-cycle begins when switches $SW_1$ and $SW_3$ are turned off at time t5, which coincides with the primary current $I_p$ reaching zero, and switches $SW_2$ and $SW_4$ are turned on at time t6 resulting in bridge voltage $V_{ab}$ going from $+(V_{in}-V_{out})$ to $-(V_{in}-V_{out})$. For the switching semi-cycle that begins at time t1, intervals t1-t2, t3-t4 and t5-t6 are switching transition intervals, and the subsequent switching semi-cycle has corresponding switching transition intervals. Waveforms for the subsequent semi-cycle are easily obtained by symmetry. In the subsequent semi-cycle, the primary current reverses polarity and reaches $-I_p$ at the end of the circulating interval and reaches zero again at the end of the transfer interval, bridge voltage $V_{ab}$ remains at $-(V_{in}-V_{out})$ during the circulating and transfer intervals and goes from $-(V_{in}-V_{out})$ to $+(V_{in}-V_{out})$ at the end of the transfer interval, and bridge voltage $V_{cd}$ remains at $+V_{out}$ during the circulating interval and goes from $+V_{out}$ to $-V_{out}$ at the end of the circulating interval.

The duty cycle and voltage constraints for the second transition Forward M-RMS operating region become:

$$D_{circ}*V_{circ} + D_{trnf}*V_{trnf} = 0 \text{ and}$$

$$D_{circ} + D_{trnf} = 1.$$

As a result, the following relations apply:

$$D_{circ} = -V_{trnf}/(V_{circ} + V_{trnf}) \text{ and}$$

$$D_{circ}*V_{circ} = I_{in}*4*L_{tot}/T_s.$$

FIG. 18A illustrates the waveforms associated with the second transition Forward F-ZVS operating region between the Case II Forward F-ZVS and Case III Forward F-ZVS operating regions. The second transition Forward F-ZVS operating region is similar to the Case II Forward F-ZVS operating region (FIG. 16), but the second transition Forward F-ZVS operating region does not have the discharging interval that is present in the Case II Forward F-ZVS operating region, i.e. discharging duty cycle=0. In the second transition Forward F-ZVS operating region, a switching semi-cycle begins at time t1 and, just prior to the start of the semi-cycle, switches $SW_1$, $SW_3$, $SW_5$ and $SW_7$ are off, switches $SW_2$, $SW_4$, $SW_6$ and $SW_8$ are on, bridge voltage $V_{ab}$ is at $-(V_{in}-V_{out})$, bridge voltage $V_{cd}$ is at $-V_{out}$ from the previous semi-cycle and the transformer's primary current $I_p$ is at $-I_x$. The circulating interval begins at time t1 by hard turning off switches $SW_2$ and $SW_4$, causing the body diodes of switches $SW_1$ and $SW_3$ to conduct primary current which allows turning on switches $SW_1$ and $SW_3$ with zero-voltage switching at time t2, while all the other switches remain in their conditions previous to t1. The bridge voltage $V_{ab}$ goes from $-(V_{in}-V_{out})$ to $+(V_{in}-V_{out})$ at the start of the circulating interval. During the circulating interval, $V_{circ}$ (as previously defined) is applied across total leakage inductance $L_{tot}$ and the transformer's primary current $I_p$ crossing zero reverses polarity to reach $+I_x$ at the end of the circulating interval. The charging interval begins at time t3 by hard turning off switch $SW_8$, causing the body diode of switch $SW_7$ to conduct secondary current which allows turning on switch $SW_7$ with zero-voltage switching at time t4, while all the other switches remain in their conditions previous to t3. The bridge voltage $V_{cd}$ goes from $-V_{out}$ to zero at the start of the charging interval. During the charging interval the transformer's primary current $I_p$ increases in magnitude from $+I_x$ to $+I_p$. The transfer interval begins at time t5 by hard turning off switch $SW_6$, causing the body diode of switch $SW_5$ to conduct primary current which allows turning on switch $SW_5$ with zero-voltage switching at time t6, while all the other switches remain in their conditions previous to t5. The primary current decreases in magnitude from $+I_p$ to $+I_x$ during the transfer interval. For the switching semi-cycle that begins at time t1, intervals t1-t2, t3-t4 and t5-t6 are switching transition intervals and the subsequent semi-cycle has corresponding switching transition intervals. Waveforms for the subsequent semi-cycle are easily obtained by symmetry. In the subsequent semi-cycle, the primary current crosses zero and reverses polarity to reach $-I_x$ at the end of the circulating interval, reaches $-I_p$ at the end of the charging interval and reaches $-I_x$ at the end of the transfer interval.

Neglecting switching transition times, the primary current waveform $I_p$ seen in FIG. 18A gives rise to the following relations for a switching semi-cycle in the second transition Forward F-ZVS operating region:

$$D_{circ}*V_{circ}=(2*Ix)*4*L_{tot}/T_s \text{ and}$$

$$D_{chrg}*V_{chrg}+D_{trnf}*V_{trnf}=0.$$

The duty cycle constraint for the second transition Forward F-ZVS operating region becomes:

$$D_{circ}+D_{chrg}+D_{trnf}=1.$$

As a result, the following relations apply:

$$D_{chrg}=-V_{trnf}*(1-D_{circ})/(V_{chrg}-V_{trnf}),$$

$$D_{trnf}=-D_{chrg}*V_{chrg}/V_{trnf}$$

and $$-(D_{trnf})^2*V_{trnf}+(D_{chrg})^2*V_{chrg}+((2*Ix)*4*L_{tot}/T_s)*(D_{trnf}+D_{chrg})=(Iin)*4*L_{tot}/T_s.$$

FIG. 18B illustrates the waveforms associated with the Case III Forward F-ZVS operating region. The Case III Forward F-ZVS operating region is similar to the second transition Forward F-ZVS operating region (FIG. 18A), but the Case III Forward F-ZVS operating region does not have the circulating interval duration fixed. In the Case III Forward F-ZVS operating region, a switching semi-cycle begins at time t1 and, just prior to the start of the semi-cycle, switches $SW_1$, $SW_3$, $SW_5$ and $SW_7$ are off, switches $SW_2$, $SW_4$, $SW_6$ and $SW_8$ are on, bridge voltage $V_{ab}$ is at $-(V_{in}-V_{out})$, bridge voltage $V_{cd}$ is at $-V_{out}$ from the previous semi-cycle and the transformer's primary current $I_p$ is at $-I_x$. The circulating interval begins at time t1 by hard turning off switches $SW_2$ and $SW_4$, causing the body diodes of switches $SW_1$ and $SW_3$ to conduct primary current which allows turning on switches $SW_1$ and $SW_3$ with zero-voltage switching at time t2, while all the other switches remain in their conditions previous to t1. The bridge voltage $V_{ab}$ goes from $-(V_{in}-V_{out})$ to $+(V_{in}-V_{out})$ at the start of the circulating interval. During the circulating interval, $V_{circ}$ (as previously defined) is applied across total leakage inductance $L_{tot}$ and the transformer's primary current $I_p$ crossing zero reverses polarity and increases in magnitude to reach $+I_{p1}$ at the end of the circulating interval. The charging interval begins at time t3 by hard turning off switch $SW_8$, causing the body diode of switch $SW_7$ to conduct secondary current which allows turning on switch $SW_7$ with zero-voltage switching at time t4, while all the other switches remain in their conditions previous to t3. The bridge voltage $V_{cd}$ goes from $-V_{out}$ to zero at the start of the charging interval. During the charging interval, the transformer's primary current $I_p$ increases in magnitude from $+I_{p1}$ to $+I_{p2}$. The transfer interval begins at time t5 by hard turning off switch $SW_6$, causing the body diode of switch $SW_5$ to conduct primary current which allows turning on switch $SW_5$ with zero-voltage switching at time t6, while all the other switches remain in their conditions previous to t5. The primary current decreases in magnitude from $+I_{p2}$ to $+I_x$ during the transfer interval. Waveforms for the subsequent semi-cycle are easily obtained by symmetry. In the subsequent semi-cycle, the primary current crosses zero and reverses polarity to reach $-I_{p1}$ at the end of the circulating interval, reaches $-I_{p2}$ at the end of the charging interval and reaches $-I_x$ at the end of the transfer interval.

Neglecting switching transition times, the primary current waveform $I_p$ seen in FIG. 18B gives rise to the following relations for a switching semi-cycle in the Case III Forward F-ZVS operating region:

$$D_{circ}*V_{circ}+D_{chrg}*V_{chrg}+D_{trnf}*V_{trnf}=(2*Ix)*4*L_{tot}/T_s.$$

The duty cycle constraints for the second transition Forward F-ZVS operating region become:

$$D_{circ}+D_{chrg}+D_{trnf}=1$$

and $$-(D_{trnf})^2*V_{trnf}+(D_{chrg})^2*V_{chrg}+(D_{circ})^2*V_{circ}+2*D_{circ}*D_{chrg}*V_{circ}+((2*Ix)*4*L_{tot}/T_s)*(D_{trnf}-D_{chrg}-D_{circ})=(Iin)*4*L_{tot}/T_s.$$

From the preceding equations, charging, circulating and transfer interval duty-cycles can be found in terms of a desired input current value and circulating primary current value as follows:

$$D_{chrg} = \frac{T_s - 64*(Ix*L_{tot}/T_s)^2 - I_{in}*8*L_{tot}/T_s*V_{dsch} - V_{circ}*V_{trnf}]^{\frac{1}{2}}}{V_{dsch}},$$

$$D_{circ} = -\frac{V_{trnf}*(1+D_{chrg}) - 4*Ix*L_{tot}/T_s}{V_{dsch}}$$

and $$D_{trnf}=1-D_{circ}-D_{chrg}.$$

FIG. 18C illustrates the waveforms associated with the third transition Forward F-ZVS operating region between the Case III Forward F-ZVS and Case IV Forward F-ZVS operating regions. The third transition Forward F-ZVS operating region is similar to the Case III Forward F-ZVS operating region (FIG. 18B), but the third transition Forward F-ZVS operating region does not have the charging interval that is present in the Case III Forward F-ZVS operating region, i.e. charging duty cycle=0. In the third transition Forward F-ZVS operating region, a switching semi-cycle begins at time t1 and, just prior to the start of the semi-cycle, switches $SW_1$, $SW_3$, $SW_5$ and $SW_7$ are off, switches $SW_2$, $SW_4$, $SW_6$ and $SW_8$ are on, bridge voltage $V_{ab}$ is at $-(V_{in}-V_{out})$, bridge voltage $V_{cd}$ is at $-V_{out}$ from the previous semi-cycle and the transformer's primary current $I_p$ is at $-I_x$. The circulating interval begins at time t1 by hard turning off switches $SW_2$ and $SW_4$, causing the body diodes of switches $SW_1$ and $SW_3$ to conduct primary current which allows turning on switches $SW_1$ and $SW_3$ with zero-voltage switching at time t2, while all the other switches remain in their conditions previous to t1. The bridge voltage $V_{ab}$ goes from $-(V_{in}-V_{out})$ to $+(V_{in}-V_{out})$ at the start of the circulating interval. During the circulating interval, $V_{circ}$ (as previously defined) is applied across total leakage inductance $L_{tot}$ and the transformer's primary current $I_p$ crossing zero reverses polarity and increases in magnitude to reach $+I_p$ at the end of the circulating interval. The transfer interval begins at time t3 by hard turning off switches $SW_6$ and $SW_8$, causing the body diodes of switches $SW_5$ and $SW_7$ to conduct secondary current which allows turning on switches $SW_5$ and $SW_7$ with zero-voltage switching at time t4, while all the other switches remain in their conditions previous to t3. The bridge voltage $V_{cd}$ goes from $-V_{out}$ to +$V_{out}$ at the start of the transfer interval. The primary current decreases in magnitude from +$I_p$ to +$I_x$ during the transfer interval. Waveforms for the subsequent semi-cycle are easily obtained by symmetry. In the subsequent semi-cycle, the primary current crossing zero reverses polarity and reaches −$I_p$ at the end of the circulating interval and reaches at the end of the transfer interval.

Neglecting switching transition times, the primary current waveform $I_p$ seen in FIG. 18C gives rise to the following relation for a switching semi-cycle in the Case III Forward F-ZVS operating region:

$$D_{circ}*V_{circ}+D_{trnf}*V_{trnf}=(2*Ix)*4*L_{tot}/T_s.$$

The duty cycle constraint for the second transition Forward F-ZVS operating region becomes:

$$D_{circ}+D_{trnf}=1.$$

From the preceding equations, circulating interval duty-cycles can be found in terms of a desired circulating primary current value as follows:

$$D_{circ} = -\frac{V_{trnf} - I_x * 8 * L_{tot}/T_s}{V_{circ} - V_{trnf}}.$$

Input current is governed by:

$$(V_{circ}-V_{trnf})*D_{circ}*(1-D_{circ})=I_{in}*4*L_{tot}/T_s.$$

FIGS. 19, 20 and 21 depict the waveforms associated with a first aspect (FIG. 19), a second aspect (FIG. 20) and a third aspect (FIG. 21) of both the Case III Forward M-RMS and the Case IV Forward F-ZVS operating regions, which are employed for any $V_{trnf}$ value when power flow through the converter is high-level and all the switches can operate with zero-voltage switching (ZVS). The first, second and third aspects of the Case IV Forward F-ZVS operating region differ from the first, second and third aspects of the Case III Forward M-RMS operating region in that the magnitude of primary current $I_p$ at the instants when switching occurs in the three aspects of the Case IV Forward F-ZVS operating region is equal to or greater than the circulating primary current value Ix, whereas that magnitude can be less than the circulating primary current value Ix in the three aspects of the Case III Forward M-RMS operating region. FIG. 19 corresponds to the first aspect of the Case III Forward M-RMS and the Case IV Forward F-ZVS operating regions where $V_{trnf}$ is negative and, therefore, the primary current waveform $I_P$ has a negative slope during the transfer interval when $V_{trnf}$ is applied across total leakage inductance $L_{tot}$. FIG. 20 corresponds to the second aspect of the Case III Forward M-RMS and the Case IV Forward F-ZVS operating regions where $V_{trnf}$ is zero, and hence the primary current waveform Ip remains constant during the transfer interval. FIG. 21 corresponds to the third aspect of the Case III Forward M-RMS and the Case IV Forward F-ZVS operating regions where $V_{trnf}$ is positive and, therefore, the waveform for the transformer's primary current $I_P$ shows a positive slope when $V_{trnf}$ is applied across total leakage inductance $L_{tot}$.

The switching sequence for all three aspects of the Case III Forward M-RMS and Case IV Forward F-ZVS operating regions is the same as the switching sequence for the second transition Forward M-RMS (FIG. 17) and the third transition Forward F-ZVS (FIG. 18C) operating regions and thus it is composed of circulating and transfer intervals. In the first aspect (FIG. 19), primary current is at a first current value −$I_{p1}$ at the start of the circulating interval and crossing zero reverses polarity to reach a second current value +$I_{p2}$, greater than the first current value, at the end of the circulating interval. During the transfer interval, the primary current decreases in magnitude from the second current value +$I_{p2}$ to the first current value +$I_{p1}$. The characteristics of the bridge voltages $V_{ab}$ and $V_{cd}$ are similar to those in the second transition Forward M-RMS and the third transition Forward F-ZVS operating regions. In the subsequent semi-cycle, the primary current goes from the first current value +$I_{p1}$ and crossing zero reverses polarity to reach the second current value −$I_{p2}$ at the end of the circulating interval, and goes from second current value −$I_{p2}$ to first current value −$I_{p1}$ during the transfer interval. As pointed out above, the first current value $I_{p1}$ is equal to or greater than the circulating primary current value Ix in the Case IV Forward F-ZVS operating region whereas the first current value $I_{p1}$ in the Case III Forward M-RMS operating region can be less than the value Ix.

In the second aspect (FIG. 20), primary current is at −$I_p$ at the start of the circulating interval and crossing zero reverses polarity to reach +$I_p$ at the end of the circulating interval. During the transfer interval, the primary current remains at +$I_p$. In the subsequent semi-cycle, the primary current goes from +$I_p$ to −$I_p$ during the circulating interval and remains at −$I_p$ during the transfer interval. As pointed out above, the current value $I_p$ for the second aspect is equal to or greater than the circulating primary current value Ix in the Case IV Forward F-ZVS operating region but can be less than the value Ix in the Case III Forward M-RMS operating region.

In the third aspect (FIG. 21), primary current is at a second current value −$I_{p2}$ at the start of the circulating interval and crossing zero reverses polarity to reach a first current value +$I_{p1}$ at the end of the circulating interval. During the transfer interval, the primary current increases in magnitude from first current value +$I_{p1}$ to second current value +$I_{p2}$. The characteristics of the bridge voltages $V_{ab}$ and $V_{cd}$ are like those for the second aspect. In the subsequent semi-cycle, the primary current goes from second current value +$I_{p2}$ to first current value −$I_{p1}$ during the circulating interval. During the transfer interval, primary current goes from first current value to second current value −$I_{p2}$. The first current value $I_{p1}$ is greater than or equal to the value of circulating primary current Ix in the Case IV Forward F-ZVS operating region but can be less than the value Ix in the Case III Forward M-RMS operating region.

Waveforms for the remaining switching semi-cycles in the three aspects of the Case III Forward M-RMS and Case IV Forward F-ZVS operating regions are easily obtained by symmetry.

Neglecting switching transition times, the primary current waveform $I_p$ as seen in FIGS. 19, 20 and 21 gives rise to the following relation:

$$D_{circ}+D_{trnf}=1.$$

The average input current $I_{in}$, over one switching period, conforms to the following relation:

$$(V_{circ}-V_{ref})*D_{circ}*(1-D_{circ})=I_{in}*4*L_{tot}/T_s.$$

From the preceding equations, the circulating interval duty cycle can be found in terms of a desired input current value $I_{in}$ and the remaining parameters according to:

$$D_{circ} = \frac{1}{2} \pm \left(\frac{V_{dsch} - I_{in}*8*L_{tot}/T_s}{4*V_{dsch}}\right)^{\frac{1}{2}},$$

where multiple solutions exist.

In steady state operation, equating input and output power values after neglecting the converter's power losses provides the information needed to relate the input and output current values in accordance with the following relation:

$$I_{in}*V_{in}=I_{out}*V_{out}.$$

The third transition Forward M-RMS operating region between the Case III Forward M-RMS and Case IV Forward M-RMS operating regions is represented by the waveforms depicted in FIG. 22. The switching sequence for the third transition Forward M-RMS operating region is the same as that for the three aspects of the Case III Forward M-RMS and the Case IV Forward F-ZVS operating regions (FIGS. 19, 20 and 21). The third transition Forward M-RMS operating region is similar to the third aspect of the Case III Forward M-RMS operating region depicted in FIG. 21 except that the primary current $I_p$ reaches zero exactly at the end of the circulating intervals in the third transition Forward M-RMS operating region. Hence, for the semi-cycle that begins at time t1, the primary current $I_p$ is at $-I_p$ (which is comparable to $-I_{p2}$ in FIG. 21) at the start of the circulating interval, reaches zero at the end of the circulating interval, and reversing polarity reaches $+I_p$ (which is comparable to $+I_{p2}$ in FIG. 21) at the end of the transfer interval. Waveforms for the subsequent semi-cycle are easily obtained by symmetry. In the subsequent semi-cycle, the primary current goes from $+I_p$ to zero during the circulating interval, and goes from zero to $-I_p$ during the transfer interval. The characteristics of the bridge voltages $V_{ab}$ and $V_{cd}$ are like those for the bridge voltages $V_{ab}$ and $V_{cd}$ in FIG. 21. The duty cycle and voltage constraints for the third transition Forward M-RMS operating region are the same as that for the Case III Forward M-RMS operating regions as follows:

$$D_{circ}+D_{trnf}=1 \text{ and}$$

$$-D_{circ}*V_{circ}+D_{trnf}*V_{trnf}=0.$$

As a result, the following relations apply:

$$D_{circ}=V_{trnf}/(V_{circ}+V_{trnf}) \text{ and}$$

$$(V_{circ}-V_{trnf})*D_{circ}*(1-D_{circ})=I_{in}*4*L_{tot}/T_s.$$

The fourth transition Forward F-ZVS operating region between the Case IV Forward F-ZVS and Case V Forward F-ZVS operating regions is represented by the waveforms depicted in FIG. 23. The switching sequence for the fourth transition Forward F-ZVS operating region is the same as that for the Case IV Forward F-ZVS operating region (FIGS. 19, 20, 21). The fourth transition Forward F-ZVS operating region is similar to the Case IV Forward F-ZVS operating region depicted in FIG. 21 except that the primary current $I_p$ reaches the value Ix or −Ix exactly at the end of the circulating intervals in the fourth transition Forward F-ZVS operating region. Hence, for the semi-cycle that begins at time t1, the primary current $I_p$ is at $-I_p$ at the start of the circulating interval, reaches +Ix at the end of the circulating interval, and reaches $+I_p$ at the end of the transfer interval. Waveforms for the subsequent semi-cycle are easily obtained by symmetry. In the subsequent semi-cycle, the primary current goes from $+I_p$ at the start of the circulating interval to reach −Ix at the end of the circulating interval, and goes from −Ix to $-I_p$ during the transfer interval. The characteristics of the bridge voltages $V_{ab}$ and $V_{cd}$ are like those for the bridge voltages $V_{ab}$ and $V_{cd}$ in FIG. 21. The duty cycle constraint for the fourth transition Forward F-ZVS operating region is the same as that for the Case IV Forward F-ZVS operating regions as follows:

$$D_{circ}+D_{trnf}=1.$$

As a result, the following relations apply:

$$-D_{circ}*V_{circ}+D_{trnf}*V_{trnf}=-(2*I_x)*4*L_{tot}/T_s,$$

$$D_{circ}=((2*Ix)*4*L_{tot}/T_s+V_{trnf})/(V_{circ}+V_{trnf})) \text{ and}$$

$$(V_{circ}-V_{trnf})*D_{circ}*(1-D_{circ})=I_{in}*4*L_{tot}/T_s.$$

The waveforms associated with the Case IV Forward M-RMS operating region are depicted in FIG. 24. The Case IV Forward M-RMS operating region is employed for intermediate-level power flow and when $V_{trnf}$ is positive. A switching semi-cycle in the Case IV Forward M-RMS operating region is composed of a circulating interval, a transfer interval and a discharging interval following the transfer interval. The durations of all three intervals are selected to force the primary current $I_p$ to reach zero exactly at the end of the circulating interval, which allows for intermediate-level power flow without having to hard turn off any switch's anti-parallel body diode and while keeping both primary RMS current value and conduction losses to a minimum.

Just prior to the switching semi-cycle that begins at time t1, switches $SW_1$, $SW_4$, $SW_5$ and $SW_7$ are off, switches $SW_2$, $SW_3$, $SW_6$ and $SW_8$ are on, bridge voltage $V_{ab}$ is at zero, bridge voltage $V_{cd}$ is at $-V_{out}$, and primary current is going from $-I_{p2}$ to $-I_{p1}$ from the previous semi-cycle. The circulating interval begins at time t1 by hard turning off switch $SW_2$, resulting in bridge voltage $V_{ab}$ going from zero to $+(V_{in}-V_{out})$, and subsequently turning on switch $SW_1$ with zero-voltage switching (ZVS) at time t2. During the circulating interval, wherein $V_{circ}$ is applied across total leakage inductance $L_{tot}$, the transformer's primary current $I_p$ goes from a first current value $-I_{p1}$ to zero and energy stored in $L_{tot}$ is transferred to the converter's input and output ports. Switches $SW_3$, $SW_6$ and $SW_8$ remain on, switches $SW_4$, $SW_5$ and $SW_7$ remain off, and bridge voltage $V_{cd}$ remains at $-V_{out}$ during the circulating interval.

The circulating interval ends and the transfer interval begins at time t3 when the primary current $I_p$ reaches zero and both switches $SW_6$ and $SW_8$ are turned off with zero-current switching (ZCS), resulting in bridge voltage $V_{cd}$ going from $-V_{out}$ to $+V_{out}$. Switches $SW_5$ and $SW_7$ are subsequently turned on at time t4 and begin to conduct. The switches $SW_5$ and $SW_7$ discharge through themselves the equivalent capacitances seen between nodes c and d. The bridge voltage $V_{ab}$ remains at $+(V_{in}-V_{out})$ during the transfer interval. Switches $SW_3$ and $SW_7$ remain on during the transfer interval, allowing for synchronous rectification which minimizes conduction losses. During the transfer interval, primary current reverses polarity and increases in magnitude from zero to a second current value $+I_{p2}$ that is greater than the first current value $I_{p1}$.

The transfer interval ends and the discharging interval begins when switch $SW_3$ is hard turned off at time t5, resulting in bridge voltage $V_{ab}$ going from $+(V_{in}-V_{out})$ to zero, and switch $SW_4$ is subsequently soft turned on with zero-voltage switching (ZVS) at time t6. The discharging interval lasts the remaining portion of the switching semi-cycle. During the discharging interval, primary current decreases in magnitude from the second current value $+I_{p2}$ to the first current value $+I_{p1}$. Bridge voltage $V_{ab}$ remains at zero, and bridge voltage $V_{cd}$ remains at $+V_{out}$ during the discharging interval. The discharging interval ends and the circulating interval for the subsequent switching semi-cycle begins when switch $SW_1$ is hard turned off at time t7, causing bridge voltage $V_{ab}$ to go from zero to $-(V_{in}-V_{out})$, and subsequently switch $SW_2$ is turned on at time t8 with zero-voltage switching. For the switching semi-cycle that begins at time t1, intervals t1-t2, t3-t4, t5-t6 and t7-t8 are switching transition intervals, and the subsequent switching semi-cycle has corresponding switching transition intervals. Waveforms for the remaining switching semi-cycle in the Case IV Forward M-RMS operating region are easily obtained by symmetry. In the subsequent semi-cycle, bridge voltage $V_{ab}$ goes from zero to $-(V_{in}-V_{out})$ at the start of the circulating interval and goes from $-(V_{in}-V_{out})$ to zero at the end of the transfer interval. Bridge voltage $V_{cd}$ goes from $+V_{out}$ to $-V_{out}$ at the end of the circulating interval. Primary current goes from first current value $+I_{p1}$ to zero during the circulating interval, goes from zero to second current value $-I_{p2}$ during the transfer interval and goes from second current value $-I_{p2}$ to first current value $-I_{p1}$ during the discharging interval.

The duty cycle constraint for the Case IV Forward M-RMS operating region thusly becomes:

$$D_{circ}+D_{trnf}+D_{dsch}=1,$$

where $D_{dsch}$ is the equivalent duty cycle for the discharging interval during a switching semi-cycle of primary current waveform.

Neglecting switching transition times, the primary current waveform $I_p$ seen in FIG. 24 gives rise to the following relation:

$$-D_{circ}*V_{circ}+D_{trnf}*V_{trnf}-D_{dsch}*V_{dsch}=0.$$

Over one switching period, the average input current $I_{in}$ conforms to the following relation:

$$-(D_{circ})^2*V_{circ}+(D_{trnf})^2*V_{trnf}=I_{in}*4*L_{tot}/T_s.$$

From the preceding equations, circulating and transfer duty cycles can be obtained in terms of a desired input current value $I_{in}$ and the remaining parameters in accordance with the following relations:

$$D_{trnf}=\frac{1}{2}+\frac{\left\{V_{dsch}\pm\left[(V_{chrg})^2-(V_{dsch})^2-\frac{I_{in}*8*L_{tot}*(V_{chrg})^2}{T_s*V_{dsch}}\right]^{\frac{1}{2}}\right\}}{2*V_{chrg}}$$

and $$D_{circ}=D_{trnf}-V_{dsch}/V_{chrg},$$

where multiple solutions exist.

In steady state operation, equating input and output power values after neglecting the converter's power losses provides the information needed to relate input and output current values in accordance with the following relation:

$$I_{in}*V_{in}=I_{out}*V_{out}.$$

The waveforms associated with the Case V Forward F-ZVS operating region are depicted in FIG. 25. The Case V Forward F-ZVS operating region is employed for intermediate-level power flow and when $V_{trnf}$ is positive. The switching sequence for the Case V Forward F-ZVS operating region is the same as that for the Case IV Forward M-RMS operating region (FIG. 24) but the duration of all three intervals, i.e. circulating interval, transfer interval and discharging interval, are now selected to force the primary current Ip to reach the values +Ix and −Ix exactly at the end of the circulating intervals in the switching semi-cycles for the Case V Forward F-ZVS operating region. This allows for intermediate-level power flow while allowing zero-voltage switching (ZVS) operation for all the switches and minimization of switching losses.

During the circulating interval, the transformer's primary current $I_p$ begins at first current value $-I_{p1}$ and crosses zero reversing polarity to reach +Ix, such that some of the energy stored in $L_{tot}$ is transferred to the converter's input and output ports. The circulating interval ends and the transfer interval begins when the primary current $I_p$ reaches the value +Ix. During the transfer interval, primary current increases in magnitude from +Ix to second current value $+I_{p2}$. During the discharging interval, which lasts the remaining portion of the switching semi-cycle, primary current decreases from second current value $+I_{p2}$ to first current value $+I_{p1}$. The bridge voltages $V_{ab}$ and $V_{cd}$ have the same characteristics as in the Case IV Forward M-RMS operating region. Waveforms for the remaining semi-cycle are easily obtained by symmetry. In the subsequent semi-cycle, the primary current $I_p$ is at first current value $+I_{p1}$ at the start of the circulating interval, reaches the value −Ix at the end of the circulating interval, reaches the second current value $-I_{p2}$ at the end of the transfer interval, and reaches first current value $-I_{p1}$ at the end of the discharging interval.

From the primary current waveform $I_p$ seen in FIG. 25, neglecting switching transition times, the following relations are obtained:

$$D_{circ}+D_{trnf}+D_{dsch}=1$$

and $$-D_{circ}*V_{circ}+D_{trnf}*V_{trnf}-D_{dsch}*V_{dsch}=-(2*Ix)*4*L_{tot}/T_s.$$

Over one switching period, average input current $I_{in}$ conforms to the following relation:

$$-(D_{circ})^2*V_{circ}+(D_{trnf})^2*V_{trnf}+(D_{circ}+D_{trnf})*(2*Ix)*4*L_{tot}/T_s=I_{in}*4*L_{tot}/T_s.$$

From the preceding equations, circulating and transfer duty cycles can be found in terms of a desired input current value and the remaining parameters in accordance with the following relations:

$$D_{circ}=\frac{1}{2}+$$

$$\left\{Ix*8*\frac{L_{tot}}{T_s}-V_{dsch}\pm\left[\begin{array}{c}(V_{chrg})^2*(V_{dsch})^2+Ix*16*\frac{L_{tot}}{T_s}*\\ V_{dsch}-64*\left(Ix*\frac{L_{tot}}{T_s}\right)^2-\\ I_{in}*8*\frac{L_{tot}}{T_s}*(V_{chrg})^2/(V_{dsch})\end{array}\right]^{\frac{1}{2}}\right\}/$$

$$(2*V_{chrg}),$$

and $$D_{trnf}=D_{circ}+\left(V_{dsch}-Ix*8*\frac{L_{tot}}{T_s}\right)/V_{chrg},$$

where multiple solutions exist.

In steady state operation, equating input and output power values after neglecting the converter's power losses provides the information needed to relate input and output current values in accordance with the following relation:

$$I_{in}*V_{in}=I_{out}*V_{out}.$$

The fourth transition Forward M-RMS operating region between the Case IV Forward M-RMS and the Case V Forward M-RMS operating regions has the waveforms depicted in FIG. 26. The fourth transition Forward M-RMS operating region is similar to the Case IV Forward M-RMS operating region (FIG. 24) except the circulating duty cycle is equal to zero in the fourth transition Forward M-RMS operating region. Just prior to the start of the switching semi-cycle that begins at time t1, switches $SW_1$, $SW_3$, $SW_5$ and $SW_7$ are off, switches $SW_2$, $SW_4$, $SW_6$ and $SW_8$ are on, bridge voltage $V_{ab}$ is at $-(V_{in}-V_{out})$, bridge voltage $V_{cd}$ is at $-V_{out}$, and primary current is at $-I_p$ from the previous semi-cycle. The discharging interval begins at time t1 when switch $SW_4$ is turned off, causing bridge voltage $V_{ab}$ to go from $-(V_{in}-V_{out})$ to zero, and switch $SW_3$ is turned on at time t2. Primary current is at $-I_p$ at the start of the discharging interval, and reaches zero at the end of the discharging interval. Bridge voltage $V_{cd}$ remains at $-V_{out}$ during the discharging interval. The discharging interval ends and the transfer interval begins when switches $SW_2$, $SW_6$, and $SW_8$ are turned off at time t3 with zero-current switching, and switches $SW_1$, $SW_5$ and $SW_7$ are turned on at time t4, which discharge through themselves the equivalent capacitances seen between their source and drain terminals, resulting in bridge voltage $V_{cd}$ going from $-V_{out}$ to $+V_{out}$ and bridge voltage $V_{ab}$ going from zero to $+(V_{in}-V_{out})$. During the transfer interval, primary current reverses polarity and increases in magnitude from zero to reach $+I_p$ at the end of the transfer interval, bridge voltage $V_{ab}$ remains at $+(V_{in}-V_{out})$, and bridge voltage $V_{cd}$ remains at $+V_{out}$. The transfer interval is followed by the discharging interval of the next switching semi-cycle, waveforms for which are easily obtained by symmetry. In the next semi-cycle, primary current goes from $+I_p$ to zero during the discharging interval, and goes from zero to during the transfer interval. Bridge voltage $V_{ab}$ goes from $+(V_{in}-V_{out})$ to zero at the start of the discharging interval, and goes from zero to $-(V_{in}-V_{out})$ at the start of the transfer interval. Bridge voltage $V_{cd}$ remains at $+V_{out}$ during the discharging interval and goes from $+V_{out}$ to $-V_{out}$ at the start of the transfer interval. The duty cycle constraint for the fourth transition Forward M-RMS operating region becomes dictated by the following relation:

$$D_{dsch}+D_{trnf}=1.$$

As a result, the following relations apply:

$$D_{trnf}*V_{trnf}-(1-D_{trnf})*V_{dsch}=0,$$

$$D_{trnf}=V_{dsch}/(V_{dsch}+V_{trnf}), \text{ and}$$

$$V_{trnf}*(D_{trnf})^2=I_{in}*4*L_{tot}/T_s.$$

The fifth transition Forward F-ZVS operating region between the Case V Forward F-ZVS and the Case VI Forward F-ZVS operating regions has the waveforms depicted in FIG. 27. The fifth transition Forward F-ZVS operating region has the same switching sequence as the Case V Forward F-ZVS operating region (FIG. 25), and the primary current goes from $-Ix$ to current value $+Ix$ during the circulating interval, goes from $+Ix$ to current value $+I_p$ during the transfer interval, and goes from $+I_p$ to $+Ix$ during the discharging interval in the fifth transition Forward F-ZVS operating region. Waveforms for the remaining semi-cycle are easily obtained by symmetry. In the next semi-cycle, primary current goes from $+Ix$ to current value $-Ix$ during the circulating interval, goes from $-Ix$ to $-I_p$ during the transfer interval, and goes from $-I_p$ to $-Ix$ during the discharging interval. The duty cycle and voltage constraints become dictated by the following relations:

$$D_{circ}+D_{trnf}+D_{dsch}=1,$$

$$D_{circ}*V_{circ}=(2*Ix)*4*L_{tot}/T_s \text{ and}$$

$$D_{trnf}*V_{trnf}-D_{dsch}*V_{dsch}=0.$$

As a result, the following relations apply:

$$D_{trnf}=V_{dsch}*(1-D_{circ})/(V_{dsch}+V_{trnf})$$

and $$V_{trnf}*(D_{trnf})^2+(2*Ix)*4*\frac{L_{tot}}{T_s}*D_{trnf}=I_{in}*4*L_{tot}/T_s.$$

FIG. 28 depicts the waveforms associated with the Case V Forward M-RMS operating region. This operating region is intended for low-level power flow through the converter, as is evident by the interval during which primary current $I_p$ remains at zero, and when $V_{trnf}$ is positive. The Case V Forward M-RMS operating region has a transfer interval in which $V_{trnf}$ is applied across total leakage inductance $L_{tot}$, the transformer's primary current $I_p$ increases in magnitude, and energy is both stored in $L_{tot}$ and transferred to the converter's output port via the series output port connection and also through the transformer 38. Just prior to the switching semi-cycle that begins at time t1, switches $SW_1$, $SW_4$, $SW_6$ and $SW_7$ are off, switches $SW_2$, $SW_3$, $SW_6$ and $SW_8$ are on, bridge voltages $V_{ab}$ and $V_{cd}$ are at zero, and transformer primary current is at zero from the previous semi-cycle. The transfer interval begins at time t1 by turning off both switches $SW_2$ and $SW_8$ with zero-current switching (ZCS), resulting in bridge voltage $V_{ab}$ going to $+(V_{in}-V_{out})$ and bridge voltage $V_{cd}$ going to $+V_{out}$, and subsequently turning on both switches $SW_1$ and $SW_7$ at time t2. The switches $SW_1$ and $SW_7$ discharge through themselves the equivalent capacitances seen between their drain and source terminals. During the transfer interval, primary current increases in magnitude from zero to $+I_p$. Switches $SW_3$ and $SW_7$ remain on during the transfer interval, allowing for synchronous rectification which minimizes conduction losses. The transfer interval ends and a discharging interval begins at time t3 when switch $SW_3$ is hard turned off, resulting in bridge voltage $V_{ab}$ going to zero, and switch $SW_4$ is subsequently turned on with zero-voltage switching (ZVS) at time t4. During the discharging interval, primary current decreases from $+I_p$ to zero. The discharging interval ends when the primary current $I_p$ reaches zero at time t5. At this instant, switch $SW_6$ is turned off with zero-current switching (ZCS) to avoid unnecessary circulating energy which would lead to additional power losses, and the bridge voltage $V_{cd}$ goes to zero. The idling interval begins when switch $SW_6$ is subsequently turned on at time t6. The idling interval lasts for the remaining portion of the switching semi-cycle. During the idling interval, the bridge voltages $V_{ab}$ and $V_{cd}$ and the transformer's primary current $I_p$ remain at zero. The idling interval ends and the next semi-cycle begins when switches $SW_1$ and $SW_7$ are turned off at time t7 with zero-current switching, resulting in switches $SW_2$ and $SW_8$ being turned on at time t8. For the switching semi-cycle that begins at time t1, intervals t1-t2, t3-t4, t5-t6 and t7-t8 are switching transition intervals, and the subsequent switching semi-cycle has corresponding switching transition intervals. Waveforms for the remaining switching semi-cycle in the Case V Forward M-RMS operating region are easily obtained by symmetry. In the subsequent semi-cycle, primary current begins at zero and reverses polarity to reach $-I_p$ at the end of the transfer interval, goes from $-I_p$ to zero during the discharging interval, and remains at zero during the idling interval. The bridge voltage $V_{ab}$ goes from zero to $-(V_{in}-V_{out})$ at the start of the transfer interval, goes from $-(V_{in}-V_{out})$ to zero at the start of the discharging interval, and remains at zero during the idling interval. The bridge voltage $V_{cd}$ goes from zero to $-V_{out}$ at the start of the transfer interval, goes from $-V_{out}$ to zero at the end of the discharging interval, and remains at zero during the idling interval.

Neglecting transition times, the primary current waveform $I_p$ seen in FIG. 28 gives rise to the following relation:

$$D_{trnf}*V_{trnf}-D_{dsch}*V_{dsch}=0,$$

where $D_{dsch}$ is the equivalent duty cycle for the discharging interval during a switching semi-cycle of primary current waveform.

Over one switching period, average input current $I_{in}$ conforms to the following relation:

$$V_{trnf}*(D_{trnf})^2=I_{in}*4*L_{tot}/T_s.$$

The preceding equations allow the transfer, discharging and idling duty cycles to be found in terms of a desired input current value and the remaining parameters according to the following relations:

$$D_{trnf}=(I_{in}*4*L_{tot}/(T_s*V_{trnf}))^{1/2},$$

$$D_{dsch}=D_{trnf}*V_{trnf}/V_{dsch} \text{ and}$$

$$D_{trnf}+D_{dsch}+D_{id\,ln}=1.$$

In steady state operation, equating input and output power values after neglecting the converter's power losses provides the information needed to relate input and output current values according to the following relation:

$$I_{in}*V_{in}=I_{out}*V_{out}.$$

The waveforms for the Case VI Forward F-ZVS operating region are depicted in FIG. 29. The Case VI Forward F-ZVS operating region, which is used when $V_{trnf}$ is positive, has the same switching sequence as the Case II Forward F-ZVS operating region (FIG. 16) where the durations of charging interval, transfer interval and discharging interval are selected to force the primary current $I_p$ to reach the values $+I_x$ and $-I_x$ exactly at the end of the switching semi-cycles. This allows for intermediate-level power flow without having to hard turn off any switch's anti-parallel body diode, thus providing zero-voltage switching operation.

During the circulating interval in the switching sequence for the Case VI Forward F-ZVS operating region, the transformer's primary current $I_p$ begins at $-I_x$ and crossing zero reverses polarity to reach current value $+I_x$ at the end of the circulating interval. During the charging interval, the transformer's primary current $I_p$ increases in magnitude from $+I_x$ to current value $+I_{p1}$. During the transfer interval, primary current increases in magnitude from current value $+I_{p1}$ to current value $+I_{p2}$. The discharging interval, which follows the transfer interval, ends when the primary current reaches $+I_x$ at the end of the switching semi-cycle. Waveforms for the remaining switching semi-cycle in the Case VI Forward F-ZVS operating region are easily obtained by symmetry. In the subsequent switching semi-cycle, primary current reaches current value $-I_x$ at the end of the circulating interval, reaches current value $-I_{p1}$ at the end of the charging interval, reaches current value $-I_{p2}$ at the end of the transfer interval and reaches $-I_x$ at the end of the discharging interval.

Neglecting switching transition times, the primary current waveform $I_p$ seen in FIG. 29 gives rise to the following relations for a switching semi-cycle in the Case VI Forward F-ZVS operating region:

$$D_{circ}*V_{circ}=(2*Ix)*4*L_{tot}/T_s,$$

$$D_{chrg}*V_{chrg}+D_{trnf}*V_{trnf}-D_{dsch}*V_{dsch}=0$$

and $$1=D_{circ}+D_{chrg}D_{dsch}+D_{trnf}.$$

Over one switching period, the average input current $I_{in}$ conforms to the following relation:

$$-(D_{trnf})^2*V_{trnf}+(D_{chrg})^2*V_{chrg}+V_{dsch}*D_{dsch}*D_{trnf}+\\((2*Ix)*4*L_{tot}/T_s)*(D_{trnf}+D_{chrg})=(Iin)*4*L_{tot}/T_s.$$

From the preceding equations, a second degree algebraic equation for circulating duty cycle is obtained:

$$A*(D_{trnf})^2+B*(D_{trnf})+C=0;$$

where $$A=V_{trnf}+2*V_{dsch}-2*V_{chrg}*V_{dsch}/V_{circ}-(V_{chrg})^3/(V_{circ})^2,$$

$$B=-(2*Ix)*4*L_{tot}/T_s-2*(1-D_{circ})*V_{dsch}+2*(1-D_{circ})*\\(V_{dsch})^2/V_{circ}-(2*Ix)*4*L_{tot}/T_s*V_{chrg}/V_{circ}+2*(1-\\D_{circ})*V_{dsch}*(V_{chrg})^2/(V_{circ})^2$$

and $$C=(I_{in})*4*L_{tot}/T_s-(1-D_{circ})^2*V_{chrg}*(V_{dsch})^2/(V_{circ})^2-\\(1-D_{circ})*(2*Ix)*4*L_{tot}/T_s*V_{dsch}/V_{circ}.$$

The following equation can be directly solved for the transfer duty cycle:

$$D_{trnf}=[-B\pm[(B)^2-4*A*C]^{1/2}]/(2*A).$$

The transfer duty cycle and the preceding equations can be combined to find charging and discharging interval duty cycles in terms of a desired input current value and circulating primary current value. As mentioned above, there are multiple valid solutions in certain portions of this operating region and a preferred methodology is to use the solution that minimizes primary current's RMS value.

In steady state operation, equating input and output power values after neglecting the converter's power losses provides the information needed to relate the input and output current values as follows:

$$I_{in}*V_{in}=I_{out}*V_{out}.$$

Waveforms for the sixth transition Forward F-ZVS operating region between the Case VI Forward F-ZVS and Case VII Forward F-ZVS operating regions are shown in FIG. 30. The switching sequence for the sixth transition Forward F-ZVS operating region is the same as that for the first transition Forward F-ZVS operating region (FIG. 14) except that $V_{trnf}$ is positive. Consequently, the switching sequence for the sixth transition Forward F-ZVS operating region has the primary current $I_p$ beginning at $-I_x$ when the circulating interval starts at time t1, reaching $+I_x$ at the end of the circulating interval, reaching the value of $+I_p$ at the end of the charging interval and reaching the value of $+I_x$ at the end of the discharging interval. In the subsequent switching semi-cycle, waveforms for which are easily obtained by symmetry, primary current reaches $-I_x$ at the end of the circulating interval, reaches the value $-I_p$ at the end of the charging interval and reaches the value of $-I_x$ at the end of the discharging interval.

The duty cycle constraints for operation in the sixth transition Forward F-ZVS operating region thusly become:

$$D_{circ}*V_{circ}=(2*Ix)*4*L_{tot}/T_s,$$

$$D_{chrg}*V_{chrg}-D_{dsch}*V_{dsch}=0$$

and $$1-D_{circ}-D_{chrg}-D_{dsch}=0.$$

As a result, the following relations apply:

$$D_{chrg}=V_{dsch}*(1-D_{circ})/(V_{dsch}+V_{chrg}),$$

$$D_{dsch}=D_{chrg}*V_{chrg}/V_{dsch} \text{ and}$$

$$((D_{chrg})^2*V_{chrg}+(D_{chrg})*(2*Ix)*4*L_{tot}/T_s)=\\I_{in}*4*L_{tot}/T_s.$$

Waveforms for the Case VII Forward F-ZVS operating region are shown in FIG. 31. The Case VII Forward F-ZVS operating region, which is used when $V_{trnf}$ is positive, has the same switching sequence as the Case I Forward F-ZVS operating region (FIG. 12). In the Case VII Forward F-ZVS operating region, a switching semi-cycle begins at time t1 and, just prior to the start of the semi-cycle, switches $SW_1$, $SW_4$, $SW_5$ and $SW_7$ are off, switches $SW_2$, $SW_3$, $SW_6$ and $SW_8$ are on, bridge voltage $V_{ab}$ is at zero, bridge voltage $V_{cd}$ is at $-V_{out}$ from the previous semi-cycle and the transformer's primary current $I_p$ is at $-I_x$. The circulating interval begins at time t1 by hard turning off switch $SW_2$, causing the body diode of switch $SW_1$ to conduct primary current which allows turning on switch $SW_1$ with zero-voltage switching at time t2, while all the other switches remain in their conditions previous to t1. The bridge voltage $V_{ab}$ goes from zero to $+(V_{in}-V_{out})$ at the start of the circulating interval. During the circulating interval, $V_{circ}$ (as previously defined) is applied across total leakage inductance $L_{tot}$ and the transformer's primary current $I_p$ crossing zero reverses polarity to reach $+I_x$ at the end of the circulating interval. The charging interval begins at time t3 by hard turning off switch $SW_8$, causing the body diode of switch $SW_7$ to conduct secondary current which allows turning on switch $SW_7$ with zero-voltage switching at time t4, while all the other switches remain in their conditions previous to t3. The bridge voltage $V_{cd}$ goes from $-V_{out}$ to zero at the start of the charging interval. During the charging interval in the Case VII Forward F-ZVS operating region, the transformer's primary current $I_p$ increases in magnitude from $+I_x$ to $+I_p$. The freewheeling interval begins at time t5 by hard turning off switch $SW_3$, causing the body diode of switch $SW_4$ to conduct primary current which allows turning on switch $SW_4$ with zero-voltage switching at time t6, while all the other switches remain in their conditions previous to t5. The primary current $I_p$ remains at $+I_p$ during the freewheeling interval. The discharging interval begins at time t7 by hard turning off switch $SW_6$, causing the body diode of switch $SW_5$ to conduct secondary current which allows turning on switch $SW_5$ with zero-voltage switching at time t8, while all the other switches remain in their conditions previous to t7. The bridge voltage $V_{cd}$ goes from zero to $-V_{out}$ at the start of the discharging interval. During the discharging interval in the Case VII Forward F-ZVS operating region, the transformer's primary current $I_p$ decreases in magnitude from $+I_p$ to $+I_x$. Waveforms for the subsequent switching semi-cycle in the Case VII Forward F-ZVS operating region are easily obtained by symmetry. During the subsequent semi-cycle, primary current goes from $+I_x$ to $-I_x$ during the circulating interval, goes from $-I_x$ to $-I_p$ during the charging interval, remains at $-I_p$ during the freewheeling interval and goes from $-Ip$ to $-I_x$ during the discharging interval. This approach avoids both dissipation in the MOSFETs of the energy stored in the node capacitances and hard turn-off of the MOSFET's body diodes, and hence it minimizes switching losses. The Case VII Forward F-ZVS operating region allows higher efficient operation when combinations of high voltages, large node capacitances and high switching frequencies are handled by the controller.

From the primary current waveform $I_p$ seen in FIG. 31 and neglecting switching transition times, the following relations hold for a switching semi-cycle in the Case VII Forward F-ZVS operating region:

$$D_{chrg}*V_{chrg}-D_{dsch}*V_{dsch}=0$$

and $$D_{circ}*V_{circ}=(2*Ix)*4*L_{tot}/T_s.$$

Over one switching period, the average input current $I_{in}$ conforms to the following relation:

$$(D_{chrg})^2*V_{chrg}+(D_{chrg})*(2*Ix)*4*L_{tot}/T_s=I_{in}*4*L_{tot}/T_s.$$

where Ts is the switching period.

From the aforementioned equations, charging and discharging duty cycles can be determined in terms of a desired input current value, a desired circulating primary current value, and remaining parameters according to the following relations:

$$D_{chrg}=\{-Ix+[Ix^2+I_{in}*V_{chrg}]^{1/2}\}*4*L_{tot}/(T_s*V_{chrg})$$

and $$D_{dsch}=D_{chrg}*V_{chrg}/V_{dsch}.$$

The freewheeling interval lasts for the remaining portion of the switching semi-cycle and its duty cycle is determined by the relation:

$$1-D_{circ}-C_{chrg}-D_{dsch}=D_{freew}.$$

The modulation control scheme described above is readily adaptable to the reverse or second direction power flow modes of operation as seen in FIGS. 9 and 10. In the reverse direction power flow modes, the input ($V_{out}$) to the dual active bridge (DAB) bidirectional isolated DC to DC converter 32 comes from the battery bank 16, and the output ($V_{in}$) from the converter 32 is supplied to the DC load 18. To simplify the following explanation of the reverse direction power flow modes of operation, the switches shown in FIG. 6 and previously referred to as switches $SW_5$-$SW_8$ in the forward direction power flow modes of operation have been renamed as switches $SW_1'$-$SW_4'$, respectively, in FIG. 10 and they serve the same function as the switches $SW_1$-$SW_4$ in the forward direction power flow modes of operation. The switches shown in FIG. 6 and previously referred to as switches $SW_1$-$SW_4$ in the forward direction power flow modes of operation have been renamed as switches $SW_5'$-$SW_8'$, respectively, in FIG. 10 and they serve the same function as the switches $SW_5$-$SW_8$ in the forward direction power flow modes of operation. As further seen in FIG. 10, the bridge 36, which now functions as the primary or input bridge, thusly contains the switches $SW_1'$-$SW_4'$, and the bridge 34, which now functions as the secondary or output bridge, thusly contains the switches $SW_5'$-$SW_8'$. The nodes previously identified in FIG. 6 as nodes c and d in bridge 36 have thusly been renamed in FIG. 10 as nodes a' and b', and the nodes previously identified in FIG. 6 as nodes a and b in bridge 34 have been renamed in FIG. 10 as nodes c' and d'. In addition, the input and output ports have been interchanged in FIG. 10 compared to the input and output ports seen in FIG. 6 for the forward direction power flow modes of operation, such that $V_{out}$ is supplied as input to bridge 36 from the battery bank 16, and $V_{in}$ is supplied as output from bridge 34 to the DC load 18. Accordingly, the waveforms depicted in FIGS. 11-31, 34 and 35 for the gate signals $G_1$-$G_8$ associated with switches $SW_1$-$SW_8$ when the converter operates in the forward direction power flow modes of operation are the waveforms for the gate signals $G_1'$-$G_8'$ associated with switches $SW_1'$-$SW_8'$, respectively, when the converter operates in the reverse direction power flow modes of operation. The waveforms depicted in FIGS. 11-31, 34 and 35 for the bridge voltage $V_{ab}$ across nodes a and b in bridge 34 when the converter operates in the forward direction power flow modes of operation are the waveforms for the bridge voltage $V_{a'b'}$ across nodes a' and b' in bridge 36 when the converter operates in the reverse direction power flow modes of operation. The waveforms depicted in FIGS. 11-31, 34 and 35 for the bridge voltage $V_{cd}$ across nodes c and d in bridge 36 when the converter operates in the forward direction power flow modes of operation are the waveforms for the bridge voltage $V_{c'd'}$ across nodes c' and d' in bridge 34 when the converter operates in the reverse direction power flow modes of operation. The waveforms depicted in FIGS. 11-31, 34 and 35 for transformer primary current $I_p$ ($I_{in}$) when the converter operates in the forward direction power flow modes of operation are the waveforms for $I'_p$, which is also related to the input current component to bridge 36 represented in FIG. 9 as $I'_{i1}$, when the converter operates in the reverse direction power flow modes of operation.

The mathematical relations and equations described above for the forward direction power flow M-RMS and F-ZVS modes of operation are adapted for the reverse direction power flow M-RMS (Reverse M-RMS) and F-ZVS (Reverse F-ZVS) modes of operation by replacing the terms $(V_{in}-V_{out})$ and $V_{out}/n$ in the preceding relations and equations with $V_{out}$ and $(V_{in}-V_{out})*n$, respectively. In the reverse direction power flow modes of operation, $V'_{trnf}$ (transfer) thusly becomes $V_{out}-(V_{in}-V_{out})*n$ as it gets applied across total leakage inductance $L'_{tot}$ seen on the secondary side and which now equals $L_{tot}/n^2$; the voltage sum $V_{out}+(V_{in}-V_{out})*n$ becomes $V'_{circ}$ (circulating); the voltage $V_{out}$ becomes $V'_{chrg}$ (charging); and the voltage $(V_{in}-V_{out})*n$ becomes $V'_{dsch}$ (discharging). Again, the converter's operating range in the Reverse M-RMS mode of operation is divided into five different cases or main operating regions as well as border or transition operating regions between adjacent cases or main operating regions, and the converter's operating range in the Reverse F-ZVS mode of operation is divided into seven different cases or main operating regions as well as border or transition operating regions between adjacent cases or main operating regions. Each of the Reverse M-RMS and Reverse F-ZVS operating regions divides the switching period into intervals that take the name of the appropriate voltage, i.e. $V'_{chrg}$, $V'_{trnf}$, $V'_{circ}$, $V'_{dsch}$, $V'_{freew}$, $V'_{idln}$, being applied across total leakage inductance $L'_{tot}$.

The five different cases or main operating regions in the Reverse M-RMS mode of operation are: Case I (first main) Reverse M-RMS operating region, Case II (second main) Reverse M-RMS operating region, Case III (third main) Reverse M-RMS operating region, Case IV (fourth main) Reverse M-RMS operating region, and Case V (fifth main) Reverse M-RMS operating region. The Reverse M-RMS mode of operation also includes the following transition or border operating regions: first transition Reverse M-RMS operating region between the Case I Reverse M-RMS and Case II Reverse M-RMS operating regions, second transition Reverse M-RMS operating region between the Case II Reverse M-RMS and Case III Reverse M-RMS operating regions, third transition Reverse M-RMS operating region between the Case III Reverse M-RMS and Case IV Reverse M-RMS operating regions, and fourth transition Reverse M-RMS operating region between the Case IV Reverse M-RMS and Case V Reverse M-RMS operating regions.

The seven different cases or main operating regions in the Reverse F-ZVS mode of operation are: Case I (first main) Reverse F-ZVS operating region, Case II (second main) Reverse F-ZVS operating region, Case III (third main) Reverse F-ZVS operating region, Case IV (fourth main) Reverse F-ZVS operating region, Case V (fifth main) Reverse F-ZVS operating region, Case VI (sixth main) Reverse F-ZVS operating region and Case VII (seventh main) Reverse F-ZVS operating region. The Reverse F-ZVS mode of operation also includes the following transition or border operating regions: first transition Reverse F-ZVS operating region between the Case I Reverse F-ZVS and Case II Reverse F-ZVS operating regions, second transition Reverse F-ZVS operating region between the Case II Reverse F-ZVS and Case III Reverse F-ZVS operating regions, third transition Reverse F-ZVS operating region between the Case III Reverse F-ZVS and Case IV Reverse F-ZVS operating regions, fourth transition Reverse F-ZVS operating region between the Case IV Reverse F-ZVS and Case V Reverse F-ZVS operating regions, fifth transition Reverse F-ZVS operating region between the Case V Reverse F-ZVS and Case VI Reverse F-ZVS operating regions, and sixth transition Reverse F-ZVS operating region between the Case VI Reverse F-ZVS and Case VII Reverse F-ZVS operating regions.

The graph of FIG. 11 shows, from top to bottom, waveforms for the gate voltages or switching signals applied in accordance with the modulation control scheme to gates $G_1'$, $G_2'$, $G_3'$ and $G_4'$ corresponding to switches $SW_1'$, $SW_2'$, $SW_3'$ and $SW_4'$, respectively, the bridge voltage $V_{a'b'}$, the transformer's primary current $I'_p$, which is also related to the input current component $I'_{i1}$ the bridge voltage $V_{c'd'}$, and the gate voltages or switching signals applied to gates $G_5'$, $G_6'$ $G_7$ and $G_8'$ corresponding to switches $SW_5'$, $SW_6'$, $SW_7'$ and $SW_8'$, respectively, when the converter 32 operates in the Case I Reverse M-RMS operating region according to the modulation control scheme. FIG. 12 shows waveforms for the same elements as in FIG. 11 but for the Case I Reverse F-ZVS operating region. FIG. 13 shows waveforms for the same elements as in FIG. 11 but for the first transition Reverse M-RMS operating region. FIG. 14 shows waveforms for the same elements as in FIG. 11 but for the first transition Reverse F-ZVS operating region. FIG. 15 shows waveforms for the same elements as in FIG. 11 but for the Case II Reverse M-RMS operating region. FIG. 16 shows waveforms for the same elements as in FIG. 11 but for the Case II Reverse F-ZVS operating region. FIG. 17 shows waveforms for the same elements as in FIG. 11 but for the second transition Reverse M-RMS operating region. FIG. 18A shows waveforms for the same elements as in FIG. 11 but for the second transition Reverse F-ZVS operating region. FIG. 18B shows waveforms for the same elements as in FIG. 11 but for the Case III Reverse F-ZVS operating region. FIG. 18C shows waveforms for the same elements as in FIG. 11 but for the third transition Reverse F-ZVS operating region. FIGS. 19, 20 and 21 show waveforms for the same elements as in FIG. 11 but for first, second and third aspects, respectively, of the Case III Reverse M-RMS and Case IV Reverse F-ZVS operating regions. FIG. 22 shows waveforms for the same elements as in FIG. 11 but for the third transition Reverse M-RMS operating region. FIG. 23 shows waveforms for the same elements as in FIG. 11 but for the fourth transition Reverse F-ZVS operating region. FIG. 24 shows waveforms for the same elements as in FIG. 11 but for the Case IV Reverse M-RMS operating region. FIG. 25 shows waveforms for the same elements as in FIG. 11 but for the Case V Reverse F-ZVS operating region. FIG. 26 shows waveforms for the same elements as in FIG. 11 but for the fourth transition Reverse M-RMS operating region. FIG. 27 shows waveforms for the same elements as in FIG. 11 but for the fifth transition Reverse F-ZVS operating region. FIG. 28 shows waveforms for the same elements as in FIG. 11 but for the Case V Reverse M-RMS operating region. FIG. 29 shows waveforms for the same elements as in FIG. 11 but for the Case VI Reverse F-ZVS operating region. FIG. 30 shows waveforms for the same elements as in FIG. 11 but for the sixth transition Reverse F-ZVS operating region. FIG. 31 shows waveforms for the same elements as in FIG. 11 but for the Case VII Reverse F-ZVS operating region.

As can be seen from FIG. 9, the average input current I'$_{in}$ is the sum of two input current components: the input current component I'$_{i1}$, i.e. processed input current, that gets processed by the converter 32 through the transformer and another input current component that goes directly from the input port to the output port and which is equal to average output current I'$_{out}$. Equating input power (P'$_{in}$) and output power (P'$_{out}$) values and applying the relation among currents depicted by FIG. 9 gives rise to the following relations:

$$P'_{in} = V_{out} * I'_{in} = V_{in} * I'_{out} = P'_{out},$$

$$I'_{in} = I'_{i1} + I'_{out} \text{ and}$$

$$I'_{i1} = I'_{in} * (V_{in} - V_{out})/V_{in}.$$

The preceding equation for (hereinafter referred to as "Processed Input Current Equation") is used to relate to the average input current I'$_{in}$, which allows desired duty cycles to be calculated for each of the five cases and the transition operating regions in the Reverse M-RMS mode of operation and each of the seven cases and the transition operating regions in the Reverse F-ZVS mode of operation as explained further below.

The Case I Reverse M-RMS operating region is characterized by the waveforms depicted in FIG. 11. The Case I Reverse M-RMS operating region is effectuated when V'$_{trnf}$ (as previously defined) is negative and for low-level power flow, as is evident by the intervals during which primary current I'$_p$ (I'$_{i1}$) remains at zero. The Case I Reverse M-RMS operating region is similar to and has the same switching sequence as the Case I Forward M-RMS operating region except that the switching actions applied to switches SW$_1$-SW$_8$ in the Case I Forward M-RMS operating region are applied to the switches SW$_1$'-SW$_8$', respectively, in the Case I Reverse M-RMS operating region. The charging interval begins at time t1 by turning off switch SW$_2$' with zero-current switching and subsequently turning on switch SW$_1$' at time t2, causing the switch SW$_1$' to discharge through itself the equivalent capacitance seen between its drain and source terminals and resulting in the bridge voltage V$_{a'b'}$ going from zero to +V$_{out}$. During the charging interval, wherein V'$_{chrg}$ (as previously defined) is applied across total leakage inductance L'$_{tot}$, the transformer's primary current I'$_p$ (I'$_{i1}$) begins at zero and increases in magnitude to +I'$_p$ such that energy is both stored in L'$_{tot}$ and transferred to the new load (V$_{in}$*n) due to the series connection of the input and output ports of the converter 32 as indicated in FIGS. 9 and 10. The bridge voltage V$_{c'd'}$ remains at zero during the charging interval. The charging interval ends and the transfer interval begins at time t3 when primary current reaches +I'$_p$ and switch SW$_6$' is hard turned off, causing the anti-parallel diode associated with switch SW$_5$' to begin to conduct, allowing switch SW$_5$' to be subsequently turned on with zero-voltage switching at time t4 and resulting in bridge voltage V$_{c'd'}$ going from zero to +(V$_{in}$−V$_{out}$).

During the transfer interval, the primary current decreases in magnitude from +I'$_p$ to zero. Switches SW$_3$' and SW$_7$' remain on during the transfer interval to allow for synchronous rectification which minimizes conduction losses. The transfer interval ends and the idling interval begins when the primary current I'$_p$ reaches zero and switches SW$_3$' and SW$_7$' are turned off with zero-current switching at time t6, resulting in switches SW$_4$' and SW$_8$' being turned on at time t7. Turning switches SW$_3$' and SW$_7$' off at time t6 avoids unnecessary circulating energy which would lead to extra power losses.

During the time interval t6-t7, bridge voltage V$_{a'b'}$ goes from +V$_{out}$ to zero, and bridge voltage V$_{c'd'}$ goes from +(V$_{in}$−V$_{out}$) to zero. The idling interval lasts for the remaining portion of the switching semi-cycle, and the primary current I'$_p$ and the bridge voltages V$_{a'b'}$ and V$_{c'd'}$ remain at zero during the idling interval. The idling interval ends and the charging interval for the next switching semi-cycle begins when switch SW$_1$' is turned off at time t8 and switch SW$_2$' is turned on at time t9. In the next semi-cycle, the primary current I'$_p$ reverses polarity as it goes from zero to −I'$_p$ during the charging interval, goes from −I'$_p$ to zero during the transfer interval, and remains at zero during the idling interval. The bridge voltage V$_{a'b'}$ goes from zero to −V$_{out}$ at the beginning of the charging interval and returns to zero at the beginning of the idling interval. The bridge voltage V$_{c'd'}$ goes from zero to −(V$_{in}$−V$_{out}$) at the start of the transfer interval and returns to zero at the beginning of the idling interval.

Neglecting transition times, the primary current waveform I'$_p$ seen in FIG. 11 gives rise to the following relation:

$$D'_{chrg} * V'_{chrg} + D'_{trnf} * V'_{trnf} = 0,$$

where D'$_{chrg}$ and D'$_{trnf}$ are equivalent duty cycles for the charging and transfer intervals during a semi-cycle of primary current waveform.

The input current that is processed by the converter 32, as shown in FIG. 9, is equal to sgn(V$_{a'b'}$)*I'$_p$, where sgn(y) is the sign function defined as zero, +1 or −1 when y (V$_{a'b'}$) is zero, positive or negative, respectively.

Over one switching period, the average value of conforms to the following relation:

$$(D'_{chrg})^2 * V'_{chrg} + D'_{trnf} * D'_{chrg} * V'_{chrg} = I'_{i1} * 4 * L'_{tot}/T_s,$$

where T$_s$ is the switching period and the other terms are as previously defined.

From the preceding equations, transfer and charging duty cycles can be determined in terms of a desired processed input current value I'$_{i1}$ and the remaining parameters according to the following equations:

$$D'_{trnf} = \{-I'_n * 4 * L_{tot} * V'_{chrg}/(T_s * V'_{trnf} * V'_{dsch})\}^{1/2} \text{ and}$$

$$D'_{chrg} = -D'_{trnf} * V'_{trnf}/V'_{chrg}.$$

The duty cycle for the idling interval is expressed according to the following relation:

$$D'_{idln} = 1 - D'_{chrg} - D'_{trnf}.$$

Duty cycles can then be related to desired input current I'$_{in}$ using the Processed Input Current Equation as defined above. In steady state operation, equating input and output power values after neglecting the converter's power losses provides the information needed to relate input and output current values as previously described.

Waveforms for the Case I Reverse F-ZVS operating region are shown in FIG. 12. As pointed out above, no Forward F-ZVS or Reverse F-ZVS operating region has an interval during which primary current I'$_p$ remains at zero. The switching sequence for the Case I Reverse F-ZVS operating region is the same as that for the Case I Forward F-ZVS operating region except that the switching actions carried out by switches SW$_1$-SW$_8$ in the Case I Forward F-ZVS operating region are carried out by switches SW$_1$'-SW$_8$', respectively, in the Case I Reverse F-ZVS operating region. During the circulating interval for the switching semi-cycle that begins at time t1 in the Case I Reverse F-ZVS operating region, primary current I'$_p$ begins at −Ix and increases in magnitude, crossing zero and reversing polarity until it reaches +Ix. During the charging interval, primary current I$_p$' goes from +Ix to +I$_p$', and the primary current remains at +I'$_p$ during the freewheeling interval that follows the charging interval. During the discharging interval, primary current $I'_p$ goes from $+I'_p$ to $+Ix$. The bridge voltage $V_{a'b'}$ goes from zero to $+V_{out}$ at the start of the circulating interval, goes from $+V_{out}$ to zero at the start of the freewheeling interval, and remains at zero for the remainder of the semi-cycle. The bridge voltage $V_{c'd'}$ is at $-(V_{in}-V_{out})$ during the circulating interval, goes to zero at the start of the charging interval, and goes from zero to $+(V_{in}-V_{out})$ at the start of the discharging interval. In the subsequent semi-cycle, primary current $I'_p$ goes from $+Ix$ to $-Ix$ during the circulating interval, goes from $-Ix$ to $-I'_p$ during the charging interval, remains at $-I'_p$ during the freewheeling interval, and goes from $-I'_p$ to $-Ix$ during the discharging interval. The bridge voltage $V_{a'b'}$ goes from zero to $-V_{out}$ at the start of the circulating interval, goes from $-V_{out}$ to zero at the start of the freewheeling interval, and remains at zero for the remainder of the semi-cycle. The bridge voltage $V_{c'd'}$ is at $+(V_{in}-V_{out})$ during the circulating interval, goes to zero at the start of the charging interval, and goes from zero to $-(V_{in}-V_{out})$ at the start of the discharging interval.

From the primary current waveform $I'_p$ seen in FIG. 12 and neglecting transition times, the following relations apply for a switching semi-cycle in the Case I Reverse F-ZVS operating region:

$$D'_{chrg}*V'_{chrg}-D'_{dsch}*V'_{dsch}=0 \text{ and}$$

$$D'_{circ}*V'_{circ}=(2*I'_{i1})*4*I'_{tot}/T_s.$$

Over one switching period, the average input current conforms to the following relation:

$$(D'_{chrg})^2*V_{chrg}+(D'_{chrg})*(2*I_x)*4*L'_{tot}/T_s=I'_{in}*4*L_{tot}/T_s.$$

where Ts is the switching period.

From the aforementioned equations, charging and discharging duty cycles can be determined in terms of a desired input current value, a desired circulating primary current value, and remaining parameters according to the following relations:

$$D'_{chrg}=\{-I_x+[I_x^2+I'_{i1}*V'_{chrg}]^{1/2}\}*4*L'_{tot}/(T_s*V'_{chrg})$$

and $$D'_{dsch}=D'_{chrg}*V'_{chrg}/V'_{dsch}.$$

The freewheeling interval lasts for the remaining portion of the switching semi-cycle and its duty cycle is determined by the relation:

$$1-D'_{circ}-D'_{chrg}-D'_{dsch}=D'_{freew}.$$

Duty cycles can then be related to desired input current $I'_{in}$ using the Processed Input Current Equation as defined above. In steady state operation, equating input and output power values after neglecting the converter's power losses provides the information needed to relate input and output current values as previously described.

Waveforms for the first transition Reverse M-RMS operating region between the Case I Reverse M-RMS and Case II Reverse M-RMS operating regions are shown in FIG. 13. The switching sequence for the first transition Reverse M-RMS operating region is the same as that for the first transition Forward M-RMS operating region except the switching actions for the switches $SW_1$-$SW_8$ in the Forward M-RMS operating region are carried out by the switches $SW_1'$-$SW_8'$, respectively, in the Reverse M-RMS operating region. The charging interval starts at time t1 by turning off switches $SW_2'$, $SW_4'$ and $SW_8'$, resulting in bridge voltage $V_{c'd'}$ going from $-(V_{in}-V_{out})$ to zero, and subsequently turning on switches $SW_1'$, $SW_3'$ and $SW_7'$ at time t2, resulting in bridge voltage $V_{a'b'}$ going from $-V_{out}$ to $+V_{out}$. During the charging interval, switch $SW_5'$ remains off and switch $SW_6'$ remains on. The primary current $I'_p$ goes from zero to $+I'_p$ during the charging interval. The charging interval ends and the transfer interval begins by turning off switch $SW_6'$ at time t3 and subsequently turning on switch $SW_5$ at time t4 such that the bridge voltage $V_{c'd'}$ increases in magnitude from zero to $+(V_{in}-V_{out})$. During the transfer interval, primary current $I'_p$ goes from $+I'_p$ to zero, the bridge voltage $V_{a'b'}$ remains at $+V_{out}$, and the bridge voltage $V_{c'd'}$ remains at $+(V_{in}-V_{out})$. The transfer interval ends and a new semi-cycle begins at time t8 when the primary current $I'_p$ reaches zero and switches $SW_1'$, $SW_3'$ and $SW_7'$ are turned off, such that bridge voltage $V_{a'b'}$ goes from $+V_{out}$ to $-V_{out}$ and bridge voltage $V_{c'd'}$ goes from $+(V_{in}-V_{out})$ to zero, and resulting in switches $SW_2'$, $SW_4'$ and $SW_8'$ being turned on at time t9. In the subsequent semi-cycle, primary current $I_p'$ goes from zero to $-I'_p$ during the charging interval and goes from $-I'_p$ to zero during the transfer interval.

The duty cycle constraint in the first transition Reverse M-RMS operating region thusly becomes:

$$D'_{chrg}+D'_{trnf}=1.$$

As a result, the following relations apply:

$$D'_{chrg}=V'_{trnf}/(V'_{chrg}-V'_{trnf}) \text{ and}$$

$$D'_{chrg}*V'_{chrg}=I'_n*4*L'_{tot}/T_s.$$

Duty cycles can then be related to desired input current $I'_{in}$ by way of the Processed Input Current equation. In steady state operation, equating input and output power values after neglecting the converter's power losses provides the information needed to relate input and output current values as previously described.

FIG. 14 depicts the waveforms associated with the first transition Reverse F-ZVS operating region. The switching sequence for this operating region is the same as that for the first transition Forward F-ZVS operating region except that the switching actions carried out by switches $SW_1$-$SW_8$ in the first transition Forward F-ZVS operating region are now carried out by switches $SW_1'$-$SW_8'$, respectively. In the first transition Reverse F-ZVS operating region, primary current $I'_p$ is at current value $-Ix$ at the beginning of the circulating interval for the switching semi-cycle that begins at time t1, reaches $+Ix$ at the beginning of the charging interval, reaches $+I'_p$ at the end of the charging interval, and reaches current value $+Ix$ at the end of the discharging interval. Bridge voltage $V_{a'b'}$ goes from zero to $+V_{out}$ at the start of the circulating interval, goes from $+V_{out}$ to zero at the start of the discharging interval, and remains at zero during the discharging interval. Bridge voltage $V_{c'd'}$ is at $-(V_{in}-V_{out})$ during the circulating interval, goes to zero at the start of the charging interval, and goes to $+(V_{in}-V_{out})$ at the start of the discharging interval. In the subsequent semi-cycle, primary current $I'_p$ goes from current value $+Ix$ to $-Ix$ during the circulating interval, goes from $-Ix$ to $-I'_p$ during the charging interval and goes from $-I'_p$ to current value $-Ix$ during the discharging interval. The bridge voltage $V_{a'b'}$ goes from zero to $-V_{out}$ at the start of the circulating interval, goes from $-V_{out}$ to zero at the start of the discharging interval, and remains at zero during the discharging interval. The bridge voltage $V_{c'd'}$ is at $+(V_{in}-V_{out})$ during the circulating interval, goes to zero at the start of the charging interval, and goes to $-(V_{in}-V_{out})$ at the start of the discharging interval. The duty cycle constraint for the first transition Reverse F-ZVS operating region is the same as that for the first transition Forward F-ZVS operating region. As a result, the following relations apply:

$$D'_{circ}*V'_{circ}=(2*Ix)*4*L'_{tot}/T_s,$$

$$D'_{chrg}*V'_{chrg}-D'_{dsch}*V_{dsch}=0,$$

and $$1-D'_{circ}-D'_{chrg}-D'_{dsch}=0;$$

from where $$D'_{chrg}=V_{dsch}*(1-D'_{circ})/(V_{dsch}+V'_{chrg}),$$

$$D'_{dsch}=D'_{chrg}*V'_{chrg}/V_{dsch}$$

and $$((D'_{chrg})^2*V'_{chrg}+(D'_{chrg})*(2*Ix)*\\4*L'_{tot}T_s)=I'_{i1}*4*L'_{tot}/T_s.$$

Duty cycles can then be related to input current $I'_{in}$ by way of the Processed Input Current equation. In steady state operation, equating input and output power values after neglecting the converter's power losses provides the information needed to relate input and output current values as previously described.

The waveforms associated with the Case II Reverse M-RMS operating region are seen in FIG. 15. The switching sequence for the Case II Reverse M-RMS operating region is the same as that for the Case II Forward M-RMS operating region except that the switching action carried out by the switches $SW_1$-$SW_8$ in the Case II Forward M-RMS operating region are respectively carried out by switches $SW_1'$-$SW_8'$ in the Case II Reverse M-RMS operating region. As in the Case II Forward M-RMS operating region, the Case II Reverse M-RMS operating region is employed when $V'_{trnf}$ is negative, and the operating region is composed of circulating, charging and transfer intervals. The durations of all three intervals are selected to force the primary current $I'_p$ to reach zero exactly at the end of each semi-cycle, thus allowing for intermediate-level power flow without having to hard turn off any switch's anti-parallel body diode and while minimizing both primary RMS current value and conduction losses.

Just prior to the switching semi-cycle that begins at time t1, switches $SW_1'$, $SW_3'$, $SW_5'$ and $SW_7'$ are off, switches $SW_2'$, $SW_4'$, $SW_6'$ and $SW_8'$ are on, bridge voltage $V_{a'b'}$ is at $-V_{out}$, and bridge voltage $V_{c'd'}$ is at $-(V_{in}-V_{out})$ from the previous semi-cycle. The circulating interval begins at time t1 by turning off both switches $SW_2'$ and $SW_4'$ with zero current switching and subsequently turning on both switches $SW_1'$ and $SW_3'$ at time t2, causing the switches $SW_1'$ and $SW_3'$ to discharge through themselves the equivalent capacitances seen at nodes a' and b' and resulting in the bridge voltage $V_{a'b'}$ going from $-V_{out}$ to $+V_{out}$. During the circulating interval, $V'_{circ}$ (as previously defined) is applied across total leakage inductance $L'_{tot}$. The transformer's primary current $I'_p$ begins at zero and increases in magnitude to a first current value $+I'_{p1}$ such that the energy stored in $L'_{tot}$ is drawn from both the input and output ports of the converter, which is indicative of energy recirculation. The bridge voltage $V_{c'd'}$ remains at $-(V_{in}-V_{out})$. Switches $SW_5'$ and $SW_7'$ remain off, and switches $SW_6'$ and $SW_8'$ remain on during the circulating interval. Switch $SW_8'$ is hard turned off to end the circulating interval at time t3 and to allow for subsequently turning on switch $SW_7'$ with zero-voltage switching at time t4.

The charging interval begins when switch $SW_8'$ is turned off at time t3, causing the bridge voltage $V_{c'd'}$ to go from $-(V_{in}-V_{out})$ to zero, and switch $SW_7'$ is turned on with zero-voltage switching at time t4. During the charging interval, $V'_{chrg}$ (as previously defined) is applied across total leakage inductance $L'_{tot}$. The transformer's primary current $I'_p$ increases in magnitude from the first current value $+I'_{p1}$ to a second current value $+I'_{p2}$ and energy is both stored in $L'_{tot}$ and transferred to the load ($V_{in}*n$) due to the series connection of the input and output ports of the converter as seen in FIGS. 9 and 10. The bridge voltage $V_{a'b'}$ remains at $+V_{out}$ during the charging interval. The charging interval ends at time t5 when switch $SW_6'$ is hard turned off, causing the bridge voltage $V_{c'd'}$ to go from zero to $+(V_{in} V_{out})$, which allows for soft turning on of switch $SW_5'$ with zero-voltage switching at time t6.

The transfer interval starts when switch $SW_6'$ is turned off at time t5 and switch $SW_5'$ is subsequently soft turned on at time t6 and begins conducting. During the transfer interval, primary current decreases in magnitude from the second current value $+I'_{p2}$ to zero, switches $SW_3'$ and $SW_7'$ remain on, allowing for synchronous rectification to minimize conduction losses, the bridge voltage $V_{a'b'}$ remains at $+V_{out}$ and the bridge voltage $V_{c'd'}$ remains at $+(V_{in}-V_{out})$. The transfer interval ends when the primary current $I'_p$ reaches zero and switches $SW_1'$ and $SW_3'$ are turned off with zero-current switching at time t7, causing the bridge voltage $V_{a'b'}$ to go from $+V_{out}$ to $-V_{out}$, and resulting in switches $SW_2'$ and $SW_4'$ being turned on at time t8. The end of the transfer interval marks the beginning of the next switching semi-cycle. In the next semi-cycle, primary current reaches the first current value $-I'_{p1}$ at the end of the circulating interval, reaches the second current value $-I'_{p2}$ at the end of the charging interval, and reaches zero again at the end of the transfer interval. The bridge voltage $V_{a'b'}$ is at $-V_{out}$ during the circulating, charging and transfer intervals, and goes to $+V_{out}$ at the end of the transfer interval. The bridge voltage $V_{c'd'}$ goes from $+(V_{in}-V_{out})$ to zero at the end of the circulating interval, remains at zero during the charging interval, goes from zero to $-(V_{in}-V_{out})$ at the end of the charging interval, and remains at $-(V_{in}-V_{out})$ during the transfer interval.

Neglecting switching transition times, the primary current waveform $I'_p$ seen in FIG. 15 gives rise to the following relations for a switching semi-cycle in the Case II Reverse M-RMS operating region:

$$D'_{circ}*V'_{circ}+D'_{chrg}*V'_{chrg}+D'_{trnf}*V_{trnf}=0 \text{ and}$$

$$D'_{circ}+D'_{chrg}+D'_{trnf}=1,$$

where $D'_{circ}$ is the equivalent duty cycle for the circulating interval during a semi-cycle of primary current waveform $I'_p$. Over one switching period, the average value of $I'_{i1}$ conforms to the following relation:

$$(D'_{circ})^2*V'_{circ}+(D'_{chrg})^2*V'_{chrg}+\\2*D'_{circ}*D'_{chrg}*V'_{circ}-(D'_{trnf})^2*V'_{trnf}=I'_{i1}*4*L'_{tot}/T_s.$$

From the preceding equations, charging and circulating duty cycles can be found in terms of a desired current value for $I'_{i1}$ and the remaining parameters according to the following relations:

$$D'_{chrg} = \left[(V'_{dsch})^2 - (V'_{chrg})^2 - \frac{I'_{i1}*8*L'_{tot}}{T_s}*V'_{dsch}\right]^{1/2} / V'_{dsch} \text{ and}$$

$$D'_{circ} = -D'_{chrg}/2 - V'_{trnf}/(2*V'_{dsch}),$$

where $V'_{dsch}$ was defined above.

The Processed Input Current Equation is then used to relate duty cycles to desired input current I'$_{in}$. In steady state operation, equating input and output power values after neglecting the converter's power losses provides the information needed to relate input and output current values as previously described.

The waveforms for the Case II Reverse F-ZVS operating region are depicted in FIG. 16. The switching sequence for the Case II Reverse F-ZVS operating region is the same as that for the Case II Forward F-ZVS operating region except that the switching actions carried out by switches SW$_1$-SW$_8$ in the Case II Forward F-ZVS operating region are now carried out by switches SW$_1$'-SW$_8$', respectively. Hence, the primary current I'$_p$ is forced to reach the current values +Ix and −Ix exactly at the ends of the switching semi-cycles. Accordingly, for the switching semi-cycle that begins at time t1, the transformer's primary current I'$_p$ begins at current value −Ix at the start of the circulating interval, reaches current value +Ix at the end of the circulating interval, reaches second current value +I'$_{p2}$ at the end of the charging interval, reaches first current value +I'$_{p1}$ at the end of the transfer interval, and reaches current value +Ix at the end of the discharging interval, which coincides with the end of the switching semi-cycle. Bridge voltage V$_{a'b'}$ goes from zero to +V$_{out}$ at the start of the circulating interval, goes from +V$_{out}$ to zero at the start of the discharging interval, and remains at zero during the discharging interval. Bridge voltage V$_{c'd'}$ is at −(V$_{in}$−V$_{out}$) during the circulating interval, goes from −(V$_{in}$−V$_{out}$) to zero at the start of the charging interval, goes from zero to +(V$_{in}$−V$_{out}$) at the start of the transfer interval and remains at +(V$_{in}$−V$_{out}$) for the rest of the semi-cycle. In the subsequent semi-cycle, primary current reaches current value −Ix at the end of the circulating interval, reaches second current value −I'$_{p2}$ at the end of the charging interval, reaches first current value −I'$_{p1}$ at the end of the transfer interval and reaches current value −Ix at the end of the discharging interval, which coincides with the end of the semi-cycle. Bridge voltage V$_{a'b'}$ goes from zero to −V$_{out}$ at the start of the circulating interval, goes from −V$_{out}$ to zero at the end of the transfer interval, and remains at zero during the discharging interval. Bridge voltage V$_{c'd'}$ is at +(V$_{in}$−V$_{out}$) during the circulating interval, goes to zero at the start of the charging interval, goes to −(V$_{in}$−V$_{out}$) at the start of the transfer interval, and remains at −(V$_{in}$−V$_{out}$) during the discharging interval.

Neglecting switching transition times, the primary current waveform I'$_p$ seen in FIG. 16 gives rise to the following relations for a switching semi-cycle in the Case II Reverse F-ZVS operating region:

$$D'_{circ}*V'_{circ}=(2*Ix)*4*L'_{tot}/T_s,$$

$$D'_{chrg}*V'_{chrg}+D'_{trnf}*V'_{trnf}-D'_{dsch}*V'_{dsch}=0$$

and $$D'_{circ}+D'_{chrg}+D'_{trnf}+D'_{dsch}=1.$$

Over one switching period, the average input current I'$_{i1}$ conforms to the following relation:

$$-(D'_{trnf})^2*V'_{trnf}+(D'_{chrg})^2*V'_{chrg}+(D'_{chrg}+D'_{trnf})*(2*Ix)*4*L'_{tot}/T_s+D'_{dsch}*D'_{trnf}*V'_{dsch}=I'_{i1}*4*L'_{tot}/T_s.$$

From the preceding equations a second degree algebraic equation for circulating duty cycle is obtained:

$$A*(D'_{trnf})^2+B*(D'_{trnf})+C=0;$$

where $$A=V'_{trnf}+2*V'_{dsch}-V'_{chrg}*V'_{dsch}/V'_{circ}-(V'_{chrg})^3/(V'_{circ})^2,$$

$$B=-(2*Ix)*4*L'_{tot}/T_s-2*(1-D'_{circ})*V'_{dsch}+2*(1-D'_{circ})*(V'_{dsch})^2*V'_{circ}-(2*Ix)*4*L'_{tot}/T_s*V'_{chrg}/V'_{circ}+2*(1-D'_{circ})*V'_{dsch}*(V'_{chrg})^2/(V'_{circ})^2$$

and $$C=(I'_{i1})*4*L'_{tot}/T_s-(1-D'_{circ})^2*V'_{chrg}*(V'_{dsch})^2/(V'_{circ})^2-(1-D'_{circ})*(2*Ix)*4*L'_{tot}/T_s*V'_{dsch}/V'_{circ}.$$

The following equation can be directly solved for transfer duty cycle:

$$D'_{trnf}=[-B\pm[(B)^2-4*A*C]^{1/2}]/(2*A).$$

The transfer duty cycle and the preceding equations can be combined to find charging and discharging interval duty cycles in terms of a desired input current value and circulating primary current value. As mentioned above, there are multiple valid solutions in certain portions of this operating region and a preferred methodology is to use the solution that minimizes primary current's RMS value.

The Processed Input Current Equation is then used to relate duty cycles to desired input current I'$_{in}$. In steady state operation, equating input and output power values after neglecting the converter's power losses provides the information needed to relate input and output current values as previously described.

The waveforms associated with the second transition Reverse M-RMS operating region between the Case II Reverse M-RMS and Case III Reverse M-RMS operating regions are depicted in FIG. 17. The second transition Reverse M-RMS operating region, which does not have the charging interval that is present in the Case II Reverse M-RMS operating region, has the same switching sequence as the second transition Forward M-RMS operating region except that the switching actions carried out by switches SW$_1$-SW$_8$ in the second transition Forward M-RMS operating region are respectively carried out by switches SW$_1$'-SW$_8$' in the second transition Reverse M-RMS operating region. In the second transition Reverse M-RMS operating region, for the switching semi-cycle that begins at time t1, the bridge voltage V$_{a'b'}$ goes from −V$_{out}$ to +V$_{out}$ at the start of the circulating interval. The primary current I'$_p$ is at zero at the start of the circulating interval and reaches +I'$_p$ at the end of the circulating interval. The bridge voltage V$_{c'd'}$ remains at −(V$_{in}$−V$_{out}$) during the circulating interval. The bridge voltage V$_{c'd'}$ goes from −(V$_{in}$−V$_{out}$) to +(V$_{in}$−V$_{out}$) at the start of the transfer interval. During the transfer interval, the primary current I'$_p$ decreases in magnitude from +I'$_p$ until it reaches zero at the end of the transfer interval. Bridge voltage V$_{a'b'}$ remains at +V$_{out}$, and bridge voltage V$_{c'd'}$ remains at +(V$_{in}$−V$_{out}$) during the transfer interval. The transfer interval ends and the circulating interval for the next semi-cycle begins when the primary current I'$_p$ reaches zero and bridge voltage V$_{a'b'}$ goes from +V$_{out}$ to −V$_{out}$. In the subsequent semi-cycle, the primary current reaches −I'$_p$ at the end of the circulating interval and reaches zero again at the end of the transfer interval, bridge voltage V$_{a'b'}$ remains at −V$_{out}$ during the circulating and transfer intervals and goes from −V$_{out}$ to +V$_{out}$ at the end of the transfer interval, and bridge voltage V$_{c'd'}$ remains at +(V$_{in}$, −V$_{out}$) during the circulating interval, goes from +(V$_{in}$−V$_{out}$) to −(V$_{in}$−V$_{out}$) at the end of the circulating interval and remains at −(V$_{in}$−V$_{out}$) during the transfer interval.

The duty cycle constraint for the second transition Reverse M-RMS operating region becomes:

$$D'_{circ} + D'_{trnf} = 1.$$

As a result, the following relations apply:

$$D'_{circ} = -V'_{trnf}/(V'_{circ} + V'_{trnf}), \text{ and}$$

$$D'_{circ} * V'_{circ} = I'_{i1} * 4 * L'_{tot}/T_s.$$

Duty cycles are then related to desired input current $I'_{in}$ using the Processed Input Current Equation. In steady state operation, equating input and output power values after neglecting the converter's power losses provides the information needed to relate input and output current values as previously described.

FIG. 18A illustrates the waveforms associated with the second transition Reverse F-ZVS operating region between the Case II Reverse F-ZVS and Case III Reverse F-ZVS operating regions. The switching sequence for the second transition Reverse F-ZVS operating region is the same as that for the second transition Forward F-ZVS operating region except the switching actions carried out by switches $SW_1$-$SW_8$ in the second transition Forward F-ZVS operating region are now carried out by switches $SW_1'$-$SW_8'$, respectively. Hence, for the switching semi-cycle that begins at time t1, the primary current $I'_p$ is at current value $-Ix$ at the start of the circulating interval, reaches current value $+Ix$ at the end of the circulating interval, reaches $+I'_p$ at the end of the charging interval, and decreases in magnitude from $+I'_p$ during the transfer interval until it reaches the value $+Ix$ at the end of the transfer interval. Bridge voltage $V_{a'b'}$ goes from $-V_{out}$ to $+V_{out}$ at the start of the circulating interval and goes from $+V_{out}$ to $-V_{out}$ at the end of the transfer interval. Bridge voltage $V_{c'd'}$ is at $-(V_{in}-V_{out})$ during the circulating interval, goes to zero at the start of the charging interval, goes to $+(V_{in}-V_{out})$ at the start of the transfer interval and remains at $+(V_{in}-V_{out})$ during the transfer interval. In the subsequent semi-cycle, the primary current reaches $-Ix$ at the end of the circulating interval, reaches $-I'_p$ at the end of the charging interval, and reaches $-Ix$ at the end of the transfer interval. Bridge voltage $V_{a'b'}$ goes from $+V_{out}$ to $-V_{out}$ at the start of the circulating interval and goes to $+V_{out}$ at the end of the transfer interval. Bridge voltage $V_{c'd'}$ is at $+(V_{in}-V_{out})$ during the circulating interval, goes to zero at the start of the charging interval, and goes to $-(V_{in}-V_{out})$ at the start of the transfer interval.

The duty cycle and voltage constraints for the second transition Reverse F-ZVS operating region are the same as those for the second transition Forward F-ZVS operating region:

$$D'_{circ} * V'_{circ} = (2*Ix)*4*L'_{tot}/T_s,$$

$$D'_{chrg} * V'_{chrg} + D'_{trnf} * V'_{trnf} =$$

and $$D'_{circ} + D'_{chrg} + D'_{trnf} = 1.$$

As a result, the following relations apply:

$$D'_{chrg} = -V'_{trnf} * (1-D'_{circ})/(V'_{chrg} - V'_{trnf}),$$

$$D'_{trnf} = -D'_{chrg} * V'_{chrg}/V'_{trnf}$$

and $$-(D'_{trnf})^2 * V'_{trnf} + (D'_{chrg})^2 * V'_{chrg} + ((2*Ix)*4*L'_{tot}/T_s)* (D'_{trnf} + D'_{chrg}) = (I'_{i1})*4*L'_{tot}/T_s.$$

FIG. 18B illustrates the waveforms associated with the Case III Reverse F-ZVS operating region. The switching sequence for the Case III Reverse F-ZVS operating region is the same as that for the Case III Forward F-ZVS operating region except for switches $SW_1$-$SW_8$ being interchanged with switches $SW_1'$-$SW_8'$, respectively, as previously described. Hence, for the switching semi-cycle that begins at t1, the primary current $I'_p$ is at $-I_x$ when the circulating interval begins at time t1, increases in magnitude to $+I'_{p1}$ during the circulating interval, increases in magnitude to $+I'_{p2}$ during the charging interval, and decreases in magnitude from $+I'_{p2}$ during the transfer interval until it reaches the value $+I_x$ at the end of the transfer interval. Bridge voltage $V_{a'b'}$ goes from $-V_{out}$ to $+V_{out}$ at the start of the circulating interval and goes from $+V_{out}$ to $-V_{out}$ at the end of the transfer interval. Bridge voltage $V_{c'd'}$ is at $-(V_{in}-V_{out})$ during the circulating interval, goes to zero at the start of the charging interval, goes to $+(V_{in}-V_{out})$ at the start of the transfer interval and remains at $+(V_{in}-V_{out})$ during the transfer interval. In the subsequent semi-cycle, bridge voltage $V_{a'b'}$ goes from $+V_{out}$ to $-V_{out}$ at the start of the circulating interval and returns to $+V_{out}$ at the end of the transfer interval. Primary current $I'_p$ goes from $+I_x$ to $-I'_{p1}$ during the circulating interval, goes from $I'_{p1}$ to $-I'_{p2}$ during the charging interval, and goes from $-I'_{p2}$ to $-I_x$ during the transfer interval. Bridge voltage $V_{c'd'}$ is at $+(V_{in}-V_{out})$ during the circulating interval, goes to zero at the start of the charging interval, goes to $-(V_{in}-V_{out})$ at the start of the transfer interval and remains at $-(V_{in}-V_{out})$ during the transfer interval.

Neglecting switching transition times, the primary current waveform $I'_p$ seen in FIG. 18B gives rise to the following relations for a switching semi-cycle in the Case III Reverse F-ZVS operating region:

$$D'_{circ} * V_{circ} + D'_{chrg} * V'_{chrg} + D'_{trnf} * V'_{trnf} = (2*Ix)*4*L'_{tot}/T_s,$$

$$D'_{circ} + D'_{chrg} + D'_{trnf} = 1$$

and $$-(D'_{trnf})^2 * V'_{trnf} + (D'_{chrg})^2 * V'_{chrg} + (D'_{circ})^2 * V'_{circ} + 2*D'_{circ} * D'_{chrg} * V'_{circ} + ((2*Ix)*4*L'_{tot}/T_s)*(D'_{trnf} - D'_{chrg} - D'_{circ}) = (I'_{i1})*4*L'_{tot}/T_s.$$

From the preceding equations, charging, circulating and transfer interval duty cycles can be found in terms of a desired input current value and circulating primary current value as follows:

$$D'_{chrg} = \frac{[V'_{chrg}*Ix*16*L'_{tot}/T_s - 64*(Ix*L'_{tot}/T_s)^2 - I_{in}*8*L'_{tot}/T_s*V'_{dsch} - V'_{circ}*V'_{trnf}]^{\frac{1}{2}}}{V_{dsch}},$$

$$D'_{circ} = -\frac{V'_{trnf}*(1+D'_{chrg}) - 4*Ix*L'_{tot}/T_s}{V'_{dsch}}$$

and $$D'_{trnf} = 1 - D'_{circ} - D'_{chrg}.$$

FIG. 18C illustrates the waveforms associated with the third transition Reverse F-ZVS operating region that takes place between the Case III and Case IV Reverse F-ZVS operating regions. The switching sequence for the third transition Reverse F-ZVS operating region is like that for the third transition Forward F-ZVS operating region except that the switching actions carried out by switches $SW_1$-$SW_8$ in the third transition Forward F-ZVS operating region are now carried out by switches $SW_1'$-$SW_8'$, respectively. For the switching semi-cycle that begins at time t1, the primary current $I'_p$ is at $-I_x$ when the circulating interval begins at time t1, increases in magnitude to reach $+I_p$ at the start of the transfer interval, and decreases in magnitude to reach $+I_x$ at the end of the transfer interval. Bridge voltage $V_{a'b'}$ goes from $-V_{out}$ to $+V_{out}$ at the start of the circulating interval and returns to $-V_{out}$ at the end of the transfer interval. Bridge voltage $V_{c'd'}$ is at $-(V_{in}-V_{out})$ during the circulating interval, goes to $+(V_{in}-V_{out})$ at the start of the transfer interval, and remains at $+(V_{in}-V_{out})$ during the transfer interval. In the subsequent semi-cycle, bridge voltage $V_{a'b'}$ goes from $+V_{out}$ to $-V_{out}$ at the start of the circulating interval and returns to $+V_{out}$ at the end of the transfer interval. Primary current $I'_p$ goes from $+I_x$ to $-I'_p$ during the circulating interval and goes from $-I'_p$ to $-I_x$ during the transfer interval. Bridge voltage $V_{c'd'}$ is at $+(V_{in}-V_{out})$ during the circulating interval, goes to $-(V_{in}-V_{out})$ at the start of the transfer interval, and remains at $-(V_{in}-V_{out})$ during the transfer interval.

Neglecting switching transition times, the primary current waveform $I'_p$ seen in FIG. 18C gives rise to the following relations for a switching semi-cycle in the third transition Reverse F-ZVS operating region:

$$D'_{circ}*V'_{circ}+D'_{trnf}*V'_{trnf}=(2*I_x)*4*L'_{tot}/T_s,$$

and $$D'_{circ}+D'_{trnf}=1.$$

Over one switching period, the average value of conforms to the following relation:

$$(V'_{circ}-V'_{trnf})*D'_{circ}*(1-D'_{circ})=I'_{i1}*4*L'_{tot}/T_s.$$

FIGS. 19, 20 and 21 depict the waveforms associated with a first aspect (FIG. 19), a second aspect (FIG. 20) and a third aspect (FIG. 21) of both the Case III Reverse M-RMS and the Case IV Reverse F-ZVS operating regions. The three aspects of the Case III Reverse M-RMS and Case IV Reverse F-ZVS operating regions depicted in FIGS. 19-21 are similar to the corresponding three aspects of the Case III Forward M-RMS and the Case IV Forward F-ZVS operating regions except that the switching actions carried out by the switches $SW_1$-$SW_8$ in the Case III Forward M-RMS and the Case IV Forward F-ZVS operating regions are respectively carried out by switches $SW'_1$-$SW'_8$ in the Case III Reverse M-RMS and the Case IV Reverse F-ZVS operating regions. The first, second and third aspects of the Case IV Reverse F-ZVS operating region differ from the first, second and third aspects of the Case III Reverse M-RMS operating region in that the magnitude of primary current $I'_p$ at the instants when switching occurs in the three aspects of the Case IV Reverse F-ZVS operating region is equal to or greater than the circulating primary current value Ix, whereas that magnitude can be less than the circulating primary current value Ix in the three aspects of the Case III Reverse M-RMS operating region.

The switching sequence for all three aspects of the Case III Reverse M-RMS and Case IV Reverse F-ZVS operating regions is the same as the switching sequence for the second transition Reverse M-RMS (FIG. 17) and the third transition Reverse F-ZVS (FIG. 18C) operating regions. Each semi-cycle in all three aspects of the Case III Reverse M-RMS and Case IV Reverse F-ZVS operating regions is composed of circulating and transfer intervals. In the first aspect (FIG. 19), for the switching semi-cycle that begins at time t1, primary current is at a first current value $-I'_{p1}$ at the start of the circulating interval and reaches a second current value $+I'_{p2}$, greater than the first current value, at the end of the circulating interval. During the transfer interval, the primary current decreases in magnitude from the second current value $+I'_{p2}$ to the first current value $+I'_{p1}$. The characteristics of the bridge voltages $V_{a'b'}$ and $V_{c'd'}$ are similar to those in the second transition Reverse M-RMS (FIG. 17) and the third transition Reverse F-ZVS (FIG. 18C) operating regions. In the subsequent semi-cycle, the primary current goes from first current value $+I'_{p1}$ to the second current value $-I'_{p2}$ during the circulating interval, and goes from the second current value $-I'_{p2}$ to the first current value $-I'_{p1}$ during the transfer interval. As pointed out above, the first current value $I'_{p1}$ is equal to or greater than the circulating primary current value Ix in the Case IV Reverse F-ZVS operating region whereas the first current value $I'_{p1}$ can be less than the value Ix in the Case III Reverse M-RMS operating region.

In the second aspect (FIG. 20), for the switching semi-cycle that begins at time t1, primary current is at $-I'_p$ at the start of the circulating interval and reaches $+I'_p$ at the end of the circulating interval. During the transfer interval, the primary current remains at $+I'_p$. The characteristics of the bridge voltages $V_{a'b'}$ and $V_{c'd'}$ are similar to those of the first aspect except that the bridge voltage $V_{a'b'}$ is greater in the second aspect. In the subsequent semi-cycle, the primary current goes from $+I'_p$ to $-I'_p$ during the circulating interval and remains at $-I'_p$ during the transfer interval. As pointed out above, the current value $I'_p$ for the second aspect is equal to or greater than the circulating primary current value Ix in the Case IV Reverse F-ZVS operating region but can be less than the value Ix in the Case III Reverse M-RMS operating region.

In the third aspect (FIG. 21), for the switching semi-cycle that begins at time t1, primary current is at a second current value $-I'_{p2}$ at the start of the circulating interval and reaches a first current value $+I'_{p1}$ at the end of the circulating interval. During the transfer interval, the primary current increases in magnitude from the first current value $+I'_{p1}$ to the second current value $+I'_{p2}$. The characteristics of the bridge voltages $V_{a'b'}$ and $V_{c'd'}$ are similar to those for the second aspect. In the subsequent semi-cycle, the primary current goes from second current value $+I'_{p2}$ to first current value $-I'_{p1}$ during the circulating interval. During the transfer interval, primary current goes from first current value $-I'_{p1}$ to second current value $-I'_{p2}$. The first current value is greater than or equal to the value of circulating primary current Ix in the Reverse F-ZVS operating region but can be less than the current value Ix in the Reverse M-RMS operating region.

Neglecting switching transition times, the primary current waveform $I'_p$ as seen in FIGS. 19, 20 and 21 gives rise to the following relation:

$$D'_{circ}+D'_{trnf}=1.$$

Over one switching period, the average value of $I'_{i1}$ conforms to the following relation:

$$(V'_{circ}-V'_{trnf})*D'_{circ}*(1-D'_{circ})=I'_{i1}*4*L'_{tot}/T_s.$$

From the preceding equation, the circulating duty cycle can be found in terms of a desired input current value and the remaining parameters as follows:

$$D'_{circ} = \frac{1}{2} \pm \left( \frac{V'_{dsch} - I_{in}*8*L'_{tot}/T_s}{4*V'_{dsch}} \right),$$

where multiple solutions exist as pointed out above.

Duty cycles are then related to desired input current $I'_{in}$ using the Processed Input Current Equation. In steady state operation, equating input and output power values after neglecting the converter's power losses provides the information needed to relate the input and output current values as described above.

The third transition Reverse M-RMS operating region between the Case III Reverse M-RMS and Case IV Reverse M-RMS operating regions is represented by the waveforms depicted in FIG. 22. The third transition Reverse M-RMS operating region differs from the third transition Forward M-RMS operating region in that the switching actions carried out by switches $SW_1$-$SW_8$ in the third transition Forward M-RMS operating region are carried out by switches $SW_1'$-$SW_8'$, respectively, in the third transition Reverse M-RMS operating region. The switching sequence for the third transition Reverse M-RMS operating region is the same as that for the three aspects of the Case III Reverse M-RMS and Case IV Reverse F-ZVS operating regions (FIGS. 19, 20 and 21). The third transition Reverse M-RMS operating region is similar to the third aspect of the Case III Reverse M-RMS operating region depicted in FIG. 21 except that the primary current $I'_p$ reaches zero exactly at the end of the circulating intervals in the third transition Reverse M-RMS operating region. Hence, for the semi-cycle that begins at time t1, the primary current $I'_p$ is at $-I'_p$ (which is comparable to $-I_{p2}$ in FIG. 21) at the start of the circulating interval, reaches zero at the end of the circulating interval, and reaches $+I'_p$ (which is comparable to $+I_{p2}$ in FIG. 21) at the end of the transfer interval. In the subsequent semi-cycle, the primary current goes from $+I'_p$ to zero during the circulating interval, and goes from zero to $-I'_p$ during the transfer interval. The characteristics for the bridge voltages $V_{a'b'}$ and $V_{c'd'}$ are similar to those for the bridge voltages $V_{a'b'}$ and $V_{c'd'}$ in FIG. 21. The duty cycle and voltage constraints for the third transition Reverse M-RMS operating region are the same as that for the Case III Reverse M-RMS operating region as follows:

$$D'_{circ}+D'_{trnf}=1 \text{ and}$$

$$-D'_{circ}*V'_{circ}+D'_{trnf}*V'_{trnf}=0.$$

As a result, the following relations apply:

$$D'_{circ}=V'_{trnf}/(V'_{circ}+V'_{trnf}) \text{ and}$$

$$(V'_{circ}-V'_{trnf})*D'_{circ}*(1-D'_{circ})=I'_{i1}*4*L'_{tot}/T_s.$$

The fourth transition Reverse F-ZVS operating region between the Case III Reverse F-ZVS and Case IV Reverse F-ZVS operating regions is represented by the waveforms depicted in FIG. 23. The switching sequence for the fourth transition Reverse F-ZVS operating region is like that for the fourth transition Forward F-ZVS operating region but with switches $SW_1'$-$SW_8'$ now performing the switching actions respectively performed by switches $SW_1$-$SW_8$ in the fourth transition Forward F-ZVS operating region. The fourth transition Reverse F-ZVS operating region is similar to the third transition Reverse M-RMS operating region depicted in FIG. 22 except that the primary current $I'_p$ reaches the value +Ix or −Ix exactly at the end of the circulating intervals in the fourth transition Reverse F-ZVS operating region. Hence, for the semi-cycle that begins at time t1, the primary current $I'_p$ is at $-I'_p$ at the start of the circulating interval, reaches +Ix at the end of the circulating interval, and reaches $+I'_p$ at the end of the transfer interval. In the subsequent semi-cycle, the primary current goes from $+I'_p$ to −Ix during the circulating interval, and goes from −Ix to $-I'_p$ during the transfer interval. The characteristics of the bridge voltages $V_{a'b'}$ and $V_{c'd'}$ are similar to those for the bridge voltages $V_{a'b'}$ and $V_{c'd'}$ in FIG.

22. The duty cycle and voltage constraints for the fourth transition Reverse F-ZVS operating region are as follows:

$$D'_{circ}+D'_{trnf}=1 \text{ and}$$

$$-D'_{circ}*V'_{circ}+D'_{trnf}*V'_{trnf}=-(2*I_x)*4*L'_{tot}/T_s.$$

As a result, the following relations apply:

$$D'_{circ}=((2*I_x)*4*L'_{tot}/T_s+V'_{trnf})/(V'_{circ}+V'_{trnf}) \text{ and}$$

$$(V'_{circ}-V'_{trnf})*D'_{circ}*(1-D'_{circ})=I'_{i1}*4*L'_{tot}/T_s.$$

The waveforms associated with the Case IV Reverse M-RMS operating region are depicted in FIG. 24. The Case IV Reverse M-RMS operating region is similar to the Case IV Forward M-RMS operating region except that the switching actions carried out by switches $SW_1$-$SW_8$ in the Case IV Forward M-RMS operating region are respectively carried out by switches $SW_1'$-$SW_8'$ in the Case IV Reverse M-RMS operating region as previously described. A switching semi-cycle in the Case IV Reverse M-RMS operating region is composed of a circulating interval, a transfer interval and a discharging interval following the transfer interval as described for the Case IV Forward M-RMS operating region. In addition, the Case IV Reverse M-RMS operating region forces the primary current $I'_p$ to reach zero exactly at the end of the circulating interval as described for the Case IV Forward M-RMS operating region. For the circulating interval that begins with the switching semi-cycle at time t1, the bridge voltage $V_{a'b'}$ goes from zero to $+V_{out}$ at the start of the circulating interval, the transformer's primary current $I'_p$ is at first current value $-I_{p1}$ at the start of the circulating interval and reaches zero at the end of the circulating interval, and bridge voltage $V_{c'd'}$ remains at $-(V_{in}-V_{out})$ during the circulating interval. During the circulating interval, $V'_{circ}$ is applied across $L'_{tot}$, and energy is stored in $L'_{tot}$. The circulating interval ends and the transfer interval begins when the primary current $I'_p$ reaches zero. Bridge voltage $V_{c'd'}$ goes from $-(V_{in}-V_{out})$ to $+(V_{in}-V_{out})$ at the start of the transfer interval. During the transfer interval, primary current $I'_p$ increases in magnitude from zero to reach second current value $+I'_{p2}$, the bridge voltage $V_{a'b'}$ remains at $+V_{out}$, and the bridge voltage $V_{c'd'}$ remains at $+(V_{in}-V_{out})$. Bridge voltage $V_{a'b'}$ goes from $+V_{out}$ to zero at the start of the discharging interval. During the discharging interval, primary current decreases in magnitude from the second current value $+I'_{p2}$ to reach the first current value $+I'_{p1}$ at the end of the discharging interval. Bridge voltage $V_{a'b'}$ remains at zero, and bridge voltage $V_{c'd'}$ remains at $+(V_{in}-V_{out})$ during the discharging interval. In the subsequent semi-cycle, bridge voltage $V_{a'b'}$ goes from zero to $-V_{out}$ at the start of the circulating interval, goes from $-V_{out}$ to zero at the end of the transfer interval and remains at zero during the discharging interval. Bridge voltage $V_{c'd'}$ is at +(Vin−Vout) during the circulating interval, goes from $+(V_{in}-V_{out})$ to $-(V_{in}-V_{out})$ at the end of the circulating interval and remains at −(Vin−Vout) during the transfer and discharging intervals. Primary current goes from first current value $+I'_{p1}$ to zero during the circulating interval, goes from zero to second current value $-I'_{p2}$ during the transfer interval and goes from second current value $-I'_{p2}$ to first current value $-I'_{p1}$ during the discharging interval. The duty cycle constraint for the Case IV Reverse M-RMS operating region is the same as that for the Case IV Forward M-RMs operating region as follows:

$$D'_{circ}+D'_{dsch}+D'_{trnf}=1.$$

Neglecting switching transition times, the primary current waveform $I'_p$ seen in FIG. 24 gives rise to the following relation:

$$-D'_{circ}*V'_{circ}+D'_{trnf}*V'_{trnf}-D'_{dsch}*V'_{dsch}=0.$$

Over one switching period, the average value of $I'_{i1}$ conforms to the following relation:

$$-(D'_{circ})^2 * V'_{circ} + (D'_{trnf})^2 * V'_{trnf} = I'_{i1} * 4 * L'_{tot}/T_s.$$

From the preceding equations, transfer and circulating duty cycles can be obtained in terms of a desired current value for $I'_{i1}$ and the remaining parameters in accordance with the following relations:

$$D'_{trnf} = \frac{1}{2} + \frac{\left\{V'_{dsch} - \left[(V'_{chrg})^2 - (V'_{dsch})^2 - \frac{I'_{i1} * 8 * L'_{tot}}{T_s} * \frac{(V'_{chrg})^2}{V'_{dsch}}\right]^{\frac{1}{2}}\right\}}{2 * V'_{chrg}}$$

and $$D'_{circ} = D'_{trnf} - V'_{dsch}/V'_{chrg}.$$

Duty cycles are then related to desired input current $I_{in}$ using the Processed Input Current Equation. In steady state operation, equating input and output power values after neglecting the converter's power losses provides the information needed to relate input and output current values as previously described.

The waveforms associated with the Case V Reverse F-ZVS operating region are depicted in FIG. 25. The switching sequence for this operating region is like that for the Case V Forward F-ZVS operating region but with switches $SW_1'$-$SW_8'$ now carrying out the switching actions carried out by switches $SW_1$-$SW_8$, respectively, in the Case V forward F-ZVS operating region. The Case V Reverse F-ZVS operating region is similar to the Case IV Reverse M-RMS operating region (FIG. 24) except that the duration of all three intervals, i.e. circulating interval, transfer interval and discharging interval, are selected to force the primary current $I'_p$ to reach the values +Ix and −Ix exactly at the end of the circulating intervals in the switching semi-cycles.

For the switching semi-cycle that begins at time t1, the transformer's primary current $I'_p$ goes from first current value $-I'_{p1}$ to +Ix during the circulating interval, and some of the energy stored in $L'_{tot}$ is transferred to the converter's input and output ports. The circulating interval ends and the transfer interval begins when the primary current $I'_p$ reaches the value +Ix. During the transfer interval, primary current increases in magnitude from +Ix to second current value $+I'_{p2}$. During the discharging interval, primary current decreases from second current value $+I'_{p2}$ to first current value $+I'_{p1}$. The bridge voltages $V_{a'b'}$ and $V_{c'd'}$ have the same characteristics as in the Case IV Reverse M-RMS operating region (FIG. 24). In the subsequent semi-cycle, the primary current $I'_p$ is at first current value $+I'_{p1}$ at the start of the circulating interval, reaches the value −Ix at the end of the circulating interval, reaches the second current value $-I'_{p2}$ at the end of the transfer interval, and reaches first current value $-I'_{p1}$ at the end of the discharging interval.

From the primary current waveform $I'_p$ seen in FIG. 25, neglecting transition times, the following relations are obtained:

$$D'_{circ} + D'_{circ} + D'_{trnf} = 1$$

and $$-D'_{circ} * V'_{circ} + D'_{trnf} * V'_{trnf} - D'_{dsch} = -(2*Ix)*4*L'_{tot}/T_s.$$

Over one switching period, average input current 1 conforms to the following relation:

$$-(D'_{circ})^2 * V'_{circ} + (D'_{trnf})^2 * V'_{trnf} + (D'_{circ} + D'_{trnf})* (2*Ix)*4*L'_{tot}/T_s = I'_{i1} * 4 * L'_{tot}/T_s.$$

From the preceding equations, circulating and transfer duty cycles can be found in terms of a desired input current value and the remaining parameters in accordance with the following relations:

$$D'_{circ} = \frac{1}{2} + \left\{ Ix * 8 * \frac{L'_{tot}}{T_s} - \right.$$

$$V'_{dsch} \pm \left[ (V'_{chrg})^2 - (V'_{dsch})^2 + Ix*16*\frac{L'_{tot}}{T_s}*V'_{dsch} - 64* \right.$$
$$\left. \left(Ix*\frac{L'_{tot}}{T_s}\right)^2 - I_{in}*8*\frac{L'_{tot}}{T_s}*(V'_{chrg})^2/(V'_{dsch}) \right]^{\frac{1}{2}} \right\} / (2 *$$

$$(V'_{chrg})$$

and $$D'_{trnf} = D'_{circ} + \left(V'_{dsch} - Ix*8*\frac{L'_{tot}}{T_s}\right)/V'_{chrg},$$

where multiple solutions exist.

The fourth transition Reverse M-RMS operating region between the Case IV Reverse M-RMS and the Case V Reverse M-RMS operating regions has the waveforms depicted in FIG. 26. The fourth transition Reverse M-RMS operating region has the same switching sequence as the fourth transition Forward M-RMS operating region but the switching actions carried out by switches $SW_1$-$SW_8$ in the Forward M-RMS operating region are respectively carried out by switches $SW_1'$-$SW_8'$ in the fourth transition Reverse M-RMS operating region. The fourth transition Reverse M-RMS operating region is also similar to the Case IV Reverse M-RMS (FIG. 24) operating region except that the circulating duty cycle is equal to zero in the fourth transition Reverse M-RMS operating region. When the switching semi-cycle begins at time t1 with the discharging interval, the bridge voltage $V_{a'b'}$ goes from $-V_{out}$ to zero. Primary current is at $-I'_p$ at the start of the discharging interval, and reaches zero at the end of the discharging interval. Bridge voltage $V_{c'd'}$ remains at $-(V_{in}-V_{out})$ during the discharging interval. When the transfer interval begins, bridge voltage $V_{c'd'}$ goes from $-(V_{in}-V_{out})$ to $+(V_{in}-V_{out})$, and bridge voltage $V_{a'b'}$ goes from zero to $+V_{out}$. During the transfer interval, primary current increases in magnitude from zero to reach $+I'_p$ at the end of the transfer interval, bridge voltage $V_{a'b'}$ remains at $+V_{out}$, and bridge voltage $V_{c'd'}$ remains at $+(V_{in}-V_{out})$. The transfer interval is followed by the discharging interval of the next switching semi-cycle. In the next semi-cycle, primary current goes from $+I'_p$ to zero during the discharging interval, and goes from zero to $-I'_p$ during the transfer interval. Bridge voltage $V_{a'b'}$ goes from $+V_{out}$ to zero at the start of the discharging interval, and goes from zero to $-V_{out}$ at the start of the transfer interval. Bridge voltage $V_{c'd'}$ remains at $+(V_{in}-V_{out})$ during the discharging interval and goes from $+(V_{in}-V_{out})$ to $-(Vin-Vout)$ at the start of the transfer interval. The duty cycle constraint for the fourth transition Reverse M-RMS operating region becomes dictated by the following relation:

$$D'_{dsch}+D'_{trnf}=1.$$

As a result, the primary current waveform $I_p'$ seen in FIG. 26 gives rise to the following relations:

$$D'_{trnf}*V'_{trnf}-(1-D'_{trnf})*V'_{dsch}=0,$$

$$D'_{trnf}=V'_{dsch}/(V'_{dsch}+V'_{trnf}) \text{ and}$$

$$V'_{trnf}*(D'_{trnf})^2=I'_{i1}*4*L'_{tot}/T_s.$$

Duty cycles are related to desired input current $I'_{in}$ using the Processed Input Current Equation. In steady state operation, equating input and output current values after neglecting the converter's power losses provides the information needed to relate input and output current values as previously described.

The fifth transition Reverse F-ZVS operating region between the Case V Reverse F-ZVS and the Case VI Reverse F-ZVS operating regions has the waveforms depicted in FIG. 27. The switching sequence for this operating region is like that for the fifth transition Forward F-ZVS operating region but with switches $SW_1'$-$SW_8'$ interchanged for switches $SW_1$-$SW_8$, respectively. The fifth transition Reverse F-ZVS operating region is similar to the Case V Reverse F-ZVS (FIG. 25) operating region except that primary current goes from −Ix to current value +Ix during the circulating interval that begins with the switching semi-cycle at time t1, goes from +Ix to +$I'_p$ during the transfer interval, and goes from +$I'_p$ to Ix during the discharging interval in the fifth transition Reverse F-ZVS operating region. In the next semi-cycle, primary current goes from +Ix to current value −Ix during the circulating interval, goes from −Ix to −$I'_p$ during the transfer interval, and goes from −$I'_p$ to −Ix during the discharging interval. The bridge voltages $V_{a'b'}$ and $V_{c'd'}$ have similar characteristics to the bridge voltages $V_{a'b'}$ and $V_{c'd'}$ in FIG. 25. The primary current waveform $I'_p$ seen in FIG. 27 gives rise to the following relations:

$$D'_{circ}V'_{circ}=(2*Ix)*4*L'_{tot}/T_s,$$

$$D'_{trnf}*V'_{trnf}-D'_{dsch}*V'_{dsch}=0$$

and $$D'_{circ}+D'_{trnf}+D'_{dsch}=1.$$

As a result, the following relations apply:

$$D'_{trnf}=V'_{dsch}*(1-D'_{circ})/(V'_{dsch}+V'_{trnf})$$

and $$-(D'_{trnf})^2*V'_{trnf}+((2*Ix)*4*L'_{tot}/T_s)*D'_{trnf}=(I'_{i1})*4*L'_{tot}/T_s.$$

FIG. 28 depicts the waveforms associated with the Case V Reverse M-RMS operating region. This operating region is similar to the Case V Forward M-RMS operating region but the switching actions carried out by switches $SW_1$-$SW_8$ in the Case V Forward M-RMS operating region are respectively carried out by switches $SW_1'$-$SW_8'$ in the Case V Reverse M-RMS operating region as previously described. For the switching semi-cycle that begins at time t1, the bridge voltage $V_{a'b'}$ goes from zero to +$V_{out}$, and the bridge voltage $V_{c'd'}$ goes from zero to +($V_{in}$−$V_{out}$) at the start of the transfer interval. During the transfer interval, $V'_{trnf}$ is applied across total leakage inductance $L'_{tot}$ and the primary current increases in magnitude from zero to +$I'_p$. When the discharging interval begins, the bridge voltage $V_{a'b'}$ goes to zero. During the discharging interval, the primary current decreases from +$I'_p$ to zero. The discharging interval ends when the primary current $I'_p$ reaches zero, and the bridge voltage $V_{c'd'}$ goes to zero at the end of the discharging interval. The idling interval lasts for the remaining portion of the switching semi-cycle following the discharging interval. During the idling interval, the bridge voltages $V_{a'b'}$ and $V_{c'd'}$ and the transformer's primary current $I'_p$ remain at zero. In the subsequent semi-cycle, primary current goes from zero to −$I'_p$ during the transfer interval, goes from −$I'_p$ to zero during the discharging interval, and remains at zero during the idling interval. The bridge voltage $V_{a'b'}$ goes from zero to −$V_{out}$ at the start of the transfer interval, goes from −$V_{out}$ to zero at the start of the discharging interval, and remains at zero during the idling interval. The bridge voltage $V_{c'd'}$ goes from zero to −($V_{in}$−$V_{out}$) at the start of the transfer interval, goes from −($V_{in}$−$V_{out}$) to zero at the end of the discharging interval, and remains at zero during the idling interval.

Neglecting transition times, the primary current waveform $I'_p$ seen in FIG. 28 gives rise to the following relation:

$$D'_{trnf}*V'_{trnf}-D'_{dsch}*V'_{dsch}=0,$$

where $D'_{dsch}$ is the equivalent duty cycle for the discharging interval during a switching semi-cycle of primary current waveform.

Over one switching period, the average value of $I'_{i1}$ conforms to the following relation:

$$V'_{trnf}*(D'_{trnf})^2=I'_{i1}*4*L'_{tot}/T_s.$$

The preceding equations allow the transfer, discharging and idling duty cycles to be found in terms of a desired input current value and the remaining parameters according to the following relations:

$$D'_{trnf}=\left(\frac{I'_{i1}*4*L'_{tot}}{T_s*V'_{trnf}}\right)^{\frac{1}{2}},$$

$$D'_{dsch}=D'_{trnf}*V'_{trnf}/V'_{dsch} \text{ and}$$

$$D'_{trnf}+D'_{dsch}+D'_{idln}=1.$$

Duty cycles are related to desired input current $I'_{in}$ using the Processed Input Current Equation. In steady state operation, equating input and output power values after neglecting the converter's power losses provides the information needed to relate input and output current values as previously described.

FIG. 29 depicts the waveforms associated with the Case VI Reverse F-ZVS operating region. The switching sequence for the Case VI Reverse F-ZVS operating region is like that for the Case VI Forward F-ZVS operating region but with switches $SW_1'$-$SW_8'$ interchanged for switches $SW_1$-$SW_8$, respectively. The Case VI Reverse F-ZVS operating region, which is used when $V'_{trnf}$ is positive, has the same switching sequence as the Case II Forward F-ZVS (FIG. 16) operating region where the durations of charging interval, transfer interval and discharging interval are selected to force the primary current $I'_p$ to reach the values +Ix and −Ix exactly at the end of the switching semi-cycles. During the circulating interval in the switching semi-cycle that begins at time t1, the transformer's primary current $I'_p$ begins at −Ix and increases in magnitude to current value +Ix. During the charging interval, the transformer's primary current $I'_p$ increases in magnitude from +Ix to current value +$I'_{p1}$. During the transfer interval, primary current increases in magnitude from current value +$I'_{p1}$ to +$I'_{p2}$. The discharging interval, which follows the transfer interval, ends when the primary current reaches +Ix at the end of the switching semi-cycle. The bridge voltages $V_{a'b'}$ and $V_{c'd'}$ have characteristics similar to the bridge voltages in FIG. 16. In the subsequent semi-cycle, primary current reaches current value −Ix at the end of the circulating interval, reaches current value −I'$_p$ at the end of the charging interval, reaches current value −I'$_{p2}$ at the end of the transfer interval and reaches −Ix at the end of the discharging interval.

From the primary current waveform I'$_p$ seen in FIG. 29 and neglecting transition times, the following relations apply for a switching semi-cycle in the Case VI Reverse F-ZVS operating region:

$$D'_{circ}*V'_{circ}=(2*Ix)*4*L'_{tot}/T_s,$$

$$D'_{chrg}*V'_{chrg}+D'_{trnf}*V'_{trnf}-D'_{dsch}*V'_{dsch}=0$$

and $$D'_{circ}+D'_{chrg}+D'_{trnf}+D'_{dsch}=1.$$

Over one switching period, the average input current conforms to the following relation:

$$-(D'_{trnf})^2*V'_{trnf}+('D_{chrg})^2*V'_{chrg}+(D'_{chrg}+D'_{trnf})*(2*Ix)*4*L'_{tot}/T_s+D'_{dsch}*D'_{trnf}*V'_{dsch}=I'_{i1}*4*L'_{tot}/T_s.$$

From the preceding equations, a second degree algebraic equation for circulating duty cycle is obtained:

$$A*(D'_{trnf})^2+B*(D'_{trnf})+C=0;$$

where $$A=V'_{trnf}+2*V'_{dsch}=V'_{chrg}*V'_{dsch}/V'_{circ}-(V'_{chrg})^3/(V'_{circ})^2,$$

$$B=-(2*Ix)*4*L'_{tot}/T_s+2*(1-D'_{circ})*V'_{dsch}+2*(1-D'_{circ})*(V'_{dsch})^2/V'_{circ}-(2*Ix)*4*L'_{tot}/T_s*V'_{chrg}/V'_{circ}+2*(1-D'_{circ})*V'_{dsch}*(V'_{chrg})^2/(V'_{circ})^2$$

and $$C=(I'_{i1})*4*L'_{tot}/T_s-(1-D'_{circ})^2*V'_{chrg}*(V'_{dsch})^2/(V'_{circ})^2-(1-D'_{circ})*(2*Ix)*4*L'_{tot}/T_s*V'_{dsch}/V'_{circ}.$$

The following equation can be directly solved for transfer duty cycle:

$$D'_{trnf}=[-B\pm[(B)^2-4*A*C]^{1/2}]/(2*A).$$

The transfer duty cycle and the preceding equations can be combined to find charging and discharging interval duty cycles in terms of a desired input current value and circulating primary current value. As mentioned above, there are multiple valid solutions in certain portions of this operating region and a preferable methodology involves using the solution that Waveforms for the sixth transition Reverse F-ZVS operating region between the Case VI Reverse F-ZVS and Case VII Reverse F-ZVS operating regions are shown in FIG. 30. This operating region has the same switching sequence as the sixth transition Forward F-ZVS operating region except that switches SW$_1$'-SW$_8$' have been interchanged for switches SW$_1$-SW$_8$, respectively, as previously described. The switching sequence for the sixth transition Reverse F-ZVS operating region is the same as that for the first transition Reverse F-ZVS (FIG. 14) operating region except that V$_{trnf}$ is positive. Consequently, the switching sequence for the sixth transition Reverse F-ZVS operating region has the primary current I'$_p$ beginning at −I$_x$ when the circulating interval starts at time t1, reaches +I$_x$ at the end of the circulating interval, reaches the value of +I'$_p$ at the end of the charging interval and reaches the value of +I$_x$ at the end of the discharging interval. The bridge voltages $V_{a'b'}$ and $V_{c'd'}$ have characteristics similar to the bridge voltages in FIG. 14. In the subsequent switching semi-cycle, primary current reaches −I$_x$ at the end of the circulating interval, reaches the value −I'$_p$ at the end of the charging interval and reaches the value of −I$_x$ at the end of the discharging interval.

The duty cycle constraints for operation in the sixth transition Reverse F-ZVS operating region thusly become:

$$D'_{circ}*V'_{circ}=(2*Ix)*4*L'_{tot}/T_s,$$

$$D'_{chrg}*V'_{chrg}-D'_{dsch}*V'_{dsch}=0$$

and $$1-D'_{circ}-D'_{chrg}-D'_{dsch}=0.$$

As a result, the following relations apply:

$$D'_{chrg}=V'_{dsch}*(1-D'_{circ})/(V'_{dsch}+V'_{chrg}),$$

$$D'_{dsch}=D'_{chrg}*V'_{chrg}/V'_{dsch}$$

and $$((D'_{circ})^2*V'_{chrg}+(D'_{circ})*(2*Ix)*4*L'_{tot}/T_s)=I_{i1}*4*L_{tot}/T_s.$$

The Processed Input Current Equation is then used to relate duty cycles to desired input current I'$_{in}$. In steady state operation, equating input and output power values after neglecting the converter's power losses provides the information needed to relate input and output current values as previously described.

Waveforms for the Case VII Reverse F-ZVS operating region are shown in FIG. 31. The switching sequence for this operating region is the same as that for the Case VII Forward F-ZVS except now the switching actions are carried out by switches SW$_1$'-SW$_8$' as explained above. The switching sequence for the Case VII Reverse F-ZVS operating region is the same as that for the Case I Reverse F-ZVS (FIG. 12) operating region except that V$_{trnf}$ is now positive. During the circulating interval for the switching semi-cycle that begins at time t1 in the Case VII Reverse F-ZVS operating region, primary current I'$_p$ begins at −I$_x$ and increases in magnitude until it reaches current value +Ix. During the charging interval, primary current I'$_p$ goes from +I$_x$ to +I'$_p$, remains at +I'$_p$ during the freewheeling interval, and goes from +I'$_p$ to +Ix during the discharging interval. The bridge voltages $V_{a'b'}$ and $V_{c'd'}$ have similar characteristics to the bridge voltages in the Case I Reverse F-ZVS operating region (FIG. 12). In the subsequent semi-cycle, primary current I'$_p$ goes from +Ix to −Ix during the circulating interval, goes from −Ix to −I'$_p$ during the charging interval, remains at −I'$_p$ during the freewheeling interval and goes from −I'$_p$ to −Ix during the discharging interval.

From the primary current waveform I'$_p$ seen in FIG. 31 and neglecting transition times, the following relations apply for a switching semi-cycle in the Case VII Reverse F-ZVS operating region:

$$D'_{chrg}*V'_{chrg}-D'_{dsch}*V'_{dsch}=0$$

and $$D'_{circ}*V'_{circ}=(2*I'_{i1})*4*L'_{tot}/T_s.$$

Over one switching period, the average input current I$_{in}$ conforms to the following relation:

$$(D'_{chrg})^2*V_{chrg}+(D'_{chrg})*(2*I_x)*4*L'_{tot}/T_s=I_{in}*4*L_{tot}/T_s.$$

From the aforementioned equations, charging and discharging duty cycles can be determined in terms of a desired input current value, a desired circulating primary current value, and remaining parameters according to the following relations:

$$D'_{chrg} = \{-I_x + [I_x^2 + I'_{i1} * V'_{chrg}]^{1/2}\} * 4 * L'_{tot}/(T_s * V'_{chrg})$$

and $$D'_{dsch} = D'_{chrg} * V'_{chrg}/V'_{dsch}.$$

The freewheeling interval lasts for the remaining portion of the switching semi-cycle and its duty cycle is determined by the relation:

$$1 - D'_{circ} - D'_{chrg} - D'_{dsch} = D'_{freew}.$$

Duty cycles can then be related to desired input current $I'_{in}$ using the Processed Input Current Equation as defined above. In steady state operation, equating input and output power values after neglecting the converter's power losses provides the information needed to relate input and output current values as previously described.

As mentioned above, when the minimum value of circulating primary current needed to obtain zero-voltage switching is much larger for the MOSFETs in one bridge than that for the MOSFETs in the other bridge, it may be more efficient (lower conduction power losses) to reduce the amount of circulating primary current on the side (bridge) with the lower minimum current requirement. In the drawing Figures for all of the F-ZVS operating regions shown previously, the magnitude of the values exhibited by the primary current waveform $I_p$, $I'_p$ at the beginning and end of the circulating intervals represents the minimum values of circulating primary current used for soft switching the MOSFETs in the primary and secondary bridges, respectively. Therefore, selecting different magnitude values for the primary current at the beginning and end of the circulating intervals, which also provide the minimum requirements for soft switching the MOSFETs in each respective bridge will achieve higher converter efficiency.

The aforementioned methodology of varying circulating primary current values at the beginning and end of the circulating intervals is illustrated by way of example in FIG. 12 for Case I F-ZVS, FIG. 14 for first transition F-ZVS, FIG. 16 for Case II F-ZVS, FIG. 18A for second transition F-ZVS, FIG. 18B for Case III F-ZVS, FIG. 18C for third transition F-ZVS, FIG. 23 for fourth transition F-ZVS, FIG. 25 for Case V F-ZVS, FIG. 27 for fifth transition F-ZVS, FIG. 29 for Case VI F-ZVS, FIG. 30 for sixth transition F-ZVS and FIG. 31 for Case VII F-ZVS, which show that primary current magnitude values are allowed to be different at the beginning and the end of the circulating intervals. More specifically, FIGS. 12, 14, 16, 18A, 18B, 18C, 23, 25, 27, 29, 30 and 31 show the primary current values being Ix at the start of the circulating intervals and being Iz at the end of the circulating intervals, where Ix and Iz are different selected primary current magnitude values. Accordingly, these changes in primary current values at the ends of the circulating intervals require appropriate changes in several of the constraint equations and/or additional constraint equations for the applicable Cases and transition F-ZVS operating regions.

As pointed out above, FIGS. 32 and 33 graphically illustrate the ranges of input current values to the converter obtained for the applicable ranges of PV array voltage input in the forward and reverse main and transition operating regions in the M-RMS modes of operation (FIG. 32) and the F-ZVS modes of operation (FIG. 33). It can be seen from FIG. 32 that the first transition M-RMS operating regions (Border I) encompass a series of input current values to the converter decreasing in magnitude from about 6.5 amps to zero over a range of PV array voltage of about 200-300 volts. The first main M-RMS operating regions (Case I) encompass a region of input current values to the converter that fall below the first transition M-RMS operating regions over the range of PV array voltage of about 200-300 volts. The second transition M-RMS operating regions (Border II) encompass a series of input current values to the converter decreasing in magnitude from about 8.75 amps to zero over a range of PV array voltage of about 200-300 volts. The second main M-RMS operating regions (Case II) encompass a region of input current values to the converter that fall between the first and second transition M-RMS operating regions. The third transition M-RMS operating regions (Border III) encompass a series of input current values to the converter increasing in magnitude from zero to about 10 amps over a range of PV array voltage of about 300-550 volts. The third main M-RMS operating regions (Case III) encompass a region of input current values to the converter that fall between the second and third transition M-RMS operating regions. The fourth transition M-RMS operating regions (Border IV) encompass a series of input current values to the converter increasing in magnitude from zero to about 7 amps over the range of PV array voltage of about 300-550 volts. The fourth main M-RMS operating regions (Case IV) encompass a region of input current values to the converter that fall between the third and fourth transition M-RMS operating regions. The fifth main M-RMS operating regions (Case V) encompass a region of input current values to the converter that fall below the fourth transition M-RMS operating regions over the range of PV array voltage of about 300-550 volts.

It can be seen from FIG. 33 that the first transition F-ZVS operating regions (Border I) encompass a series of input current values to the converter in the vicinity of about 7.75 amps over a range of PV array voltage of about 200-300 volts. The second transition F-ZVS operating regions (Border II) encompass a series of input current values to the converter decreasing in magnitude from about 9 amps to about 3.8 amps over a range of PV array voltage of about 200-300 volts. The first main F-ZVS operating regions (Case I) encompass a region of input current values to the converter that fall below the first and second transition F-ZVS operating regions over the range of PV array voltage of about 200-300 volts. The second main F-ZVS operating regions (Case II) encompass a region of input current values to the converter that fall between the first and second transition F-ZVS operating regions over a range of PV array voltage of about 200-240 volts. The third transition F-ZVS operating regions (Border III) encompass a series of input current values to the converter decreasing in magnitude from about 11 amps to about 3.8 amps over a range of PV array voltage from about 200-300 volts. The third main F-ZVS operating regions (Case III) encompass a region of input current values to the converter that fall between the second and third transition F-ZVS operating regions over a range of PV array voltage from about 200-250 volts. The fourth transition F-ZVS operating regions (Border IV) encompass a series of input current values to the converter increasing in magnitude from about 3.8 amps to about 11 amps over a range of PV array voltage from about 300-550 volts. The fourth main F-ZVS operating regions (Case IV) encompass a region of input current values to the converter that fall between the third and fourth transition F-ZVS operating regions over a range of PV array voltage from about 200-550 volts. The fifth transition F-ZVS operating regions (Border V) encompass a series of input current values to the converter increasing in magnitude from about 3.8 amps to about 8 amps over a range of PV array voltage from about 300-550 volts. The fifth main F-ZVS operating regions (Case V) encompass a region of input current values to the converter that fall between the fourth and fifth transition F-ZVS operating regions over a range of PV array voltage from about 340-550 volts. The sixth transition F-ZVS operating regions (Border VI) encompass a series of input current values decreasing in magnitude from about 7.75 amps to about 6.75 amps over a range of PV array voltage of about 300-550 volts. The sixth main F-ZVS operating regions (Case VI) encompass a region of input current values to the converter that fall between the fifth and sixth transition F-ZVS operating regions over a range of PV array voltage of about 400-550 volts. The seventh main F-ZVS operating regions (Case VII) encompass a region of input current values to the converter that fall below the fifth and sixth transition F-ZVS operating regions over a range of PV array voltage of about 300-550 volts.

When the dual active bridge (DAB) series-connected converter 32 is used in the battery charge controller 10 to perform maximum power point tracking for the photovoltaic array 14, normally both input and output voltage loops and input current loops of the converter are closed. Any of the loops can have its reference value easily and directly forced upon the converter by employing the modulation control scheme described above. Sensing of the converter's input and output voltages, together with knowledge of total inductance $L_{tot}$, $L'_{tot}$ values and switching frequency, allows the appropriate operating region to be identified and allows for straightforward calculation of required duty cycles. In addition, the modulation control scheme allows accurate cycle to cycle control of input or output average current and thus provides a programmable current limit that can be applied to either input or output current feedback loops.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A modulation control scheme for a photovoltaic system charge controller to control charging of a battery bank with electrical power from a high voltage photovoltaic (PV) array, comprising a photovoltaic system charge controller including a dual active bridge DC to DC converter having a first bridge with four MOSFET switches, a second bridge with four MOSFET switches, and a transformer electrically connecting said first and second bridges and having a total leakage inductance $L_{tot}$ and a turn ratio n, said first bridge receiving electrical input V1 from the high voltage photovoltaic array and said second bridge delivering electrical output $V_{out}$ of appropriate voltage to charge the battery bank; and a modulation control scheme for selectively controlling on and off actions of said switches to control electrical power flow through said converter in a minimum root mean square M-RMS mode of operation to minimize conduction losses and a full zero-voltage switching F-ZVS mode of operation to minimize switching losses, said M-RMS mode of operation having an operating range divided into five main M-RMS operating regions and four transition M-RMS operating regions respectively located between adjacent main M-RMS operating regions based on the value of a voltage component $V_{trnf}$ corresponding to the voltage differential $V1-V_{out}/n$, said F-ZVS mode of operation having an operating range divided into seven main F-ZVS operating regions and six transition F-ZVS operating regions respectively located between adjacent main F-ZVS operating regions based on the value of $V_{trnf}$, each of said operating regions having switching semi-cycles divided into a plurality of intervals, said modulation control scheme controlling said switches in a first main M-RMS operating region in which $V_{trnf}$ is negative and each switching semi-cycle consists in sequence of a charging interval during which a voltage component $V_{trnf}$ corresponding to V1 is applied across $L_{tot}$, a transfer interval during which $V_{trnf}$ is applied across $L_{tot}$ and an idling interval during which a voltage component $V_{idln}$ corresponding to zero-voltage is applied across $L_{tot}$ while the transformer primary current is zero, a first transition M-RMS operating region in which $V_{trnf}$ is negative and each switching semi-cycle consists in sequence of a charging interval and a transfer interval wherein transformer primary current reaches zero at the end of the transfer interval, a second main M-RMS operating region in which $V_{trnf}$ is negative and each switching semi-cycle consists in sequence of a circulating interval during which a voltage component $V_{circ}$ corresponding to $V1+V_{out}/n$ is applied across $L_{tot}$, a charging interval and a transfer interval wherein transformer primary current reaches zero at the end of the transfer interval, a second transition M-RMS operating region in which $V_{trnf}$ is negative and each switching semi-cycle consists in sequence of a circulating interval and a transfer interval wherein transformer primary current reaches zero at the end of the transfer interval, a first aspect of a third main M-RMS operating region in which $V_{trnf}$ is negative and each switching semi-cycle consists in sequence of a circulating interval and a transfer interval wherein transformer primary current is not at zero at the end of the transfer interval, a second aspect of the third main M-RMS operating region in which $V_{trnf}$ is zero and each switching semi-cycle consists in sequence of a circulating interval and a transfer interval wherein transformer primary current is constant and not zero during the transfer interval, a third aspect of the third main M-RMS operating region in which $V_{trnf}$ is positive and each switching semi-cycle consists in sequence of a circulating interval and a transfer interval wherein transformer primary current is not zero at the end of the transfer interval, a third transition M-RMS operating region in which $V_{trnf}$ is positive and each switching semi-cycle consists in sequence of a circulating interval and a transfer interval wherein transformer primary current is zero at the end of the circulating interval, a fourth main M-RMS operating region in which $V_{trnf}$ is positive and each switching semi-cycle consists in sequence of a circulating interval, a transfer interval and a discharging interval during which a voltage component $V_{dsch}$ corresponding to $V_{out}/n$ is applied across $L_{tot}$ wherein transformer primary current reaches zero at the end of the circulating interval, a fourth transition M-RMS operating region in which $V_{trnf}$ is positive and each switching semi-cycle consists in sequence of a discharging interval and a transfer interval wherein transformer primary current reaches zero at the end of the discharging interval, a fifth main M-RMS operating region in which $V_{trnf}$ is positive and each switching semi-cycle consists in sequence of a transfer interval, a discharging interval and an idling interval wherein transformer primary current reaches zero at the end of the discharging interval, a first main F-ZVS operating region in which $V_{trnf}$ is negative and each switching semi-cycle consists in sequence of a circulating interval, a charging interval, a freewheeling interval, during which a voltage component $V_{freew}$ corresponding to zero-voltage when transformer primary is not zero is applied across $L_{tot}$, and a discharging interval wherein transformer primary current reaches a selected circulating primary current value $I_x$ at the ends of the circulating and discharging intervals, a first transition F-ZVS operating region in which $V_{trnf}$ is negative and each switching semi-cycle consists in sequence of a circulating interval and a charging interval wherein transformer primary current reaches $I_x$ at the ends of the circulating and discharging intervals, a second main F-ZVS operating region in which $V_{trnf}$ is negative and each switching semi-cycle consists in sequence of a circulating interval, a charging interval, a transfer interval and a discharging interval wherein transformer primary current reaches $I_x$ at the ends of the circulating and discharging intervals, a second transition F-ZVS operating region in which $V_{trnf}$ is negative and each switching semi-cycle consists in sequence of a circulating interval, a charging interval and a transfer interval wherein transformer primary current reaches $I_x$ at the ends of the circulating and transfer intervals, a third main F-ZVS operating region in which $V_{trnf}$ is negative and each switching semi-cycle consists in sequence of a circulating interval, a charging interval and a transfer interval wherein transformer primary current reaches $I_x$ only at the end of the transfer interval, a third transition F-ZVS operating region in which $V_{trnf}$ is negative and each switching semi-cycle consists in sequence of a circulating interval and a transfer interval wherein transformer primary current reaches $I_x$ at the end of the transfer interval, a first aspect of a fourth main F-ZVS operating region in which $V_{trnf}$ is negative and each switching semi-cycle consists in sequence of a circulating interval and a transfer interval wherein transformer primary current reaches a current value $I_{p2}$ at the end of the circulating interval and reaches a current value $I_{p1}$, less than $I_{p2}$, at the end of the transfer interval, a second aspect of the fourth main F-ZVS operating region in which $V_{trnf}$ is zero and each switching semi-cycle consists in sequence of a circulating interval and a transfer interval wherein transformer primary current is at $I_{p1}$ throughout the transfer interval, a third aspect of the fourth main F-ZVS operating region in which $V_{trnf}$ is positive and each switching semi-cycle consists in sequence of a circulating interval and a transfer interval wherein transformer primary current reaches $I_{p1}$ at the end of the circulating interval and reaches $I_{p2}$ at the end of the transfer interval, a fourth transition F-ZVS operating region in which $V_{trnf}$ is positive and each switching semi-cycle consists in sequence of a circulating interval and a transfer interval wherein transformer primary current reaches $I_x$ at the end of the circulating interval and reaches a current value $I_p$, greater than $I_x$, at the end of the transfer interval, a fifth main F-ZVS operating region in which $V_{trnf}$ is positive and each switching semi-cycle consists in sequence of a circulating interval, a transfer interval and a discharging interval wherein transformer primary current reaches $I_{p2}$ at the end of the transfer interval and reaches $I_{p1}$ at the end of the discharging interval, a fifth transition F-ZVS operating region in which $V_{trnf}$ is positive and each switching semi-cycle consists in sequence of a circulating interval, a transfer interval and a discharging interval wherein transformer primary current reaches $I_x$ at the end of the circulating interval, reaches $I_p$ at the end of the transfer interval and reaches $I_x$ at the end of the discharging interval, a sixth main F-ZVS operating region in which $V_{trnf}$ is positive and each switching semi-cycle consists in sequence of a circulating interval, a charging interval, a transfer interval and a discharging interval wherein transformer primary current reaches $I_x$ at the end of the circulating interval, reaches $I_{p1}$ at the end of the charging interval, reaches $I_{p2}$ at the end of the transfer interval and reaches $I_x$ at the end of the discharging interval, a sixth transition F-ZVS operating region in which $V_{trnf}$ is positive and each switching semi-cycle consists in sequence of a circulating interval, a charging interval and a discharging interval wherein transformer primary current reaches $I_x$ at the end of the circulating interval, reaches $I_p$ at the end of the charging interval and reaches $I_x$ at the end of the discharging interval, and a seventh main F-ZVS operating region in which $V_{trnf}$ is positive and each switching semi-cycle consists in sequence of a circulating interval, a charging interval, a freewheeling interval and a discharging interval wherein transformer primary current reaches $I_x$ at the end of the circulating interval, reaches $I_p$ at the end of the charging interval, remains at $I_p$ during the freewheeling interval and reaches $I_x$ at the end of the discharging interval.

2. The modulation control scheme as recited in claim 1 wherein said charge controller performs maximum power point tracking of the photovoltaic array.

3. The modulation control scheme as recited in claim 2 wherein said charge controller receives said electrical input from a high voltage photovoltaic array of up to 600 volts.

4. The modulation control scheme as recited in claim 3 wherein said first transition M-RMS operating region encompasses a series of input current values to said converter decreasing in magnitude from about 6.5 amps to zero over a range of PV array voltage of about 200-300 volts, said first main M-RMS operating region encompasses a region of input current values to said converter that fall below said first transition M-RMS operating region over the range of PV array voltage of about 200-300 volts, said second transition M-RMS operating region encompasses a series of input current values to said converter decreasing in magnitude from about 8.75 amps to zero over a range of PV array voltage of about 200-300 volts, said second main M-RMS operating region encompasses a region of input current values to said converter that fall between said first and said second transition M-RMS operating regions, said third transition M-RMS operating region encompasses a series of input current values to said converter increasing in magnitude from zero to about 10 amps over a range of PV array voltage of about 300-550 volts, said third main M-RMS operating region encompasses a region of input current values to said converter that fall between said second and third transition M-RMS operating regions, said fourth transition M-RMS operating region encompasses a series of input current values to said converter increasing in magnitude from zero to about 7 amps over the range of PV array voltage of about 300-550 volts, said fourth main M-RMS operating region encompasses a region of input current values to said converter that fall between said third and fourth transition M-RMS operating regions, said fifth main M-RMS operating region encompasses a region of input current values to said converter that fall below said fourth transition M-RMS operating region over the range of PV array voltage of about 300-550 volts, said first transition F-ZVS operating region encompasses a series of input current values to said converter in the vicinity of about 7.75 amps over a range of PV array voltage of about 200-300 volts, said second transition F-ZVS operating region encompasses a series of input current values to said converter decreasing in magnitude from about 9 amps to about 3.8 amps over a range of PV array voltage of about 200-300 volts, said first main F-ZVS operating region encompasses a region of input current values to said converter that fall below said first and second transition F-ZVS operating regions over the range of PV array voltage of about 200-300 volts, said second main F-ZVS operating region encompasses a region of input current values to said converter that fall between said first and second transition F-ZVS operating regions over a range of PV array voltage of about 200-240 volts, said third transition F-ZVS operating region encompasses a series of input current values to said converter decreasing in magnitude from about 11 amps to about 3.8 amps over a range of PV array voltage of about 200-300 volts, said third main F-ZVS operating region encompasses a region of input current values to said converter that fall between said second and third transition F-ZVS operating regions over a range of PV array voltage of about 200-250 volts, said fourth transition F-ZVS operating region encompasses a series of input current values to said converter increasing in magnitude from about 3.8 amps to about 11 amps over a range of PV array voltage of about 300-550 volts, said fourth main F-ZVS operating region encompasses a region of input current values to said converter that fall between said third and fourth transition F-ZVS operating regions over a range of PV array voltage of about 200-550 volts, said fifth transition F-ZVS operating region encompasses a series of input current values to said converter increasing in magnitude from about 3.8 amps to about 8 amps over a range of PV array voltage of about 300-550 volts, said fifth main F-ZVS operating region encompasses a region of input current values to said converter that fall between said fourth and fifth transition F-ZVS operating regions over a range of PV array voltage of about 340-550 volts, said sixth transition F-ZVS operating region encompasses a series of input current values to said converter decreasing in magnitude from about 7.75 amps to about 6.75 amps over a range of PV array voltage of about 300-550 volts, said sixth main F-ZVS operating region encompasses a region of input current values to said converter that fall between said fifth and sixth transition F-ZVS operating regions over a range of PV array voltage of about 400-550 volts, said seventh main F-ZVS operating region encompasses a region of input current values to said converter that fall below said fifth and sixth transition F-ZVS operating regions over a range of PV array voltage of about 300-550 volts.

5. The modulation control scheme as recited in claim 1 wherein said modulation control scheme selectively controls the values of the circulating primary current at the end of the circulating intervals to be different than the values of the circulating primary current at the beginning of the circulating intervals in the F-ZVS mode of operation.

6. A modulation control scheme for a charge controller in a photovoltaic system having a photovoltaic array, a battery bank and a high voltage DC end load, comprising a series-connected charge controller including a bidirectional dual active bridge DC to DC converter having a first bridge with four MOSFET switches, a second bridge with four MOSFET switches, and a transformer electrically connecting said first and second bridges and having a total leakage inductance and a turn ration n, said converter being operable in a forward direction of power flow wherein said first bridge receives electrical input V1 from the photovoltaic array and said second bridge delivers electrical output $V_{out}$ of appropriate voltage to charge the battery bank, said converter being operable in a reverse direction of power flow wherein said second bridge receives electrical input $V_{out}$ from the battery bank and said first bridge delivers electrical output $V_{in}$ of appropriate voltage to the high voltage DC end load; and a modulation control scheme for selectively controlling on and off actions of said switches to control electrical power flow through said converter in said forward direction and said reverse direction in a minimum root mean square M-RMS mode of operation to minimize conduction losses and a full-zero voltage switching F-ZVS mode of operation to minimize switching losses, said M-RMS mode of operation having an operating range divided into a series of five main M-RMS operating regions and four transition M-RMS operating regions respectively located between adjacent main M-RMS operating regions, said F-ZVS mode of operation having an operating range divided into a series of seven main F-ZVS operating regions and six transition F-ZVS operating regions respectively located between adjacent main F-ZVS operating regions, each of said operating regions having switching semi-cycles divided into a plurality of intervals during which a different voltage component is applied across total leakage inductance in accordance with the switching actions of said switches as controlled by said modulation control scheme, said modulation control scheme determining the duty cycle for each of said intervals, said forward direction M-RMS mode of operation comprising a first main forward M-RMS operating region wherein each switching semi-cycle is composed in sequence of a charging interval wherein a voltage component $V_{chrg}$ corresponding to V1 is applied across a total leakage inductance $L_{tot}$, a transfer interval wherein a voltage component $V_{trnf}$ corresponding to the differential V1–$V_{out}$/n is applied across $L_{tOt}$ and $V_{trnf}$ is negative, and an idling interval during which a voltage component $V_{idln}$ corresponding to zero-voltage when the transformer primary current is zero is applied across $L_{tot}$, a first transition forward M-RMS operating region wherein $V_{trnf}$ is negative and each switching semi-cycle is composed in sequence of a charging interval and a transfer interval, a second main forward M-RMS operating region wherein $V_{trnf}$ is negative and each switching semi-cycle is composed in sequence of a circulating interval wherein a voltage component $V_{circ}$ corresponding to V1+$V_{out}$/n is applied across $L_{tot}$, a charging interval and a transfer interval, a second transition forward M-RMS operating region wherein $V_{trnf}$ is negative and each switching semi-cycle is composed in sequence of a circulating interval and a transfer interval, a first aspect of a third main forward M-RMS operating region wherein $V_{trnf}$ is negative and each switching semi-cycle is composed in sequence of a circulating interval and a transfer interval, a second aspect of the third main forward M-RMS operating region wherein $V_{trnf}$ is zero and each switching semi-cycle is composed in sequence of a circulating interval and a transfer interval, a third aspect of the third main forward M-RMS operating region wherein $V_{trnf}$ is positive and each switching semi-cycle is composed in sequence of a circulating interval and a transfer interval, a third transition forward M-RMS operating region wherein $V_{trnf}$ is positive and each switching semi-cycle is composed in sequence of a circulating interval and a transfer interval, a fourth main forward M-RMS operating region wherein $V_{trnf}$ is positive and each switching semi-cycle is composed in sequence of a circulating interval, a transfer interval and a discharging interval wherein a voltage component $V_{dsch}$ corresponding to $V_{out}/n$ is applied across $L_{tot}$, a fourth transition forward M-RMS operating region wherein $V_{trnf}$ is positive and each switching semi-cycle is composed in sequence of a discharging interval and a transfer interval, and a fifth main forward M-RMS operating region wherein $V_{trnf}$ is positive and each switching semi-cycle is composed in sequence of a transfer interval, a discharging interval and an idling interval, said forward direction F-ZVS mode of operation comprising a first main forward F-ZVS operating region wherein $V_{trnf}$ is negative and each switching semi-cycle is composed in sequence of a circulating interval, a charging interval, a freewheeling interval wherein a voltage component $V_{freew}$ corresponding to zero-voltage when the transformer primary current is not zero is applied across $L_{tot}$, and a discharging interval, a first transition forward F-ZVS operating region wherein $V_{trnf}$ is negative and each switching semi-cycle is composed in sequence of a circulating interval, a charging interval and a discharging interval, a second main forward F-ZVS operating region wherein $V_{trnf}$ is negative and each switching semi-cycle is composed in sequence of a circulating interval, a charging interval, a transfer interval and a discharging interval, a second transition forward F-ZVS operating region wherein $V_{trnf}$ is negative and each switching semi-cycle is composed in sequence of a circulating interval, a charging interval and a transfer interval, a third main forward F-ZVS operating region wherein $V_{trnf}$ is negative and each switching semi-cycle is composed in sequence of a circulating interval, a charging interval and a transfer interval, a third transition forward F-ZVS operating region wherein $V_{trnf}$ is negative and each switching semi-cycle is composed in sequence of a circulating interval and a transfer interval, a first aspect of a fourth main forward F-ZVS operating region wherein $V_{trnf}$ is negative and each switching semi-cycle is composed in sequence of a circulating interval and a transfer interval, a second aspect of the fourth main forward F-ZVS operating region wherein $V_{trnf}$ is zero and each switching semi-cycle is composed in sequence of a circulating interval and a transfer interval, a third aspect of the fourth main forward F-ZVS operating region wherein $V_{trnf}$ is positive and each switching semi-cycle is composed in sequence of a circulating interval and a transfer interval, a fourth transition forward F-ZVS operating region wherein $V_{trnf}$ is positive and each switching semi-cycle is composed in sequence of a circulating interval and a transfer interval, a fifth main forward F-ZVS operating region wherein $V_{trnf}$ is positive and each switching semi-cycle is composed in sequence of a circulating interval, a transfer interval and a discharging interval, a fifth transition forward F-ZVS operating region wherein $V_{trnf}$ is positive and each switching semi-cycle is composed in sequence of a circulating interval, a transfer interval and a discharging interval, a sixth main forward F-ZVS operating region wherein $V_{trnf}$ is positive and each switching semi-cycle is composed in sequence of a circulating interval, a charging interval, a transfer interval and a discharging interval, a sixth transition forward F-ZVS operating region wherein $V_{trnf}$ is positive and each switching semi-cycle is composed in sequence of a circulating interval, a charging interval and a discharging interval, and a seventh main forward F-ZVS operating region wherein $V_{trnf}$ is positive and each switching semi-cycle is composed in sequence of a circulating interval, a charging interval, a freewheeling interval and a discharging interval, said reverse direction M-RMS mode of operation and said reverse direction F-ZVS mode of operation having the same operating regions as said forward direction M-RMS mode of operation and said forward direction F-ZVS mode of operation, respectively, but with $V_{chrg}$ corresponding $V_{out}$, $V_{trnf}$ corresponding to the differential to $V_{out}-(V_{in}-V_{out})*n$, $V_{circ}$ corresponding to $V_{out}+(V_{in}-V_{out})*n$ and $V_{dsch}$ corresponding to $(V_{in}-V_{out})*n$, and total leakage inductance corresponding to $L_{tot}/n^2$.

7. The modulation control scheme recited in claim 6 wherein said modulation control scheme further controls said switches in an idling forward M-RMS mode of operation and an idling reverse M-RMS mode of operation during which $V_{idln}$ is applied across the total leakage inductance, transformer primary current is zero and input current to said converter is zero, said modulation control scheme operating said converter in said first main forward M-RMS operating region, followed by said idling forward M-RMS operating region, and followed by said first main reverse M-RMS operating region in order to change from said forward M-RMS mode of operation to said reverse M-RMS mode of operation, said modulation control scheme operating said converter in said first main reverse M-RMS operating region, followed by said idling reverse M-RMS mode of operation, and followed by said first main forward M-RMS operating region in order to change from said reverse M-RMS mode of operation to said forward M-RMS mode of operation.

8. The modulation control scheme recited in claim 7 wherein said modulation control scheme further controls said switches in a freewheeling forward F-ZVS mode of operation and a freewheeling reverse F-ZVS mode of operation consisting in sequence of a circulating interval and a freewheeling interval wherein transformer primary current reaches a circulating primary current value at the end of the circulating interval, remains at the circulating primary current value during the freewheeling interval and crosses zero during the circulating interval, and wherein input current to said converter is zero, said modulation control scheme operating said converter in said first main forward F-ZVS operating region followed by said freewheeling forward F-ZVS mode of operation, followed by said idling forward M-RMS mode of operation, followed by said freewheeling reverse F-ZVS mode of operation, and followed by said first main reverse F-ZVS operating region in order to change from said forward F-ZVS mode of operation to said reverse F-ZVS mode of operation, said modulation control scheme operating said converter in said first main reverse F-ZVS operating region, followed by said freewheeling reverse F-ZVS mode of operation, followed by said idling reverse M-RMS mode of operation, followed by said freewheeling forward F-ZVS mode of operation, and followed by said first main forward F-ZVS operating region in order to change from said reverse F-ZVS mode of operation to said forward F-ZVS mode of operation.

9. A modulation control system for a charge controller in a photovoltaic system having a photovoltaic array, a battery bank and a high voltage DC end load, comprising a series-connected charge controller including a bidirectional dual active bridge DC to DC converter having a first bridge with four MOSFET switches, a second bridge with four MOSFET switches, and a transformer electrically connecting said first and second bridges and having a predetermined total leakage inductance $L_{tot}$ and a turn ratio n, said converter being operable in a forward direction of power flow wherein said first bridge receives electrical input V1 from the photovoltaic array and said second bridge delivers electrical output $V_{out}$ of appropriate voltage to charge the battery bank, said converter being operable in a reverse direction of power flow wherein said second bridge receives electrical input $V_{out}$ from the battery bank and said first bridge delivers electrical output $V_{in}$ of appropriate voltage to the high voltage DC end load; and a modulation control scheme for selectively controlling on and off actions of said switches to control electrical power flow through said converter in said forward direction and said reverse direction in a minimum root mean square M-RMS mode of operation to minimize conduction losses and a full-zero voltage switching F-ZVS mode of operation to minimize switching losses, said M-RMS mode of operation having an operating range divided into a series of five main M-RMS operating regions and four transition M-RMS operating regions respectively located between adjacent main M-RMS operating regions, said F-ZVS mode of operation having an operating range divided into a series of seven main F-ZVS operating regions and six transition F-ZVS operating regions respectively located between adjacent main F-ZVS operating regions, each of said forward direction operating regions having switching semi-cycles divided into a plurality of intervals during which a different voltage component is applied across $L_{tot}$ in accordance with the switching actions of said switches as controlled by said modulation control scheme, each of said reverse direction operating regions having switching semi-cycles divided into a plurality of intervals during which a different voltage component is applied across a total leakage inductance $L'_{tot}$ corresponding to $L_{tot}/n^2$, said modulation control scheme determining the duty cycle for each of said intervals, said forward direction M-RMS mode of operation comprising a first main forward M-RMS operating region wherein each switching semi-cycle is composed in sequence of a charging interval wherein a voltage component $V_{chrg}$ corresponding to V1 is applied across $L_{tot}$, a transfer interval wherein a voltage component $V_{trnf}$ corresponding to the differential V1–$V_{out}/n$ is applied across $L_{tot}$, and an idling interval during which a voltage component $V_{idln}$ corresponding to zero-voltage when the transformer primary current is zero is applied across $L_{tot}$, and wherein $V_{trnf}$ is negative, transformer primary current is not zero at the end of the charging interval, reaches zero at the end of the transfer interval, remains at zero during the idling interval and its waveform does not cross zero during the switching semi-cycle, a first transition forward M-RMS operating region wherein each switching semi-cycle consists in sequence of a charging interval and a transfer interval wherein $V_{trnf}$ is negative, transformer primary current is not zero at the end of the charging interval, reaches zero at the end of the transfer interval and its waveform does not cross zero during the switching semi-cycle, a second main forward M-RMS operating region wherein each switching semi-cycle consists in sequence of a circulating interval during which a voltage component $V_{circ}$ corresponding to V1+$V_{out}/n$ is applied across $L_{tot}$, a charging interval and a transfer interval wherein $V_{trnf}$ is negative, transformer primary current reaches a primary current value $I_{p1}$ at the end of the circulating interval, reaches a primary current value $I_{p2}$, greater than $I_{p1}$, at the end of the charging interval, reaches zero at the end of the transfer interval, and its waveform does not cross zero during the switching semi-cycle, a second transition forward M-RMS operating region wherein each switching semi-cycle consists in sequence of a circulating interval and a transfer interval wherein $V_{trnf}$ is negative, transformer primary current is not zero at the end of the circulating interval, reaches zero at the end of the transfer interval and its waveform does not cross zero during the switching semi-cycle, a first aspect of a third main forward M-RMS operating region wherein each switching semi-cycle consists in sequence of a circulating interval and a transfer interval wherein $V_{trnf}$ is negative, transformer primary current reaches a primary current value $I_{p2}$ at the end of the circulating interval, reaches a primary current value $I_{p1}$ at the end of the transfer interval and its waveform crosses zero during the circulating interval, a second aspect of the third main forward M-RMS operating region wherein each switching semi-cycle consists in sequence of a circulating interval and a transfer interval wherein $V_{trnf}$ is zero, transformer primary current reaches a primary current value that is not zero at the end of the circulating interval, remains at the primary current value that is not zero during the transfer interval, and its waveform crosses zero during the circulating interval, a third aspect of the third main forward M-RMS operating region wherein each switching semi-cycle consists in sequence of a circulating interval and a transfer interval wherein $V_{trnf}$ is positive, transformer primary current reaches a primary current value $I_{p1}$ at the end of the circulating interval, reaches a primary current value $I_{p2}$ at the end of the transfer interval and its waveform crosses zero during the circulating interval, a third transition forward M-RMS operating region wherein each switching semi-cycle consists in sequence of a circulating interval and a transfer interval wherein $V_{trnf}$ is positive, transformer primary current reaches zero at the end of the circulating interval, reaches a primary current value that is not zero at the end of the transfer interval and its waveform crosses zero between the circulating and transfer intervals, a fourth main forward M-RMS operating region wherein each switching semi-cycle consists in sequence of a circulating interval, a transfer interval and a discharging interval during which a voltage component $V_{dsch}$ corresponding to $V_{out}/n$ is applied across $L_{tot}$ wherein $V_{trnf}$ is positive, transformer primary current reaches zero at the end of the circulating interval, reaches a primary current value $I_{p2}$ at the end of the transfer interval, reaches a primary current value $I_{p1}$ at the end of the discharging interval and its waveform crosses zero between the circulating and transfer intervals, a fourth transition forward M-RMS operating region wherein each switching semi-cycle consists in sequence of a discharging interval and a transfer interval wherein $V_{trnf}$ is positive, transformer primary current reaches zero at the end of the discharging interval, reaches a primary current value that is not zero at the end of the discharging interval, reaches a primary current value that is not zero at the end of the transfer interval and its waveform crosses zero between the discharging and transfer intervals, and a fifth main forward M-RMS operating region in which each switching semi-cycle consists in sequence of a transfer interval, a discharging interval and an idling interval wherein $V_{trnf}$ is positive, transformer primary current reaches a primary current value that is not zero at the end of the transfer interval, reaches zero at the end of the discharging interval, remains at zero during the idling interval and does not cross zero during the switching semi-cycle, said forward direction F-ZVS mode of operation comprising a first main forward F-ZVS operating region wherein each switching semi-cycle consists in sequence of a circulating interval, a charging interval, a freewheeling interval during which a voltage component $V_{freew}$ corresponding to zero voltage when the transformer primary current is not zero is applied at cross $L_{tot}$, and a discharging interval wherein $V_{trnf}$ is negative, transformer primary current reaches a circulating primary current value $I_x$ at the end of the circulating interval, reaches a primary current value $I_p$, greater than $I_x$, at the end of the charging interval, remains at $I_p$ during the freewheeling interval, reaches a circulating primary current value $I_x$ at the end of the discharging interval and its waveform crosses zero during the circulating interval, a first transition forward F-ZVS operating region wherein each switching semi-cycle consists in sequence of a circulating interval, a charging interval and a discharging interval wherein $V_{trnf}$ is negative, transformer primary current reaches a circulating primary current value $I_x$ at the end of the circulating interval, reaches a primary current value $I_p$ at the end of the charging interval, reaches a circulating primary current value $I_x$ at the end of the discharging interval and its waveform crosses zero during the circulating interval, a second main forward F-ZVS operating region wherein each switching semi-cycle consists in sequence of a circulating interval, a charging interval, a transfer interval and a discharging interval wherein $V_{trnf}$ is negative, transformer primary current reaches a circulating primary current value $I_x$ at the end of the circulating interval, reaches a primary current value $I_{p2}$ at the end of the charging interval, reaches a primary current value $I_{p1}$, less than $I_{p2}$ but greater than the circulating primary current value $I_x$, at the end of the discharging interval and its waveform crosses zero during the circulating interval, a second transition forward F-ZVS operating region wherein each switching semi-cycle consists in sequence of a circulating interval, a charging interval and a transfer interval wherein $V_{trnf}$ is negative, transformer primary current reaches a circulating primary current value $I_x$ at the end of the circulating interval, reaches a primary current value $I_p$ at the end of the charging interval, reaches a circulating primary current value $I_x$ at the end of the transfer interval and its waveform crosses zero during the circulating interval, a third main forward F-ZVS operating region in which each switching semi-cycle consists in sequence of a circulating interval, a charging interval and a transfer interval wherein $V_{trnf}$ is negative, transformer primary current reaches a primary current value $I_{p1}$ at the end of the circulating interval, reaches a primary current value $I_{p2}$ at the end of the charging interval, reaches a circulating primary current value $I_x$ at the end of the transfer interval and its waveform crosses zero during the circulating interval, a third transition forward F-ZVS operating region wherein each switching semi-cycle consists in sequence of a circulating interval and a transfer interval wherein $V_{trnf}$ is negative, transformer primary current reaches a primary current value $I_p$ at the end of the circulating interval, reaches a circulating primary current value $I_x$ at the end of the transfer interval and its waveform crosses zero during the circulating interval, a first aspect of a fourth main forward F-ZVS operating region wherein each switching semi-cycle consists in sequence of a circulating interval and a transfer interval wherein $V_{trnf}$ is negative, transformer primary current reaches a primary current value $I_{p2}$ at the end of the circulating interval, reaches a primary current value $I_{p1}$ at the end of the transfer interval and its waveform crosses zero during the circulating interval, a second aspect of the fourth main forward F-ZVS operating region wherein each switching semi-cycle consists in sequence of a circulating interval and a transfer interval wherein $V_{trnf}$ is zero, transformer primary current reaches a primary current value that is not zero at the end of the circulating interval, remains at the primary current value that is not zero during the transfer interval and its waveform crosses zero during the circulating interval, a third aspect of the fourth main forward F-ZVS operating region wherein each switching semi-cycle consists in sequence of a circulating interval and a transfer interval wherein $V_{trnf}$ is positive, transformer primary current reaches a primary current value $I_{p1}$ at the end of the circulating interval, reaches a primary current value $I_{p2}$ at the end of the transfer interval and its waveform crosses zero during the circulating interval, a fourth transition forward F-ZVS operating region wherein each switching semi-cycle consists in sequence of a circulating interval and a transfer interval wherein $V_{trnf}$ is positive, transformer primary current reaches a circulating primary current value $I_x$ at the end of the circulating interval, reaches a primary current value $I_p$ at the end of the transfer interval and its waveform crosses zero during the circulating interval, a fifth main forward F-ZVS operating region wherein each switching semi-cycle consists in sequence of a circulating interval, a transfer interval and a discharging interval wherein $V_{trnf}$ is positive, transformer primary current reaches a circulating primary current value $I_x$ at the end of the circulating interval, reaches a primary current value $I_{p2}$ at the end of the transfer interval, reaches a primary current value $I_{p1}$ at the end of the discharging interval and its waveform crosses zero during the circulating interval, a fifth transition forward F-ZVS operating region wherein each switching semi-cycle consists in sequence of a circulating interval, a transfer interval and a discharging interval wherein $V_{trnf}$ is positive, transformer primary current reaches a circulating primary current value $I_x$ at the end of the circulating interval, reaches a primary current value $I_p$ at the end of the transfer interval, reaches a circulating primary current value $I_x$ at the end of the discharging interval and its waveform crosses zero during the circulating interval, a sixth main forward F-ZVS operating region wherein each switching semi-cycle consists in sequence of a circulating interval, a charging interval, a transfer interval and a discharging interval wherein $V_{trnf}$ is positive, transformer primary current reaches a circulating primary current value Ix at the end of the circulating interval, reaches a primary current value $I_{p1}$ at the end of the charging interval, reaches a primary current value $I_{p2}$ at the end of the transfer interval, reaches a circulating primary current value $I_x$ at the end of the discharging interval and its waveform crosses zero during the circulating interval, a sixth transition forward F-ZVS operating region wherein each switching semi-cycle consists in sequence of a circulating interval, a charging interval and a discharging interval wherein $V_{trnf}$ is positive, transformer primary current reaches a circulating primary current value $I_x$ at the end of the circulating interval, reaches a primary current value greater than $I_x$ at the end of the charging interval, reaches a circulating primary current value $I_x$ at the end of the discharging interval and its waveform crosses zero during the circulating interval, and a seventh main forward F-ZVS operating region wherein each switching semi-cycle consists in sequence of a circulating interval, a charging interval, a freewheeling interval and a discharging interval wherein $V_{trnf}$ is positive, transformer primary current reaches a circulating primary current value $I_x$ at the end of the circulating interval, reaches a primary current value $I_p$ at the end of the charging interval, remains at the primary current value $I_p$ during the freewheeling interval, reaches a circulating primary current value $I_x$ at the end of the discharging interval and its waveform crosses zero during the circulating interval, said reverse direction M-RMS mode of operation and said reverse direction F-ZVS mode of operation having the same operating regions as said forward direction M-RMS mode of operation and said forward direction F-ZVS mode of operation, respectively, but with voltage components $V'_{chrg}$ corresponding to $V_{out}$, $V'_{trnf}$ corresponding to the voltage differential $V_{out}-(V_{in}-V_{out})*n$, $V'_{circ}$ corresponding to $V_{out}+(V_{in}-V_{out})*n$ and $V_{dsch}$ corresponding to $(V_{in}-V_{out})*n$ being applied across $L'_{tot}$.

10. The modulation control scheme recited in claim 9 wherein said modulation control scheme further controls said switches in an idling forward M-RMS mode of operation and an idling reverse M-RMS mode of operation during which $V_{idln}$ is applied across the total leakage inductance, transformer primary current is zero and input current to said converter is zero, said modulation control scheme operating said converter in said first main forward M-RMS operating region, followed by said idling forward M-RMS operating region, and followed by said first main reverse M-RMS operating region in order to change from said forward M-RMS mode of operation to said reverse M-RMS mode of operation, said modulation control scheme operating said converter in said first main reverse M-RMS operating region, followed by said idling reverse M-RMS mode of operation, and followed by said first main forward M-RMS operating region in order to change from said reverse M-RMS mode of operation to said forward M-RMS mode of operation.

11. The modulation control scheme as recited in claim 10 wherein said modulation control scheme further controls said switches in a freewheeling forward F-ZVS mode of operation and a freewheeling reverse F-ZVS mode of operation consisting in sequence of a circulating interval and a freewheeling interval wherein transformer primary current reaches a circulating primary current value at the end of the circulating interval, remains at the circulating primary current value during the freewheeling interval and crosses zero during the circulating interval, and wherein input current to said converter is zero, said modulation control scheme operating said converter in said first main forward F-ZVS operating region followed by said freewheeling forward F-ZVS mode of operation, followed by said idling forward M-RMS mode of operation, followed by said freewheeling reverse F-ZVS mode of operation, and followed by said first main reverse F-ZVS operating region in order to change from said forward F-ZVS mode of operation to said reverse F-ZVS mode of operation, said modulation control scheme operating said converter in said first main reverse F-ZVS operating region, followed by said freewheeling reverse F-ZVS mode of operation, followed by said idling reverse M-RMS mode of operation, followed by said freewheeling forward F-ZVS mode of operation, and followed by said first main forward F-ZVS operating region in order to change from said reverse F-ZVS mode of operation to said forward F-ZVS mode of operation.

* * * * *